US012584689B2

(12) United States Patent
Zielinski et al.

(10) Patent No.: US 12,584,689 B2
(45) Date of Patent: Mar. 24, 2026

(54) METHODS AND APPARATUSES FOR DRYING ELECTRONIC DEVICES

(71) Applicant: REVIVE ELECTRONICS, LLC, Fishers, IN (US)

(72) Inventors: Reuben Zielinski, Fishers, IN (US); David Douberteen, Indianapolis, IN (US); Mark Earle, Fishers, IN (US); James Shrake, Pendleton, IN (US); Evan Zaldivar, Mooresville, NC (US)

(73) Assignee: Revive Electronics, LLC, Fishers, IN (US)

( * ) Notice: Subject to any disclaimer, the term of this patent is extended or adjusted under 35 U.S.C. 154(b) by 0 days.

(21) Appl. No.: 19/317,032

(22) Filed: Sep. 2, 2025

(65) Prior Publication Data

US 2025/0383151 A1 Dec. 18, 2025

Related U.S. Application Data

(63) Continuation-in-part of application No. 19/252,883, filed on Jun. 27, 2025, which is a continuation of
(Continued)

(51) Int. Cl.
*F26B 25/22* (2006.01)
*F26B 3/02* (2006.01)
(Continued)

(52) U.S. Cl.
CPC ................ *F26B 25/22* (2013.01); *F26B 3/02* (2013.01); *F26B 3/20* (2013.01); *F26B 5/04* (2013.01);
(Continued)

(58) Field of Classification Search
CPC .... F26B 25/22; F26B 3/02; F26B 3/20; F26B 5/04; F26B 9/06; F26B 9/106; F26B 23/04
(Continued)

(56) References Cited

U.S. PATENT DOCUMENTS 1,273,962 A * 7/1918 Waters .................... B41B 11/18
199/30
1,854,956 A 4/1932 Reeve
(Continued)

FOREIGN PATENT DOCUMENTS

AU 2003100364 A4 7/2003
CA 2050668 A1 3/1992
(Continued)

OTHER PUBLICATIONS

International Search Report and Written Opinion dated Feb. 25, 2019 in cinnection with International Application No. PCT/US2018/058492, 7 pages.

(Continued)

*Primary Examiner* — Stephen M Gravini
(74) *Attorney, Agent, or Firm* — Baker & McKenzie LLP

(57) ABSTRACT

Methods and apparatuses for drying electronic devices are disclosed. An exemplary method comprises: initiating a drying operation in a drying apparatus comprising: generating a first air flow through a first air channel, routing, a moisture from an electronic device to a moisture-absorbing apparatus, absorbing, using the moisture-absorbing apparatus, the moisture from the electronic device, determining a first humidity and a second humidity, executing, based on the first humidity and the second humidity, a first computing operation, exhausting the first air flow to an exterior of the drying apparatus, determining a third humidity, and executing, based on the third humidity, a second computing operation.

20 Claims, 84 Drawing Sheets

Related U.S. Application Data application No. 19/217,397, filed on May 23, 2025, which is a continuation-in-part of application No. 18/984,716, filed on Dec. 17, 2024, which is a continuation of application No. 18/923,352, filed on Oct. 22, 2024, now Pat. No. 12,276,454, which is a continuation-in-part of application No. 18/824,692, filed on Sep. 4, 2024, now Pat. No. 12,281,847, which is a continuation-in-part of application No. 18/386,918, filed on Nov. 3, 2023, now Pat. No. 12,215,925, which is a continuation-in-part of application No. 18/228,504, filed on Jul. 31, 2023, now Pat. No. 12,173,962, which is a continuation of application No. 17/134,492, filed on Dec. 27, 2020, now Pat. No. 11,713,924, which is a continuation of application No. 16/854,862, filed on Apr. 21, 2020, now Pat. No. 10,876,792.

(60) Provisional application No. 63/422,838, filed on Nov. 4, 2022.

(51) Int. Cl.

| | |
|---|---|
| ***F26B 3/20*** | (2006.01) |
| ***F26B 5/04*** | (2006.01) |
| ***F26B 9/06*** | (2006.01) |
| ***F26B 9/10*** | (2006.01) |
| ***F26B 23/04*** | (2006.01) |

(52) U.S. Cl.
CPC ................ *F26B 9/06* (2013.01); *F26B 9/106* (2013.01); *F26B 23/04* (2013.01)

(58) Field of Classification Search
USPC ........................................................... 34/403
See application file for complete search history.

(56) References Cited

U.S. PATENT DOCUMENTS 1,854,958 A * 4/1932 Santosuosso .......... A44C 17/04 63/28
2,496,054 A 1/1950 Hoyler
2,846,710 A 8/1958 Haka
3,302,303 A 2/1967 Marcel
3,698,098 A 10/1972 Ramsay
3,721,101 A 3/1973 Sheppard et al.
3,897,604 A 8/1975 Weimer
3,932,944 A 1/1976 Chiba
4,020,563 A 5/1977 Hoefer
4,054,376 A 10/1977 Wareham
4,386,471 A 6/1983 Bowrey et al.
4,395,830 A 8/1983 Lockwood
4,464,582 A 8/1984 Aragaki et al.
4,515,751 A 5/1985 Krieg, Jr.
4,558,206 A 12/1985 Ball
4,589,971 A 5/1986 Mayeaux
4,704,805 A 11/1987 Kaya et al.
4,733,428 A 3/1988 Malinge et al.
4,882,851 A 11/1989 Wennerstrum et al.
5,005,410 A 4/1991 Webster et al.
5,038,494 A 8/1991 Lundquist et al.
5,039,696 A * 8/1991 Niwata ............. C07D 207/456 514/425
5,067,251 A 11/1991 Zlobinsky et al.
5,122,344 A 6/1992 Schmoegner
5,172,488 A 12/1992 Okane et al.
5,203,859 A 4/1993 Khinkis et al.
5,222,307 A 6/1993 Oba et al.
5,293,697 A 3/1994 Kawakami
5,318,164 A 6/1994 Barnes et al.
5,335,703 A 8/1994 deJong
5,343,747 A 9/1994 Rosen
5,349,543 A 9/1994 Buliszyn et al.
5,349,845 A 9/1994 Blom
5,376,392 A 12/1994 Ikegami et al.
5,377,425 A 1/1995 Kawakami et al.
5,399,920 A * 3/1995 Van Tran ......... H03K 19/01721 327/333
5,456,025 A 10/1995 Joiner et al.
5,548,905 A 8/1996 Kuma et al.
5,578,753 A 11/1996 Weiss et al.
5,625,962 A 5/1997 Fleissner
5,636,446 A 6/1997 Mae et al.
5,640,783 A 6/1997 Schumaier
5,671,546 A 9/1997 Haala
5,671,548 A 9/1997 Blaschka et al.
5,715,612 A 2/1998 Schwenkler
5,732,478 A 3/1998 Chapman et al.
5,852,879 A 12/1998 Schumaier
5,884,006 A 3/1999 Frohlich et al.
5,889,466 A 3/1999 Ferguson
5,992,049 A 11/1999 Trost
6,025,580 A 2/2000 Yagi
6,039,696 A 3/2000 Bell
6,067,727 A 5/2000 Muraoka
6,108,074 A * 8/2000 Bloom ................... G01M 11/33 356/73.1
6,122,836 A 9/2000 Tenedini et al.
6,170,171 B1 1/2001 Schmidbauer et al.
6,185,839 B1 2/2001 Kholodenko et al.
6,266,123 B1 7/2001 Maejima et al.
6,372,508 B1 4/2002 Shnizer et al.
6,399,920 B1 6/2002 Guinn
6,470,593 B1 10/2002 Seo
6,508,599 B2 1/2003 Blume
6,530,160 B1 3/2003 Gookins
6,551,552 B1 4/2003 Lyublinski et al.
6,552,308 B2 4/2003 Nishimura
6,557,268 B1 5/2003 Berg et al.
6,568,249 B2 5/2003 Devine
6,622,399 B1 9/2003 Theriault et al.
6,625,900 B1 9/2003 Tobias
6,652,744 B2 11/2003 Lutze et al.
6,675,636 B2 1/2004 Sadler
6,760,981 B2 7/2004 Leap
6,821,025 B2 11/2004 Gerhard
6,834,443 B2 12/2004 Bloemendaal
6,874,247 B1 4/2005 Hsu
6,893,530 B2 5/2005 Kishimoto et al.
6,938,359 B2 9/2005 Birgersson et al.
6,943,325 B2 9/2005 Pittman et al.
7,017,276 B2 3/2006 Greenspan et al.
7,050,837 B2 5/2006 Menz et al.
7,182,820 B2 2/2007 Campbell et al.
7,194,822 B2 * 3/2007 Kolari ................... F26B 21/026 34/492
7,205,900 B2 4/2007 Liu et al.
7,243,857 B2 7/2007 Kallestad
7,418,970 B2 9/2008 Sugimoto et al.
7,460,350 B2 12/2008 Talbot et al.
7,493,705 B2 2/2009 Gomi
7,557,466 B2 7/2009 Wong et al.
7,594,343 B2 9/2009 Woerdehoff et al.
7,612,315 B2 11/2009 Corradini
7,631,538 B2 12/2009 Imhof
7,665,226 B2 2/2010 Tsuruta et al.
D615,715 S 5/2010 Zielinski
7,814,678 B2 10/2010 Romanek
7,992,318 B2 8/2011 Kawaji et al.
8,058,588 B2 11/2011 Gagas et al.
8,108,074 B2 1/2012 Boder
8,112,900 B2 2/2012 Romanek
8,203,689 B2 6/2012 Gomi
8,281,499 B2 10/2012 Friesen et al.
8,355,233 B2 1/2013 Schumacher et al.
8,416,542 B2 4/2013 Nakamura
8,446,049 B2 5/2013 Lee
8,498,087 B2 7/2013 Rabu et al.
8,689,461 B1 4/2014 Cookson et al.
8,886,971 B2 11/2014 Chuang
8,991,067 B2 3/2015 Zielinski et al.

(56) References Cited

U.S. PATENT DOCUMENTS

| | | | | |
|---|---|---|---|---|
| 9,071,046 | B2 | 6/2015 | Stevens et al. | |
| 9,240,292 | B1 * | 1/2016 | Lapetina | H01H 9/04 |
| 9,488,564 | B2 | 11/2016 | Zielinski et al. | |
| 9,488,565 | B2 | 11/2016 | Zielinski et al. | |
| 9,513,053 | B2 | 12/2016 | Zielinski et al. | |
| 9,644,891 | B2 | 5/2017 | Zielinski et al. | |
| 9,683,780 | B2 | 6/2017 | Zielinski et al. | |
| 9,709,327 | B2 | 7/2017 | Marchiori | |
| 9,746,241 | B2 | 8/2017 | Zielinski et al. | |
| 9,816,757 | B1 | 11/2017 | Zielinski et al. | |
| 9,970,708 | B2 | 5/2018 | Zielinski et al. | |
| 9,980,026 | B2 * | 5/2018 | Zadesky | H04R 3/007 |
| 10,074,667 | B1 | 9/2018 | Higashi et al. | |
| 10,240,867 | B2 | 3/2019 | Zielinski et al. | |
| 10,651,643 | B2 | 5/2020 | Trusty et al. | |
| 10,690,413 | B2 | 6/2020 | Zielinski et al. | |
| 10,876,292 | B2 * | 12/2020 | Döhring | B32B 21/08 |
| 10,876,792 | B2 | 12/2020 | Zielinski et al. | |
| 10,928,135 | B2 | 2/2021 | Zielinski et al. | |
| 11,713,924 | B2 * | 8/2023 | Zielinski | F26B 23/04<br>34/92 |
| 12,173,962 | B2 | 12/2024 | Zielinski et al. | |
| 12,215,925 | B2 * | 2/2025 | Zielinski | F26B 9/003 |
| 12,276,454 | B2 * | 4/2025 | Zielinski | F26B 3/02 |
| 12,281,947 | B2 * | 4/2025 | Liu | G01K 1/026 |
| 12,303,362 | B2 * | 5/2025 | Dean | A61B 5/202 |
| 2001/0025431 | A1 | 10/2001 | Kitano et al. | |
| 2001/0040667 | A1 | 11/2001 | Sasaki | |
| 2001/0045421 | A1 | 11/2001 | Sullivan | |
| 2002/0047587 | A1 | 4/2002 | Lee et al. | |
| 2003/0019124 | A1 | 1/2003 | Miyakawa et al. | |
| 2003/0115768 | A1 | 6/2003 | Hoffman | |
| 2003/0116975 | A1 | 6/2003 | Cole | |
| 2003/0160681 | A1 | 8/2003 | Menard et al. | |
| 2003/0227550 | A1 | 12/2003 | Manico et al. | |
| 2004/0050076 | A1 | 3/2004 | Palfy et al. | |
| 2004/0079136 | A1 | 4/2004 | Pillion | |
| 2004/0082886 | A1 | 4/2004 | Timpson | |
| 2004/0098811 | A1 | 5/2004 | Tuttle et al. | |
| 2004/0186620 | A1 | 9/2004 | Chirnomas | |
| 2005/0044744 | A1 | 3/2005 | Tadano et al. | |
| 2005/0079888 | A1 | 4/2005 | Menz et al. | |
| 2005/0081890 | A1 | 4/2005 | Ato et al. | |
| 2005/0112040 | A1 | 5/2005 | Hasegawa et al. | |
| 2005/0217136 | A1 | 10/2005 | Blankenship et al. | |
| 2005/0218239 | A1 | 10/2005 | Busch | |
| 2005/0285748 | A1 | 12/2005 | Pedraza et al. | |
| 2006/0029730 | A1 | 2/2006 | Campbell et al. | |
| 2006/0058069 | A1 | 3/2006 | Garcia et al. | |
| 2006/0137213 | A1 | 6/2006 | Asuke | |
| 2006/0164772 | A1 | 7/2006 | Guo | |
| 2006/0208914 | A1 | 9/2006 | Liu et al. | |
| 2006/0236559 | A1 | 10/2006 | Mori | |
| 2006/0255166 | A1 | 11/2006 | Imamura et al. | |
| 2006/0277782 | A1 | 12/2006 | Chen et al. | |
| 2007/0033824 | A1 | 2/2007 | Okajima et al. | |
| 2007/0199203 | A1 | 8/2007 | Federico | |
| 2007/0225863 | A1 | 9/2007 | Gross et al. | |
| 2007/0258870 | A1 | 11/2007 | Brown et al. | |
| 2007/0271811 | A1 | 11/2007 | Tsuruta et al. | |
| 2008/0013241 | A1 | 1/2008 | Wong et al. | |
| 2008/0055235 | A1 | 3/2008 | Tanaka | |
| 2008/0063809 | A1 | 3/2008 | Lee et al. | |
| 2008/0083723 | A1 | 4/2008 | Tsukamoto et al. | |
| 2008/0200779 | A1 | 8/2008 | Zimmerling et al. | |
| 2008/0204218 | A1 | 8/2008 | Tupman et al. | |
| 2008/0233018 | A1 | 9/2008 | van Dam et al. | |
| 2008/0256822 | A1 | 10/2008 | Suzuki et al. | |
| 2008/0281528 | A1 | 11/2008 | Relle, Jr. | |
| 2009/0019718 | A1 | 1/2009 | Mittleman et al. | |
| 2009/0022434 | A1 | 1/2009 | Chiba et al. | |
| 2009/0077825 | A1 | 3/2009 | Toofan et al. | |
| 2009/0090022 | A1 | 4/2009 | Ho et al. | |
| 2009/0145783 | A1 | 6/2009 | Forker | |
| 2009/0158614 | A1 | 6/2009 | Singh et al. | |

| | | | |
|---|---|---|---|
| 2009/0227118 | A1 | 9/2009 | Liu et al. |
| 2009/0272176 | A1 | 11/2009 | Lopez et al. |
| 2009/0273480 | A1 | 11/2009 | Mittleman et al. |
| 2010/0011609 | A1 | 1/2010 | Park et al. |
| 2010/0032600 | A1 | 2/2010 | Doe et al. |
| 2010/0040213 | A1 | 2/2010 | Park et al. |
| 2010/0088922 | A1 | 4/2010 | Romanek |
| 2010/0095504 | A1 | 4/2010 | Slack et al. |
| 2010/0097642 | A1 | 4/2010 | Sumi |
| 2010/0103566 | A1 | 4/2010 | Chen |
| 2010/0122470 | A1 | 5/2010 | Davis et al. |
| 2010/0206096 | A1 | 8/2010 | Lee et al. |
| 2010/0273477 | A1 | 10/2010 | Namaky |
| 2010/0304091 | A1 | 12/2010 | Wang |
| 2011/0047814 | A1 | 3/2011 | Watson et al. |
| 2011/0060945 | A1 | 3/2011 | Leprince et al. |
| 2011/0061477 | A1 | 3/2011 | Fitz |
| 2011/0067262 | A1 | 3/2011 | Eero |
| 2011/0099831 | A1 | 5/2011 | Parisi et al. |
| 2011/0104940 | A1 | 5/2011 | Rabu et al. |
| 2011/0137607 | A1 | 6/2011 | Hsieh |
| 2011/0219640 | A1 | 9/2011 | Latos |
| 2011/0247233 | A1 | 10/2011 | Bland et al. |
| 2011/0279931 | A1 | 11/2011 | Nakamura |
| 2012/0020015 | A1 | 1/2012 | Tian et al. |
| 2012/0038374 | A1 | 2/2012 | Johnson |
| 2012/0079100 | A1 | 3/2012 | McIntyre et al. |
| 2012/0085324 | A1 | 4/2012 | Saito et al. |
| 2012/0132360 | A1 | 5/2012 | Damm |
| 2012/0171462 | A1 | 7/2012 | Tsai |
| 2012/0231841 | A1 | 9/2012 | Niederberger et al. |
| 2012/0304483 | A1 | 12/2012 | Sirard et al. |
| 2013/0055585 | A1 | 3/2013 | Fujiwara |
| 2013/0073690 | A1 | 3/2013 | DeSalvo et al. |
| 2013/0088094 | A1 | 4/2013 | Paik |
| 2013/0096375 | A1 | 4/2013 | Iyama et al. |
| 2013/0111227 | A1 | 5/2013 | Sauerwein, Jr. |
| 2013/0151870 | A1 | 6/2013 | Chuang |
| 2013/0167874 | A1 | 7/2013 | Mittleman et al. |
| 2013/0182360 | A1 | 7/2013 | Stevens et al. |
| 2013/0192083 | A1 | 8/2013 | Zielinski et al. |
| 2013/0207455 | A1 | 8/2013 | Doljack |
| 2013/0287213 | A1 | 10/2013 | Sekiyama |
| 2013/0294017 | A1 | 11/2013 | Ota |
| 2013/0339304 | A1 | 12/2013 | Lee et al. |
| 2014/0130573 | A1 | 5/2014 | Zielinski et al. |
| 2014/0157619 | A1 | 6/2014 | Cookson et al. |
| 2014/0160680 | A1 | 6/2014 | Stevens |
| 2014/0185177 | A1 | 7/2014 | Li |
| 2014/0191588 | A1 | 7/2014 | Stevens |
| 2014/0191874 | A1 | 7/2014 | Stevens et al. |
| 2014/0237268 | A1 | 8/2014 | Mese |
| 2014/0247529 | A1 | 9/2014 | Borini et al. |
| 2014/0259730 | A1 | 9/2014 | Zielinski et al. |
| 2014/0307356 | A1 | 10/2014 | Hong et al. |
| 2015/0122422 | A1 | 5/2015 | Hayasaka et al. |
| 2015/0168059 | A1 | 6/2015 | Zielinski et al. |
| 2015/0179037 | A1 | 6/2015 | Ren et al. |
| 2015/0179418 | A1 | 6/2015 | Ashtikar et al. |
| 2015/0192362 | A1 | 7/2015 | Zielinski et al. |
| 2015/0226481 | A1 | 8/2015 | Marchiori |
| 2016/0080553 | A1 | 3/2016 | Dempster et al. |
| 2016/0126722 | A1 | 5/2016 | Liao |
| 2016/0149394 | A1 | 5/2016 | Trusty et al. |
| 2016/0162256 | A1 | 6/2016 | Komaromi et al. |
| 2016/0239047 | A1 | 8/2016 | Weber |
| 2016/0241059 | A1 | 8/2016 | Li |
| 2016/0241945 | A1 | 8/2016 | Zadesky et al. |
| 2017/0082360 | A1 | 3/2017 | Zielinski et al. |
| 2017/0205143 | A1 | 7/2017 | Zielinski et al. |
| 2017/0314854 | A1 | 11/2017 | Marchiori |
| 2018/0289845 | A1 | 10/2018 | Chan |
| 2018/0292132 | A1 | 10/2018 | Zielinski et al. |
| 2019/0031423 | A1 | 1/2019 | De La Torre Barreiro et al. |
| 2019/0219332 | A1 | 7/2019 | Zielinski et al. |

(56) References Cited

U.S. PATENT DOCUMENTS

| | | | |
|---|---|---|---|
| 2019/0314535 | A1 | 10/2019 | Golkowski et al. |
| 2020/0031319 | A1 | 1/2020 | Belanger et al. |
| 2020/0173573 | A1 | 6/2020 | Yokoe |
| 2021/0116178 | A1 | 4/2021 | Zielinski et al. |
| 2023/0375270 | A1 | 11/2023 | Zielinski et al. |
| 2024/0060721 | A1 | 2/2024 | Zielinski et al. |

FOREIGN PATENT DOCUMENTS

| | | | | |
|---|---|---|---|---|
| CA | 2596104 | A1 | 2/2008 | |
| CA | 2863649 | A1 | 8/2013 | |
| CN | 2065321 | U | 11/1990 | |
| CN | 1119266 | A | 3/1996 | |
| CN | 2307264 | Y | 2/1999 | |
| CN | 201018665 | Y | 2/2008 | |
| CN | 201255562 | Y | 6/2009 | |
| CN | 101986360 | A | 3/2011 | |
| CN | 201955259 | U | 8/2011 | |
| DE | 19539392 | A1 | 4/1997 | |
| DE | 102006047664 | A1 | 4/2008 | |
| EP | 0539607 | A1 | 5/1993 | |
| EP | 0639748 | A1 | 2/1995 | |
| EP | 1125177 | B1 | 1/2004 | |
| EP | 1080333 | B1 | 8/2009 | |
| EP | 2573493 | A1 | 3/2013 | |
| EP | 2810004 | A1 | 12/2014 | |
| EP | 2479523 | A4 | 2/2015 | |
| EP | 3462117 | A1 | 4/2019 | |
| EP | 3525308 | A1 | 8/2019 | |
| JP | 06-84878 | A | 3/1994 | |
| JP | 07-27474 | A | 1/1995 | |
| JP | 07-233931 | A | 9/1995 | |
| JP | 7265824 | A | 10/1995 | |
| JP | 08-261646 | A | 10/1996 | |
| JP | 10174301 | A | 6/1998 | |
| JP | 2001197175 | A | 7/2001 | |
| JP | 2001-523329 | A | 11/2001 | |
| JP | 2003142451 | A | 5/2003 | |
| JP | 2004-232965 | A | 8/2004 | |
| JP | 2006019607 | A | 1/2006 | |
| JP | 2006-140531 | A | 6/2006 | |
| JP | 2006324506 | A | 11/2006 | |
| JP | 2007027474 | A | 2/2007 | |
| JP | 2007135008 | A | 5/2007 | |
| JP | 3139842 | U | 3/2008 | |
| JP | 2008093648 | A | 4/2008 | |
| JP | 2008261646 | A | 10/2008 | |
| JP | 2009-270639 | A | 11/2009 | |
| JP | 2010284616 | A | 12/2010 | |
| JP | 2011171894 | A | 9/2011 | |
| JP | 2012191619 | A | 10/2012 | |
| KR | 950005465 | Y1 | 7/1995 | |
| KR | 20120064704 | A | 6/2012 | |
| KR | 20140144679 | A | 12/2014 | |
| KR | 10-1737498 | B1 | 5/2017 | |
| KR | 2022-0085769 | A | 6/2022 | |
| WO | 1998048855 | A1 | 11/1998 | |
| WO | 2000023861 | A1 | 4/2000 | |
| WO | 2000053983 | A1 | 9/2000 | |
| WO | 2006028572 | A2 | 3/2006 | |
| WO | 2007019337 | A2 | 2/2007 | |
| WO | 2007033493 | A1 | 3/2007 | |
| WO | 2008073051 | A1 | 6/2008 | |
| WO | 2009087102 | A2 | 7/2009 | |
| WO | 2010070551 | A1 | 6/2010 | |
| WO | 2011145555 | A1 | 11/2011 | |
| WO | 2013116599 | A1 | 8/2013 | |
| WO | 2014153007 | A1 | 9/2014 | |
| WO | WO-2015047378 | A1 * | 4/2015 | ............ H04R 3/007 |
| WO | 2015171967 | A1 | 11/2015 | |
| WO | 2016014818 | A1 | 1/2016 | |
| WO | 2017218832 | A1 | 12/2017 | |
| WO | 2019094936 | A1 | 5/2019 | |

OTHER PUBLICATIONS

Office Action dated Oct. 1, 2020 in connection with Canadian Application No. 3,050,379, 4 pages.
Lucio, Valentino, “A Solution for Soaked Cells,” San Antonio Express-News, pp. 1-3, Oct. 19, 2011.
Cooper, Sean, “Drybox Rescue Station: the ultimate cellphone drying system (hands-on),” www.engadget.com, pp. 1-13, May 22, 2013.
DRYBOX The New Way to Save a Wet Phone Fast, http://www.dryboxrescue.com/, pp. 1-5, Aug. 26, 2013.
International Search Report and Written Opinion dated Feb. 24, 2014 issued in International Application No. PCT/US2013/070178.
International Preliminary Report on Patentability dated Aug. 14, 2014 issued in International Application No. PCT/US2013/024277.
Final Office Action dated Sep. 3, 2014 issued in U.S. Appl. No. 14/080,595.
Non-Final Office Action dated Sep. 20, 2013 issued in U.S. Appl. No. 13/756,879.
Final Rejection dated Feb. 28, 2014 issued in U.S. Appl. No. 13/756,879.
Advisory Action dated Jun. 18, 2014 issued in U.S. Appl. No. 13/756,879.
Advisory Action dated Jul. 9, 2014 issued in U.S. Appl. No. 13/756,879.
Non-Final Rejection dated Feb. 28, 2014 issued in U.S. Appl. No. 14/080,595.
International Search Report and Written Opinion dated Aug. 27, 2014 issued in International Application No. PCT/US2014/028634.
Notice of Allowance dated Jan. 20, 2015 issued in U.S. Appl. No. 13/756,879.
Non-Final Rejection dated Sep. 20, 2014 issued in U.S. Appl. No. 13/756,879.
International Search Report and Written Opinion dated Oct. 28, 2014 issued in International Application No. PCT/US2014/046151.
Non-Final Office Action dated Apr. 10, 2015 issued in U.S. Appl. No. 14/080,595.
International Preliminary Report on Patentability dated May 28, 2015 issued in International Application No. PCT/US2013/070178.
Demand and Article 34 Amendments dated Jan. 14, 2015 issued in International Application No. PCT/US2014/028634.
International Preliminary Report on Patentability dated Apr. 15, 2015 issued in International Application No. PCT/US2014/028634.
Extended European Search Report dated Jun. 12, 2015 issued in European Application No. 13744398.2.
Non-Final Office Action dated Nov. 23, 2015 issued in U.S. Appl. No. 14/080,705.
First Examination Report dated Jun. 8, 2015 issued in Chinese Patent Application No. 201380016934.8.
Non-Final Office Action dated Sep. 1, 2015 issued in U.S. Appl. No. 14/213,142.
Office Action dated Oct. 23, 2015 issued in Colombian Patent Application No. 14189.782.
Non-Final Office Action dated Jan. 29, 2016 issued in U.S. Appl. No. 14/080,595.
MacVittie, Lori, “Remote Management In-Reach,” Network Computing, 14, 16; ProQuest p. 22, Aug. 21, 2003.
International Search Report and Written Opinion dated May 15, 2013, issued in PCT/US2013/024277.
How to Dry Out a Wet Cell Phone, ehow.com, http://www.ehow.com/pringhow_2042819_dry-out-wet-cll-phone.html, pp. 1-2, Jun. 5, 2013.
U.S. Trademark Registration No. 4,280,438 for the mark DRYBOX, Jan. 22, 2013.
Exhibitor News dated May 3, 2013 from International CTIA Wireless 2012.
EPO Public Patent Application Information for EP Patent Application No. 13744398.2, downloaded from http://www.epo.gov on May 17, 2017.
Office Action with English Translation, Japanese Patent Application No. 2014-555734, dated Feb. 7, 2017.
Global Dossier Patent Application Information for AU 2013214941, dated Oct. 7, 2016.

(56) References Cited

OTHER PUBLICATIONS

Substrate definition from Internet dated 2015.
Intemational Preliminary Report on Patentability issued in PCT/US2013/024277, May 8, 2014.
Intemational Preliminary Report on Patentability issued in PCT/US2013/070178, May 19, 2015.
International Preliminary Report on Patentability issued in PCT/US2015/029797, Nov. 8, 2016.
Intemational Preliminary Report on Patentability issued in PCT/US2014/046151, Jan. 12, 2015.
Intemational Preliminary Report on Patentability issued in PCT/US/2013/000239, Aug. 5, 2014.
Intemational Search Report and Written Opinion issued in PCT/US2015/028634, Apr. 29, 2016.
First Office Action with English translation, Chinese Application No. 201380016934.8, dated Jun. 25, 2015, 19 pages.
Second Office Action with English translation, Chinese Application No. 201380016934.8, dated Apr. 19, 2016, 8 pages.
Notification to Grant Patent Right for Invention with English translation, Chinese Application No. 201380016934.8, dated Sep. 29, 2016, 4 pages.
Demand and Article 34 Amendments dated Oct. 24, 2014 issued in International Application No. PCT/US2013/000239.
“How Can I Fix My Cell Phone—It Got Wet”, www.howtospoter.com/general/how-can-i-fix-my-cell-phone-it-got-wet, Apr. 21, 2007.
“How to Save a Wet Cell Phone,” WikiHow, www.wikihow.com/Save-a-Wet-Cell-Phone, Jul. 1, 2008.
“How to Save a Wet Cell Phone,” XHotmail, www.instructables.com/id/How-to-Save-a-Wet-Cell-Phone/?ALLSTEPS, Sep. 1, 2007.
“How to Save Your Wet Cell Phone—Tech Clinic,” Popular Mechanics, www.popularmechanics.com/technology/how-to/ips/4269047/, Jul. 1, 2008.
“Saving a wet cell phone with dry rice . . . Holy crap, it actually works!,” http://openattitude.com/2011/04/12/saving-a-wet-cell-phone-with-dry-rice-holy-crap-it-actually-works/, Apr. 21, 2011.
“Frugal Fix: Revive your Cell Phone or Electronic Devices from Water Damage,” http://www.fiscalgeek.com/2009/06/ff_water_damaged_cellphone/, Jun. 2009.
Office Action issued in Eurasian Patent Application No. 201491450, Jul. 25, 2016.
Notification on Readiness to Grant Patent issued in Eurasian Patent Application No. 201491450, May 18, 2017.
Canadian Examiner Requisition dated May 31, 2017 in connection with Canadian Application No. 2,863,649, 4 pages.
Eurasian Notification of Readiness to Grant a Eurasian Patent dated Aug. 28, 2017 in connection with Eurasian Application No. 201491450/31, 3 pages.
Examination Report dated Oct. 4, 2017 in connection with Australian Application No. 2013214941, 4 pages.
TESS search of Bluetooth dated Sep. 22, 2017.
Tess Bluetooth trademark status dated Sep. 22, 2017.
TESS WiFi search dated Sep. 22, 2017.
TESS WiFi trademark status dated Sep. 22, 2017.
Canadian Examiner Requisition dated Dec. 11, 2017 in connection with Canadian Application No. 2,863,649, 4 pages.
Office Action dated Jul. 2, 2016 issued in Colombian Patent Application No. 14189782.
Office Action dated Jul. 7, 2017 issued in Mexican Patent Application No. 2014/009259.
Office Action dated Dec. 21, 2017 issued in EP Patent Application No. 13744398.2.
Office Action dated Jun. 19, 2018 issued in Canadian Application No. 2,863,649, 4 pages.
Decision of Rejection dated Jan. 9, 2018 in connection with Japanese Application No. 2014-555734, 4 pages.
Office Action dated Feb. 7, 2019 in connection with U.S. Appl. No. 15/651,391.
First Office Action dated Oct. 25, 2018 in connection with Chinese Application No. 201611154278.X, 28 pages.
Extended European Search Report dated Feb. 5, 2019 in connection with European Application No. 18205789.3, 6 pages.
Korean Office Action dated Mar. 12, 2019 in connection with Korean Application No. 10-2014-7024141, 16 pages.
Korean Office Action dated Sep. 10, 2019 in connection with Korean Application No. 10-2014-7024141, 7 pages.
Indian Examination Report dated May 7, 2019 in connection with Indian Application No. 6535/DELNP/2014, 7 pages.
Japanese Notice of Reasons of Refusal dated May 28, 2019 in connection with Japanese Application No. 2018-089626, 6 pages.
Chinese Office Action dated Jun. 13, 2019 in connection with Chinese Application No. 201611154278.X, 10 pages.
International Search Report and Written Opinion of the International Searching Authority dated Mar. 8, 2019 in connection with International Application No. PCT/US2018/060753, 12 pages.
Office Action dated Feb. 11, 2020 in connection with European Application No. 18205789.3, 4 pages.
Office Action dated Feb. 7, 2020 in connection with Chinese Application No. 201611154278.X, 7 pages.
Examination Report dated Jan. 19, 2017 in connection with EP Patent Application 13744398.2, 4 pages.
Examination Report dated Jan. 21, 2020 in connection with Indian Application No. 201617004673, 6 pages.
Extended European Search Report dated Mar. 23, 2017 in connection with European Application No. 14822876.0, 8 pages.
Supplementary European Search Report dated Oct. 24, 2023 in connection with European Patent Application No. 20865608.2, 11 pages.
European Search Report dated Nov. 23, 2023 in connection with European Patent Application No. 23177384.7, 7 pages.
Notice of Preliminary Rejection dated Oct. 16, 2023, in connection to KR Application No. 10-2023-7004951, 11 pages (no translation).
International Search Report and Written Opinion dated Feb. 28, 2024 in connection with International Patent Application No. PCT/US2023/036798, 12 pages.
Non-Final Office Action dated Feb. 12, 2024 in connection with U.S. Appl. No. 18/228,504, 4 pages.
Extended European Search Report dated Nov. 15, 2023 in connection with EP Application No. 23177384.7, 6 pages.
Notice of Preliminary Rejection dated Apr. 22, 2024 in connection with Korean Patent Application No. 10-2020-7016794, 9 pages.
Notice of Reasons for Refusal Office Action dated Feb. 20, 2024 in connection with Japanese Patent Application No. 2023-017666, 23 pages.

* cited by examiner

METHODS AND APPARATUSES FOR DRYING ELECTRONIC DEVICES

CROSS-REFERENCE TO RELATED APPLICATIONS

This application is a continuation-in-part of U.S. application Ser. No. 19/252,883, filed on Jun. 27, 2025, which is a continuation of U.S. application Ser. No. 19/217,397, filed on May 23, 2025, which is a continuation-in-part of U.S. application Ser. No. 18/984,716, filed on Dec. 17, 2024, which is a continuation of U.S. application Ser. No. 18/923,352, filed on Oct. 22, 2024, issued as U.S. Pat. No. 12,276,454, which is a continuation-in-part of U.S. application Ser. No. 18/824,692, filed on Sep. 4, 2024, issued as U.S. Pat. No. 12,281,847, which is a continuation-in-part of U.S. application Ser. No. 18/386,918, filed on Nov. 3, 2023, issued as U.S. Pat. No. 12,215,925, which is a continuation-in-part of U.S. application Ser. No. 18/228,504, filed on Jul. 31, 2023, issued as U.S. Pat. No. 12,173,962, which is a continuation of U.S. application Ser. No. 17/134,492, filed on Dec. 27, 2020, issued as U.S. Pat. No. 11,713,924, which is a continuation of U.S. application Ser. No. 16/854,862, filed on Apr. 21, 2020, issued as U.S. Pat. No. 10,876,792, the disclosures of which are incorporated herein by reference in their entirety for all purposes. U.S. application Ser. No. 18/386,918 also claims priority to U.S. Provisional Application No. 63/422,838, filed Nov. 4, 2022, the disclosure of which is incorporated herein by reference in its entirety for all purposes.

TECHNICAL FIELD

Embodiments of the present disclosure generally relate to the repair of electronic devices, and to the repair of electronic devices that have been rendered at least partially inoperative due to moisture intrusion.

Embodiments of the present disclosure also generally relate to apparatuses and methods for drying electronics and non-electronic objects, particularly devices that are subject to high-humidity conditions of the human body such as hearing amplification electronics, smart watches, blood sugar detection meters, and electronic rings.

BACKGROUND OF THE DISCLOSURE

Electronic devices are frequently manufactured using ultra-precision parts for tight fit and-finish dimensions that are intended to keep moisture from entering the interior of the device. Many electronic devices are also manufactured to render disassembly by owners and or users difficult without rendering the device inoperable even prior to drying attempts. With the continued miniaturization of electronics and increasingly powerful computerized software applications, it is commonplace for people today to carry multiple electronic devices, such as portable electronic devices. Cell phones are currently more ubiquitous than telephone land lines, and many people, on a daily basis throughout the world, inadvertently subject these devices to unintended contact with water or other fluids. This occurs daily in, for example, bathrooms, kitchens, swimming pools, lakes, washing machines, or any other areas where various electronic devices (e.g., small, portable electronic devices) can be submerged in water or subject to high humid conditions. These electronic devices frequently have miniaturized solid-state transistorized memory for capturing and storing digitized media in the form of phone contact lists, e-mail addresses, digitized photographs, digitized music and the like.

Moreover, with the advent of the miniaturization of wireless transceiver electronics there has been an explosion of new types of devices that aid human beings in everyday life through the transmission of data. There have been significant strides in smart phone headsets, hearing aids, smart watches, and finger rings which are worn on the human body and all subjected to constant humidity bombardment, often in excess of 95% from the natural perspiration process that maintains human homeostasis.

In the case of hearables residing in the ear canal and over the ear, the desire is to have these devices weigh as little as possible and be durable. The combination of durability and light weight requires the assembly of these devices using the strongest plastics (e.g. ABS, polycarbonate, acrylic) which all have the undesired property of being hygroscopic, or readily absorbing water. This property causes significant moisture uptake within hearables due to the constant evaporation of perspiration with the device resting on the skin.

In addition, rechargeable batteries are the preferred method of powering such devices and are often encased within the device which is constantly absorbing water. This leads to unintentional battery shorts and the premature draining of the batteries.

Some wearable devices, such as hearing aids, use sophisticated micro-mechanical electronic mechanisms (MEMs) and diaphragms for the microphones. Heat and vacuum pressure can have a deleterious effect on these components and therefore, a new type of drying system is required.

Some embodiments of hearable dryers and personal electronic device dryers described herein incorporate desiccant blocks as moisture absorbers and use a form of heat to increase the vaporization rate. Such dryers' designs include a lid for trapping vapor so that the desiccant block absorbs moisture trapped by the lid and limit the humidity in the interior of the dryer and thereby maintains low humidity and a dry condition for the device inside the dryer. For effective desiccation and operation of such dryers, there is a need for reliable measurements of the desiccant block's moisture content. Unless the moisture content is reliably measured, the moisture content of the desiccant block will eventually reach that of ambient air, saturating the desiccant block and rendering it ineffective. Moreover, continuing to heat the interior of the dryer while the desiccant block is saturated will generate a "micro-sauna" environment and counteract any vaporization of the moisture content of the device contained within the interior of the dryer. Such "micro-sauna" environments and resulting counterproductive effects on the drying cycle render the attempts to maintain a dry condition for the device inside the dryer futile.

When using dryers for personal electronic devices, users often have to choose between drying and charging their devices. As a result, manufacturers for such dryers have produced dryers with shorter drying cycles at the expense of effective desiccation and drying. However, such drying methods with shortened, heat-based drying cycles cannot reliably remove moisture from the electronic device being dried. Accordingly, there is a need for methods and apparatuses for both drying and charging electronic devices.

Due to recent advancements in battery storage capacity and the convenience of rechargeability, there is a greater percentage of hearables (hearing aids, wireless earbuds) and wearables that incorporate rechargeable batteries. In almost all instances, both hearing aids and wireless earbuds alike are sold with a charging case which provides a convenient way to both store and charge the devices. The charging cases are small for portability and traveling and contain rechargeable batteries themselves. This permits the user to charge the devices through the case which itself is also charged using standard USB charge cords. This dual-charging technique has been adopted ubiquitously in the industry, with manufacturers touting increased charging capacities of the charger itself. In almost all instances, these charging cases contain a pocket for hearing aid dome storage, custom earmold storage, or some type of cleaning kit. Hearing aid and wireless earbud manufacturers produce these charging cases with close tolerances to keep the devices protected. Although these charging cases are not airtight, they do provide an environmental enclosure which could be expanded to fit an integrated desiccant. When these storage/charging cases are carried in a user's pocket, handbag, or backpack, the charging/storage case itself can be a repository for absorbed moisture which in-turn creates a local micro-environment for the hearing aid or earbuds. This micro-environment can have a negative effect on the sound quality as there exists no opportunity for drying.

If a user has an unintended water peril presumably fishing, boating, swimming, or otherwise in a home shower, they have little choice but to travel to retail stores and get the smart phone vacuum dried. Most of the smart phones manufactured today have very water-tight seals and although not waterproof, they tend to be water-resistant except for the speaker, microphone, and power receptacle. More advanced phones will prevent charging due to this water present at the charge port, but this has little advantage for a person in remote locations or in need of charging immediately.

When a consumer has an accidental water peril such as dropping their phone in a commode, walking into a shower with hearing aids in their ears, or washing their wireless hearables through a washing machine, they immediately think of burying the device in a bag of rice. Although rice is a good natural desiccant, the ability for rice to dry is widely variable and indeterminate. Rice, sitting in a somewhat uncontrolled grocery store environment, has an inherent natural humidity value having been sitting on a shelf in a non-airtight bag. Through experimentation, this humidity of rice sitting on a shelf varies between 40% and 60%. In addition, if rice is ultimately used to dry a water-periled device, there exists no way to tell if any or all the water has been removed from the device. Consumers are left to guess if their device is dry after 2 hours, 2 days, or 2 weeks.

Hearing aid and wireless hearables are marketed and sold with charging cases that normally reside in a user's home e.g. ambient conditions. These ambient conditions can vary tremendously, with some users desiring higher temperatures and humidities likely with age. These charging cases, being fabricated from strong, yet hygroscopic plastics, themselves become a repository for moisture. Moreover, these same charging cases, particularly small wireless earbuds are often kept in users' pants pockets. The proximity to the human body, which is constantly perspiring to maintain homeostasis, bombards the wireless earbud charging case with moisture. Thus, the very enclosure designed to protect and charge the wireless earbuds or hearing aids now becomes a mechanism that transfers moisture into the earbuds or hearing aids. At best, the hearing aids and earbuds reach a "humidity equilibrium" almost always governed by the charging case itself.

A desired set of features that provide an exemplary method of drying would include a completely isolated/airtight enclosure for the entire charging case itself, a charging jack for the charging case, a technique to generate ultra-low (5-25%) humidity at room temperatures, a dimmable display for nighttime use, an indication of endpoint drying, a regenerative means to eliminate or reduce a consumable, and a removable subassembly that can be conveniently sealed in a pouch for travel purposes.

Still other features may include a smaller, pocket-sized drying method with a reusable endpoint drying indicator and a detachable drying medium such as silica dioxide or molecular sieve desiccants that have a high adsorption of water.

SUMMARY OF THE DISCLOSURE

At least one of the embodiments described herein includes an apparatus and method having features that provide a better, more consistent treatment for the removal of water/perspiration in wearable electronic devices. Any embodiment's elements or features described herein may be combined with another embodiment's elements or features.

One embodiment includes providing a drying chamber for receiving an electronic device in the drying chamber, wherein at least one air valve is configured to engage the drying chamber, wherein at least one sensor is positioned with respect to the at least one air valve, wherein at least one exhaust channel is configured to be engaged by the at least one air valve, wherein at least one moisture-absorbing substance is connected to the at least one air valve, wherein at least one pressure-generating device is connected to the at least one air valve, wherein at least one controller is connected to at least one of the at least one air valve, the at least one pressure-generating device, and the at least one moisture-absorbing substance, wherein at least one computing device provides instructions for the at least one controller; initiating, using the at least one controller, based on a first instruction received from the at least one computing device, a calibration process, wherein the calibration process comprises: positioning or maintaining, using the at least one controller, the at least one air valve in a calibration position, wherein, in the calibration position, the at least one air valve disengages or continues to disengage from the drying chamber, generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device, sensing, using the at least one sensor, a first moisture-based parameter of the second airflow, and executing, using the first moisture-based parameter, a first computation, thereby producing a first computation result based on a first condition; in response to the first computation result meeting the first condition: initiating, using the at least one controller, based on a second instruction received from the at least one computing device, a regeneration process, wherein the regeneration process comprises: positioning or maintaining, using the at least one controller, the at least one air valve in a regeneration position, wherein, in the regeneration position, the at least one air valve engages or continues to engage the at least one exhaust channel, drying the at least one moisture-absorbing substance, generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel, sensing, using the at least one sensor, a second moisture-based parameter of the third airflow, and executing, using the second moisture-based parameter, a second computation, thereby producing a second computation result based on a second condition; and in response to the second computation result not meeting the second condition: re-initiating, using the at least one controller, based on the second instruction received from the at least one computing device, the regeneration process until the second computation result meets the second condition.

Another embodiment further comprises, in response to the second computation result meeting the second condition: storing, using the at least one computing device, the second computation result, and initiating, using the at least one controller, based on a third instruction received from the at least one computing device, a drying process, wherein the drying process comprises: positioning or maintaining, using the at least one controller, the at least one air valve to a drying position, wherein, in the drying position, the at least one air valve engages or continues to engage with the drying chamber, thereby creating a closed loop for air flow, generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device, sensing, using the at least one sensor, a third moisture-based parameter of the fourth airflow, and executing, using the third moisture-based parameter, a third computation, thereby producing a third computation result based on a third condition; and in response to the third computation result not meeting the third condition: re-initiating, using the at least one controller, based on the third instruction received from the at least one computing device, the drying process until the third computation result meets the third condition.

Another embodiment further entails, wherein the at least one sensor comprises an input sensor and an output sensor, wherein the fourth airflow comprises a fourth input airflow and a fourth output airflow, wherein the fourth input airflow impinges on the input sensor and the fourth output airflow impinges on the output sensor, wherein the third moisture-based parameter comprises a third input moisture-based parameter and a third output moisture-based parameter, wherein the third input-moisture-based parameter is produced by the input sensor and the third output moisture-based parameter is produced by the output sensor, wherein the third computation comprises comparing the third input moisture-based parameter and the third output moisture-based parameter, wherein the third condition comprises the third input moisture-based parameter and the third output moisture-based parameter being substantially equal.

Another embodiment further entails, wherein the third condition comprises the third input moisture-based parameter and the third output moisture-based parameter having a percentage difference less than 1% difference.

Another embodiment further comprising, in response to the first computation result not meeting the first condition, initiating, using the at least one controller, based on the third instruction received from the at least one computing device, the drying process; and in response to the third computation result not meeting the third condition: re-initiating, using the at least one controller, based on the third instruction received from the at least one computing device, the drying process until the third computation result meets the third condition.

Another embodiment further entails, wherein the first computation comprises comparing the first moisture-based parameter to a threshold, wherein the first condition comprises the first moisture-based parameter being greater than the threshold, wherein the second computation comprises comparing the second moisture-based parameter to the threshold, wherein the second condition comprises the second moisture-based parameter being less than or equal to the threshold.

Another embodiment further entails, wherein the threshold is substantially equal to 20% relative humidity, wherein drying the at least one moisture-absorbing substance comprises heating the at least one moisture-absorbing substance, wherein positioning the at least one air valve comprises rotating the at least one air valve, wherein the at least one air valve is further configured to permit rotation, wherein the at least one air valve rotates into multiple positions, wherein the at least one air valve utilizes a rack system for rotating, wherein the rack system utilizes a pinion gear to rotate the at least one air valve, wherein the at least one air valve is coupled with a printed circuit board.

Another embodiment further entails, wherein the printed circuit board comprises: the at least one sensor; one or more openings, thereby permitting air flow impingement on the at least one sensor; a microcontroller; a motor driver; a fan driver; a heater control circuit; one or more optical reflective sensors; and one or more hall effect sensors.

Another embodiment further entails, wherein at least one gear assembly connects the at least one air valve to the drying chamber, wherein the at least one gear assembly comprises a subminiature type N20 gearmotor, wherein at least one moisture-absorbing subassembly comprises the at least one moisture-absorbing substance and the at least one pressure-generating device, wherein the at least one moisture-absorbing subassembly is outside the drying chamber, wherein the at least one moisture-absorbing subassembly is further configured to create a closed loop for air flow when engaged with the drying chamber, wherein the drying chamber utilizes an elastomeric seal, wherein the drying chamber utilizes a twist-lock system, wherein the at least one air valve is manufactured with elastomeric material, wherein the pressure comprises static pressure of at least 0.1 inch $H_2O$ and at most 0.3 inch $H_2O$, wherein the moisture-absorbing substance produces dry air with relative humidity of at least 5% and no more than 20%, wherein the moisture-absorbing substance is able to withstand a temperature of at least 190 degrees F. and no more than 225 degrees F., wherein the first airflow, the second airflow, the third airflow, and the fourth airflow have a flow rate of at least 2 CFM and no more than 4 CFM, wherein the first air path, the second air path, and the fourth air path have a temperature substantially equal to room ambient temperature, wherein the second airflow, the third airflow, the fourth airflow have a humidity less than 20% relative humidity as it leaves the at least one moisture-absorbing substance.

Another embodiment comprising: a drying chamber, for receiving an electronic device; at least one air valve, wherein the at least one air valve is configured to engage the drying chamber; at least one sensor, wherein the at least one sensor is positioned with respect to the at least one air valve; at least one exhaust channel, wherein the at least one exhaust channel is configured to be engaged by the at least one air valve; at least one moisture-absorbing substance, wherein the at least one moisture-absorbing substance is connected to the at least one air valve; at least one pressure-generating device, wherein the at least one pressure-generating device is connected to the at least one air valve; at least one controller, wherein the at least one controller is connected to at least one of the at least one air valve, the at least one pressure-generating device, and the at least one moisture-absorbing substance; and at least one computing device, wherein the at least one computing device provides the at least one controller a first instruction configured to execute a calibration process, a second instruction configured to execute a regeneration process, and a third instruction configured to execute a drying process, wherein the calibration process comprises: positioning or maintaining, using the at least one controller, the at least one air valve in a calibration position, wherein, in the calibration position, the at least one air valve disengages or continues to disengage from the drying chamber, generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device, sensing, using the at least one sensor, a first moisture-based parameter of the second airflow, and executing, using the first moisture-based parameter, a first computation, thereby producing a first computation result based on a first condition, wherein the regeneration process comprises: positioning or maintaining, using the at least one controller, the at least one air valve in a regeneration position, wherein, in the regeneration position, the at least one air valve engages or continues to engage the at least one exhaust channel, drying the at least one moisture-absorbing substance, generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel, sensing, using the at least one sensor, a second moisture-based parameter of the third airflow, and executing, using the second moisture-based parameter, a second computation, thereby producing a second computation result based on a second condition, wherein the drying process comprises: positioning or maintaining, using the at least one controller, the at least one air valve to a drying position, wherein, in the drying position, the at least one air valve engages or continues to engage with the drying chamber, thereby creating a closed loop for air flow, generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device, sensing, using the at least one sensor, a third moisture-based parameter of the fourth airflow, and executing, using the third moisture-based parameter, a third computation, thereby producing a third computation result based on a third condition.

Another embodiment further entails, wherein the at least one sensor comprises an input sensor and an output sensor, wherein the fourth airflow comprises a fourth input airflow and a fourth output airflow, wherein the fourth input airflow impinges on the input sensor and the fourth output airflow impinges on the output sensor, wherein the third moisture-based parameter comprises a third input moisture-based parameter and a third output moisture-based parameter, wherein the third input-moisture-based parameter is produced by the input sensor and the third output moisture-based parameter is produced by the output sensor, wherein the third computation comprises comparing the third input moisture-based parameter and the third output moisture-based parameter, wherein the third condition comprises the third input moisture-based parameter and the third output moisture-based parameter being substantially equal.

Another embodiment further entails, wherein the third condition comprises the third input moisture-based parameter and the third output moisture-based parameter having a percentage difference less than 1% difference, wherein the calibration process further comprises: in response to the first computation result not meeting the first condition: initiating, using the at least one controller, based on the third instruction received from the at least one computing device, the drying process; and in response to the third computation result not meeting the third condition: re-initiating, using the at least one controller, based on the third instruction received from the at least one computing device, the drying process until the third computation result meets the third condition.

Another embodiment further entails wherein the first computation comprises comparing the first moisture-based parameter to a threshold, wherein the first condition comprises the first moisture-based parameter being greater than the threshold, wherein the second computation comprises comparing the second moisture-based parameter to the threshold, wherein the second condition comprises the second moisture-based parameter being less than or equal to the threshold, wherein the threshold is substantially equal to 20% relative humidity, wherein drying the at least one moisture-absorbing substance comprises heating the at least one moisture-absorbing substance, wherein positioning the at least one air valve comprises rotating the at least one air valve, wherein the at least one air valve is further configured to permit rotation, wherein the at least one air valve rotates into multiple positions, wherein the at least one air valve utilizes a rack system for rotating, wherein the rack system utilizes a pinion gear to rotate the at least one air valve, wherein the at least one air valve is coupled with a printed circuit board.

Another embodiment further entails, wherein the printed circuit board comprises: the at least one sensor; one or more openings, thereby permitting air flow impingement on the at least one sensor; a microcontroller; a motor driver; a fan driver; a heater control circuit; one or more optical reflective sensors; and one or more hall effect sensors.

Another embodiment further entails, wherein at least one gear assembly connects the at least one air valve to the drying chamber, wherein the at least one gear assembly comprises a subminiature type N20 gearmotor, wherein at least one moisture-absorbing subassembly comprises the at least one moisture-absorbing substance and the at least one pressure-generating device, wherein the at least one moisture-absorbing subassembly is outside the drying chamber, wherein the at least one moisture-absorbing subassembly is further configured to create a closed loop for air flow when engaged with the drying chamber, wherein the drying chamber utilizes an elastomeric seal, wherein the drying chamber utilizes a twist-lock system, wherein the at least one air valve is manufactured with elastomeric material, wherein the pressure comprises static pressure of at least 0.1 inch $H_2O$ and at most 0.3 inch $H_2O$, wherein the moisture-absorbing substance produces dry air with relative humidity of at least 5% and no more than 20%, wherein the moisture-absorbing substance is able to withstand a temperature of at least 190 degrees F. and no more than 225 degrees F., wherein the first airflow, the second airflow, the third airflow, and the fourth airflow have a flow rate of at least 2 CFM and no more than 4 CFM.

Another embodiment further entails, wherein the first air path, the second air path, and the fourth air path have a temperature substantially equal to room ambient temperature, wherein the second airflow, the third airflow, the fourth airflow have a humidity less than 20% relative humidity as it leaves the at least one moisture-absorbing substance.

Another embodiment comprises: at least a first airtight drying chamber; a rotary air valve; a gearmotor; a pressure-generating device; a moisture-absorbing substance; a computer control means; a dryer assembly, the dryer rotary valve is fabricated to permit multiple rotational ports in a single polymeric valve, wherein the air tight drying chamber utilizes an elastomeric seal of between 7 and 20 inches in circumferential length, wherein the air tight drying chamber utilizes a twist-lock mechanism, wherein the rotary air valve is 100% molded from an elastomeric material, wherein the rotary air valve can have a number of air flow switching ports during rotation, wherein the rotary air valve incorporates a rack mechanism to provide rotational force, wherein the rotary air valve rack mechanism utilizes a pinion gear to rotate the rotary valve, wherein the rotary air valve is mated to a printed circuit board, wherein the printed circuit board contains a microcontroller, a motor driver, a fan driver, humidity sensors, a heater control circuit, hall effect and/or optical reflective sensors, wherein the printed circuit board contains through holes to permit air flow impingement on humidity sensors, wherein the gearmotor is a subminiature type N20 with a torque rating of between 1 and 20 inch ounces, wherein the pressure-generating device produces at least 0.1 inch $H_2O$ and not more than 0.3 inch $H_2O$ of static pressure, wherein the pressure-generating device produces static pressure within a closed loop air flow path for drying purposes, wherein the moisture-absorbing substance produces dry air with relative humidity of between 5% and 20% using desiccant, wherein the moisture-absorbing substance is heated to at least 190 F and not more than 225 F to dry desiccant material.

In some embodiments, drying and charging are contemplated as complementary processes wherein the electronic device is dried and charged simultaneously in an optimal temperature-controlled environment to achieve a fully charged and dried device. A drying chamber such as a desiccant-based drying chamber previously described can be optimized with temperature control for maximum moisture absorbency and higher charging efficiency. In a preferred embodiment, an overmolded heat transfer plate with thermal conductivity of at least 200 W/mK is placed on any of the plurality of surfaces of a sealed drying chamber to provide a conductive, thermal energy transfer medium. A thermoelectric module of at least 20 W is placed on the exterior of the overmolded heat transfer plate. The thermoelectric module can be biased in either direction: the module may allow heating on the exterior side of the module and cooling on the interior side of the module, and, once polarity reversed, it may allow cooling on the exterior side and heating on the interior side. Further, a silicone thermal insulating layer of approximately 0.125" to 0.375" in thickness surrounds the thermoelectric module and covers the overmolded heat transfer plate, providing a thermal insulating layer between heated and cooled surfaces. A thermal heat sink with thermal resistance of less than 6° C./W is mounted on the exterior of the thermoelectric module using thermal epoxy or known heat sink compound paste. A 2 CFM-10 CFM pressure generator, with dimensions corresponding with those of the exterior heat sink, is placed at the proximal or distal end of the exterior heat sink. The pressure generator collects and moves ambient air across the exterior heat sink to dissipate heat generated by the thermoelectric module. The ambient air carries heat from the exterior heat sink and exhausts it into the ambient environment.

In another preferred embodiment, an interior heat sink sized similarly to the exterior heat sink has thermal resistance of less than 6° C./W. The interior heat sink is mounted with thermal epoxy or thermally conductive paste onto the interior side of the overmolded heat transfer plate. The interior heat sink is fabricated with a fin pitch in a range between 0.20" and 0.25" and a height in the range between 0.5" and 1". The fin pitch permits molecular sieve or silica gel beads to fit within the heat sink fins and allows the beads to conductively absorb thermal energy from interior heat sink fins. The interior heat sink further houses 5-500 grams of desiccant beads which reside within the cooling fins of the interior heat sink. A 2 CFM-10 CFM pressure generator with dimensions corresponding with those of the interior heat sink is mounted at the proximal or distal end of the interior heat sink. The interior heat sink collects and moves ambient air across the interior heat sink and the desiccant residing within the cooling fins. The interior heat sink controls the temperature of the desiccant and maintains it between 60° F. and 77° F. The temperature control provides optimum moisture absorbency in the desiccant as ambient air is moved across the desiccant from the interior pressure generator. As a result, the ambient air is cooled and dried, and the cool, dry air is introduced into the drying chamber. This drying cycle using chilled, dried air is repeated.

In preferred embodiments, drying and charging times are controlled by software timers. Once the drying and charging times are complete, the electronic device being dried and charged is disconnected from the charging circuit and removed from drying chamber. Thereafter, a reverse process is initiated to reactivate or regenerate the desiccant. Desiccant reactivation or regeneration occurs when the controller for the dryer reverses thermoelectric module polarity, wherein the exterior heat sink is cooled and the interior heat sink, hence the desiccant, is heated. The interior pressure generator's operational speed is reduced to minimize heat dissipation in the interior heat sink, thus permitting the interior heat sink temperature to remain between 190° F. and 225° F. Such temperature control provides the necessary thermal energy to reactivate, regenerate, and/or bake the desiccant for continued, repeated use.

In some embodiments, desiccant packets used for travel include a technique to gauge the level of dryness of the desiccant packet other than an indicator which changes color with the level of moisture present. Further, in some embodiments, a travel accessory or charging case with an integrated desiccant is provided which can provide the user an indication of moisture absorption effectiveness. Some embodiments of drying solutions for smart phones utilize vacuum dryers located at wireless retail stores. These dryers are considered capital equipment and are expensive costing in the thousands of dollars. Some embodiments of portable drying rescue kits provide an indication of when a smart phone is in a condition that it can be used and/or charged without damage to the phone itself.

In some embodiments, an accessory kit for hearing aid and wireless earbuds is contemplated which can be housed inside a charging case or is integrated into said charging case. At least one relative humidity sensor is integrated with a microcontroller, rechargeable battery, Light-Emitting Diode ("LED") indicator and/or display, desiccant, tactical switch, and charge port. Rechargeable battery can be separate or integrated into charging case rechargeable battery. In preferred embodiments, at one relative humidity sensor is mounted to a printed circuit board and is in proximity to 2-10 grams of desiccant material. In some embodiments, a second relative humidity sensor is mounted on the opposite side of said printed circuit board and is subjected to ambient air only. Microcontroller samples relative humidity sensors and compares the resultant values. Resultant comparison humidities provide data to permit microcontroller to drive an LED array or display for indication purposes. In some embodiments, LED array can be a LED bar graph, a LED in a plurality of colours (e.g. red, yellow, or green) for dryness indication. In other preferred embodiments, display can be a printed liquid crystal (LCD) type. In some embodiments, printed circuit board with said components can be sealed within a small accessory enclosure that contains 2-10 grams of desiccant as is designed to fit inside hearing air or wireless earbud charging case. A relative humidity sensor is mounted in such a manner as to only measure the ambient air outside of said accessory case, or micro-environment air inside a charging case. A secondary humidity sensor, which is segregated from the first humidity sensor, measures the local air inside the accessory case. Accessory case has a plurality of vent holes which allow desiccant to absorb moisture inside the hearing aid case or wireless earbud case. With a button press, microcontroller samples humidity sensors and computes the difference in humidity. When the difference in the humidity sensor values is greater than 25%, the desiccant is still absorbing effectively, and microcontroller indicates with a display, a bar-graph LED, or green LED. If the difference in the humidity sensor values is 10%-24%, the desiccant is still absorbing moisture but less effectively, and microcontroller indicates with a display, a bar-graph LED, or yellow LED. If the difference in the humidity sensor values is less than 10%, the desiccant is barely absorbing (almost saturated), and microcontroller indicates with a display, a bar-graph LED, or red LED. With respect to a measurement of less than 10% the desiccant has reached an absorptive limit and must be reactivated. In some embodiments, microcontroller can be put to "sleep" and triggered to sample the ambient air environment upon opening said charging case. This triggering event allows microcontroller to compute relative humidity values and automatically display result without a button press.

In preferred embodiments, the accessory kit can be configured as an emergency drying kit for personal electronic devices. At least one relative humidity sensor is integrated with a microcontroller, rechargeable battery, LED indicator and/or display, desiccant, tactical switch, and charge port. In preferred embodiments, at one relative humidity sensor is mounted to a printed circuit board and is in proximity to 2-10 grams of desiccant material. In some embodiments, a second relative humidity sensor is mounted on the opposite side of said printed circuit board and is subjected to ambient air only. Emergency drying kit is packaged inside a resealable mylar pouch whose size is suitable for a large smart phone. In some embodiments, the amount of desiccant can be increased above 10 grams (e.g. 15-30 grams) and this configuration can be used in larger resealable pouches for tablets and the like. Mylar pouch is an airtight food-storage type with a transparent front cover to permit a user to visually see emergency kit display or LED indicating lights.

In some embodiments, when a user has a water peril (shower, swimming pool, etc.), said user presses the start button through the sealed pouch cover. User opens the seal on the resealable mylar pouch and deposits the personal electronic device in the pouch together with the emergency accessory and reseals pouch. The microcontroller, which sampled the relative humidity sensors with the button push to record initial humidities, begins to sample ambient relative humidity sensor which is now the micro-environment inside of the mylar pouch and the humidity sensor mounted in proximity of the desiccant. As water vapor transfer occurs, ambient relative humidity sensor value diminishes while the humidity in proximity to the desiccant begins to rise. These humidities converge and reach a steady state with a range of 7-12% over approximately 2-5 hours. Microcontroller indicates through strobing of red, yellow, or green LEDs to use through clear cover on mylar pouch. Once final steady state humidity is achieved and both humidity sensors are within 2%, the personal electronic device is dry. The user can remove the emergency accessory, recharge the battery though charge port and reactivate desiccant in a room temperature desiccant-based dryer.

In some embodiments, a desiccant filled cartridge is employed within an airtight drying chamber which, combined with a means to recirculate air, provides an ultra-low humidity environment (7-25%) which can be utilized to dry to an endpoint. The airtight chamber is equipped with a charging jack which powers and charges the device while inside the airtight chamber. Any personal electronic device, smart phone, wireless earbud case, hearing aid charging case, physical training trackers, smart watches, etc. can be charged and dried while within the airtight drying chamber. With the utilization of an airtight, desiccant cartridge receptacle within the airtight chamber, room temperature airflows can be controlled and precisely vectored using low volume air pumps over extremely efficient moisture adsorbing desiccant such as silica dioxide pellets or molecular sieve pellets.

A controller measures the relative humidity at the local desiccant environment while the airtight desiccant filled cartridge is within a receptacle. Simultaneously, the controller measures and compares the local airtight chamber humidity and modulates a low volume air pump to achieve an optimum airflow of between 0.1 and 5 Standard Cubic Feet per Hour (SCFH). These airflows, provide an ultra-low humidity air exchange which recirculates and is adsorbed into the outer surfaces of the desiccant pellets made from silica dioxide or molecular sieve. As the local airtight environment equilibrates due to the water/moisture transfer from the device or charging case giving up water vapor to the desiccant, the humidity sensor abutting the desiccant and the local airtight chamber humidity sensor values converge. This signifies endpoint drying and can be indicated on a display as "verified dry."

When the humidity sensor abutting the desiccant senses the humidity that is at or above 30%, a reactivation phase is initiated. This starts by heating local surface mount resistors that are sandwiched between the desiccant which is heated to 200-250° F. through conduction. With the incorporation of in-line umbrella air valves, the drying recirculation air loop can be effectively isolated, and a second air pump engaged. This second air pump intakes ambient air and vectors this across the desiccant cartridge still residing within the desiccant cartridge receptacle. This air is exhausted through an ambient air exhaust port. The adsorbed water in the desiccant is baked off and entrained within the exhaust air. This reactivation of the desiccant ranges between 1-4 hours and can be repeated 300-500 times without degradation to the desiccant. If a user desires to travel, they can remove the desiccant filled cartridge and store in a sealed pouch.

One embodiment comprises a method comprising: receiving a moisture-reducing apparatus in a drying chamber, wherein the drying chamber is sealable; generating, based on the receiving the moisture-reducing apparatus in the drying chamber, a first air flow through a first air channel connecting the drying chamber and the moisture-reducing apparatus, wherein: the moisture-reducing apparatus is at least partially comprised in the drying chamber, the drying chamber receives a portable electronic device holding a first moisture, and the moisture-reducing apparatus comprises at least one sensor enabled to determine a first humidity of a first air inside the drying chamber and outside the moisture-reducing apparatus and a second humidity of a second air inside the moisture-reducing apparatus; routing the first moisture from the portable electronic device to the moisture-reducing apparatus; determining, using the at least one sensor, the first humidity of the first air; determining, using the at least one sensor, the second humidity of the second air; executing, based on the first humidity and the second humidity, a first computing operation, thereby generating a first result; pausing, based on the first result, the routing the first moisture from the portable electronic device to the moisture-reducing apparatus; generating a second air flow, through a second air channel connecting the moisture-reducing apparatus and an exterior of the drying chamber, wherein the at least one sensor is enabled to determine a third humidity of a third air inside the moisture-reducing apparatus; routing the first moisture from the moisture-reducing apparatus to the exterior of the drying chamber; determining, using the at least one sensor, the third humidity; executing, based on the third humidity, a second computing operation, thereby generating a second result; and pausing, based on the second result, the routing the first moisture from the moisture-reducing apparatus to the exterior of the drying chamber.

According to some embodiments, at least one of: the first air flow is generated using a first air flow generator, thereby engaging a first valve and disengaging a second valve, or the second air flow is generated using a second air flow generator, thereby engaging the second valve and disengaging the first valve.

In other embodiments, engaging the first valve and disengaging the second valve causes the first air channel to become a closed-loop air channel.

In yet other embodiments, engaging the second valve and disengaging the first valve causes the second air channel to connect with an exterior of the drying chamber.

According to one embodiment, the second result comprises a relative humidity value.

In some cases, the first valve comprises a first umbrella valve and the second valve comprises a second umbrella valve.

In other cases, the at least one sensor comprises a first sensor and a second sensor, wherein the first sensor comprises a first relative humidity sensor and the second sensor comprises a second relative humidity sensor.

According to some embodiments, the method further comprises: indicating, with at least one visual indicator, the first result; and indicating, with the at least one visual indicator, the second result.

In other embodiments, the drying chamber further comprises a charger, wherein the charger is functional to charge the portable electronic device.

Another embodiment comprises an apparatus at least partially comprised in a drying chamber for drying an electronic device, the apparatus comprising: a moisture-reducing device, wherein the moisture-reducing device absorbs moisture from surrounding air, wherein the moisture-reducing device is received by a drying chamber, wherein, based on receiving the moisture-reducing device in the drying chamber, a first air flow is generated through a first air channel connecting the drying chamber and the moisture-reducing device, wherein the drying chamber is sealable; a printed circuit board providing a base for a first circuit and a second circuit, wherein: the first circuit comprises at least one sensor enabled to determine a first humidity of a first air, a second humidity of a second air, and a third humidity of a third air, wherein the first air is inside the drying chamber and outside the apparatus, wherein the second air is inside the apparatus, and the second circuit comprises a temperature-measuring device and one or more surface mount resistors enabled to heat the moisture-reducing device; at least one controller connected to or associated with at least one of: the first circuit and the second circuit; at least one computing device connected to the at least one controller to provide at least one instruction, wherein the at least one instruction is executable to: route a first moisture from an electronic device to the moisture-reducing device, determine, using the at least one sensor, the first humidity of the first air, determine, using the at least one sensor, the second humidity of the second air, execute, based on the first humidity and the second humidity, a first computing operation, thereby generating a first result, pause, based on the first result, the route the first moisture from the electronic device to the moisture-reducing device, route the first moisture from the moisture-reducing device to an exterior of the drying chamber, determine, using the at least one sensor, the third humidity of the third air, execute, based on the third humidity, a second computing operation, thereby generating a second result, and pause, based on the second result, the route the first moisture from the moisture-reducing device to the exterior of the drying chamber, and a first structure enclosing the moisture-reducing device and the printed circuit board, wherein: the first structure comprises a separator between the first air and the second air, and the first structure comprises a first aperture permitting the first air flow.

It is appreciated that, in one embodiment, at least one of: the first air flow is generated using a first air flow generator, thereby engaging a first valve and disengaging a second valve, or a second air flow is generated using a second air flow generator, thereby engaging the second valve and disengaging the first valve.

According to another embodiment, the at least one instruction is further executable to: indicate, with at least one visual indicator, the first result; and indicate, with the at least one visual indicator, the second result.

In some cases, the apparatus further comprises a second structure enabled to impermanently attach to the first structure, wherein the second structure comprises: a second aperture permitting the second air flow, and a trigger for activating the second circuit based on the at least one instruction.

According to one embodiment, the one or more surface mount resistors produce 2-7 Watts of power.

In another embodiment, the first structure enclosing the moisture-reducing device and the printed circuit board comprises at least partially transparent, polycarbonate housing.

According to yet another embodiment, the first result comprises a difference between the first humidity and the second humidity.

In still another embodiment, the second result comprises a relative humidity value.

According to some embodiments, the printed circuit board is configured to: indicate, with at least one visual indicator, the first result, and indicate, with the at least one visual indicator, the second result.

Yet another embodiment comprises an apparatus at least partially comprised in a drying chamber for drying an electronic device, the apparatus comprising: a moisture-reducing device, wherein the moisture-reducing device absorbs moisture from surrounding air, wherein the moisture-reducing device is received by a drying chamber, wherein, based on receiving the moisture-reducing device in the drying chamber, a first air flow is generated through a first air channel connecting the drying chamber and the moisture-reducing device, wherein the drying chamber is sealable; a printed circuit board providing a base for a first circuit and a second circuit, wherein: the first circuit comprises at least one sensor enabled to determine a first humidity of a first air and a second humidity of a second air, wherein the first air is inside the drying chamber and outside the apparatus, wherein the second air is inside the apparatus, and the second circuit comprises a temperature-measuring device and one or more surface mount resistors enabled to heat the moisture-reducing device; at least one controller connected to or associated with at least one of: the first circuit and the second circuit; at least one computing device connected to the at least one controller to provide at least one instruction, wherein the at least one instruction is executable to: route a first moisture from an electronic device to the moisture-reducing device, determine, using the at least one sensor, the first humidity of the first air, determine, using the at least one sensor, the second humidity of the second air, execute, based on the first humidity and the second humidity, a first computing operation, thereby generating a first result, and pause, based on the first result, the route the first moisture from the electronic device to the moisture-reducing device; and a first structure enclosing the moisture-reducing device and the printed circuit board, wherein: the first structure comprises a separator between the first air and the second air, and the first structure comprises a first aperture permitting the first air flow.

In some cases, the first air flow is generated using a first air flow generator, thereby engaging a first valve and disengaging a second valve.

In other cases, the at least one instruction is further executable to remove the first moisture from the moisture-reducing device.

Furthermore, according to one embodiment, removing the first moisture from the moisture-reducing device comprises: executing a heating operation, or using an air flow generator.

In some embodiments, at least one of: the at least one sensor comprises a first sensor and a second sensor, the first sensor is enabled to determine the first humidity of the first air, the second sensor is enabled to determine the second humidity of the second air, the first sensor or the second sensor is enabled to determine the second humidity of the second air, the second sensor is enabled to determine the third humidity of the third air, the first sensor or the second sensor is enabled to determine the third humidity of the third air, the determining, using the at least one sensor, the first humidity of the first air comprises determining, using the first sensor, the first humidity of the first air, the determining, using the at least one sensor, the second humidity of the second air comprises determining, using the second sensor, the second humidity of the second air, the determining, using the at least one sensor, the second humidity of the second air comprises determining, using the first sensor or the second sensor, the second humidity of the second air, the determining, using the at least one sensor, the third humidity comprises determining, using the second sensor, the third humidity of the third air, or the determining, using the at least one sensor, the third humidity comprises determining, using the first sensor or the second sensor, the third humidity of the third air.

According to other embodiments, the at least one instruction comprises a temperature control instruction or a humidity sensing instruction.

Furthermore, in some cases, the temperature control instruction comprises an instruction for maintaining a temperature range of 200-250° F.

In yet other embodiments, the separator comprises an overmolded, elastomeric seal.

One embodiment comprises a method comprising: receiving a moisture-reducing apparatus in a drying chamber, wherein the drying chamber is sealable, and wherein the drying chamber is over-molded or coated with a first material; generating, based on the receiving the moisture-reducing apparatus in the drying chamber, a first air flow through a first air channel connecting the drying chamber and the moisture-reducing apparatus, wherein: the moisture-reducing apparatus is at least partially comprised in the drying chamber, the drying chamber receives a portable electronic device holding a first moisture, and the moisture-reducing apparatus comprises at least one sensor enabled to determine a first humidity of a first air inside the drying chamber and outside the moisture-reducing apparatus and a second humidity of a second air inside the moisture-reducing apparatus; routing the first moisture from the portable electronic device to the moisture-reducing apparatus; determining, using the at least one sensor, the first humidity of the first air; determining, using the at least one sensor, the second humidity of the second air; pausing the routing the first moisture from the portable electronic device to the moisture-reducing apparatus; generating a second air flow, through a second air channel connecting the moisture-reducing apparatus and an exterior of the drying chamber, wherein the at least one sensor is enabled to determine a third humidity of a third air inside the moisture-reducing apparatus; routing the first moisture from the moisture-reducing apparatus to the exterior of the drying chamber; determining, using the at least one sensor, the third humidity; and pausing the routing the first moisture from the moisture-reducing apparatus to the exterior of the drying chamber.

According to some embodiments, the first material comprises a low Moisture Vapor Transmission Rate (MVTR) material.

Furthermore, in one embodiment, the low MVTR material comprises at least one of: thermoplastic polyamide urethane (TPU), a fluoropolymer, silicone, or polyethylene coating.

In other embodiments, the drying chamber comprises a substantially airtight drying case.

According to yet other embodiments, the drying chamber further comprises a charger, wherein the charger is functional to charge the portable electronic device.

In still other embodiments, the method further comprises: displaying, based on at least one of the first humidity, the second humidity, or the third humidity, a first indication.

It is appreciated that, in one embodiment, the moisture-reducing apparatus comprises a desiccant.

In some cases, the moisture-reducing apparatus is disposable or replaceable.

In other cases, the moisture-reducing apparatus is reactivatable.

Another embodiment comprises an apparatus at least partially comprised in a drying chamber for drying an electronic device, the apparatus comprising: a moisture-reducing device, wherein the moisture-reducing device absorbs moisture from surrounding air, wherein the moisture-reducing device is received by a drying chamber, wherein, based on receiving the moisture-reducing device in the drying chamber, a first air flow is generated through a first air channel connecting the drying chamber and the moisture-reducing device, wherein the drying chamber is sealable, wherein the drying chamber is over-molded or coated with a first material; a printed circuit board providing a base for a first circuit and a second circuit, wherein: the first circuit comprises at least one sensor enabled to determine a first humidity of a first air and a second humidity of a second air, wherein the first air is inside the drying chamber and outside the apparatus, wherein the second air is inside the apparatus, and the second circuit comprises a temperature-measuring device; at least one controller connected to or associated with at least one of: the first circuit and the second circuit; at least one computing device connected to or associated with the at least one controller to provide at least one instruction, wherein the at least one instruction is executable to: route a first moisture from an electronic device to the moisture-reducing device, determine, using the at least one sensor, the first humidity of the first air, determine, using the at least one sensor, the second humidity of the second air, and pause the route the first moisture from the electronic device to the moisture-reducing device.

In one embodiment, the second circuit further comprises one or more surface mount resistors enabled to heat or reactivate the moisture-reducing device.

According to another embodiment, the pause the route the first moisture from the electronic device to the moisture-reducing device is based on the first humidity and the second humidity.

In yet another embodiment, the at least one instruction comprises a temperature control instruction or a humidity sensing instruction.

According to still another embodiment, the at least one instruction is further executable to remove the first moisture from the moisture-reducing device.

In some cases, at least one of: the moisture-reducing device comprises a desiccant, the moisture-reducing device is disposable or replaceable, or the moisture-reducing device is reactivatable, or the first material comprises a low Moisture Vapor Transmission Rate (MVTR) material.

Yet another embodiment comprises a method comprising: receiving a moisture-reducing apparatus in a drying chamber, wherein the drying chamber is coated or over-molded with a first material; generating, based on the receiving the moisture-reducing apparatus in the drying chamber, a first air flow through a first air channel connecting the drying chamber and the moisture-reducing apparatus, wherein: the moisture-reducing apparatus is at least partially comprised in the drying chamber, the drying chamber receives a portable electronic device holding a first moisture, and the moisture-reducing apparatus comprises at least one sensor enabled to determine a first humidity of a first air inside the drying chamber and outside the moisture-reducing apparatus and a second humidity of a second air inside the moisture-reducing apparatus; routing the first moisture from the portable electronic device to the moisture-reducing apparatus; determining, using the at least one sensor, the first humidity of the first air; determining, using the at least one sensor, the second humidity of the second air; pausing the routing the first moisture from the portable electronic device to the moisture-reducing apparatus; generating a second air flow, through a second air channel connecting the moisture-reducing apparatus and an exterior of the drying chamber, wherein the at least one sensor is enabled to determine a third humidity of a third air inside the moisture-reducing apparatus; routing the first moisture from the moisture-reducing apparatus to the exterior of the drying chamber; determining, using the at least one sensor, the third humidity; and pausing the routing the first moisture from the moisture-reducing apparatus to the exterior of the drying chamber.

In some embodiments, at least one of: the first material comprises a low Moisture Vapor Transmission Rate (MVTR) material, or the low MVTR material comprises at least one of: thermoplastic polyamide urethane (TPU), a fluoropolymer, silicone, or polyethylene coating.

According to other embodiments, at least one of: the moisture-reducing apparatus comprises a desiccant, the moisture-reducing apparatus is disposable or replaceable, or the moisture-reducing apparatus is reactivatable.

In yet other embodiments, the method further comprises removing the first moisture from the moisture-reducing apparatus.

According to still other embodiments, the first humidity comprises a first relative humidity, the second humidity comprises a second relative humidity, and the third humidity comprises a third relative humidity.

BRIEF DESCRIPTION OF THE DRAWINGS

Some of the figures shown herein may include dimensions or may have been created from scaled drawings. However, such dimensions, or the relative scaling within a figure, are by way of example only, and not to be construed as limiting the scope of this disclosure.

DESCRIPTION OF THE ILLUSTRATED EMBODIMENTS

Figure 1:
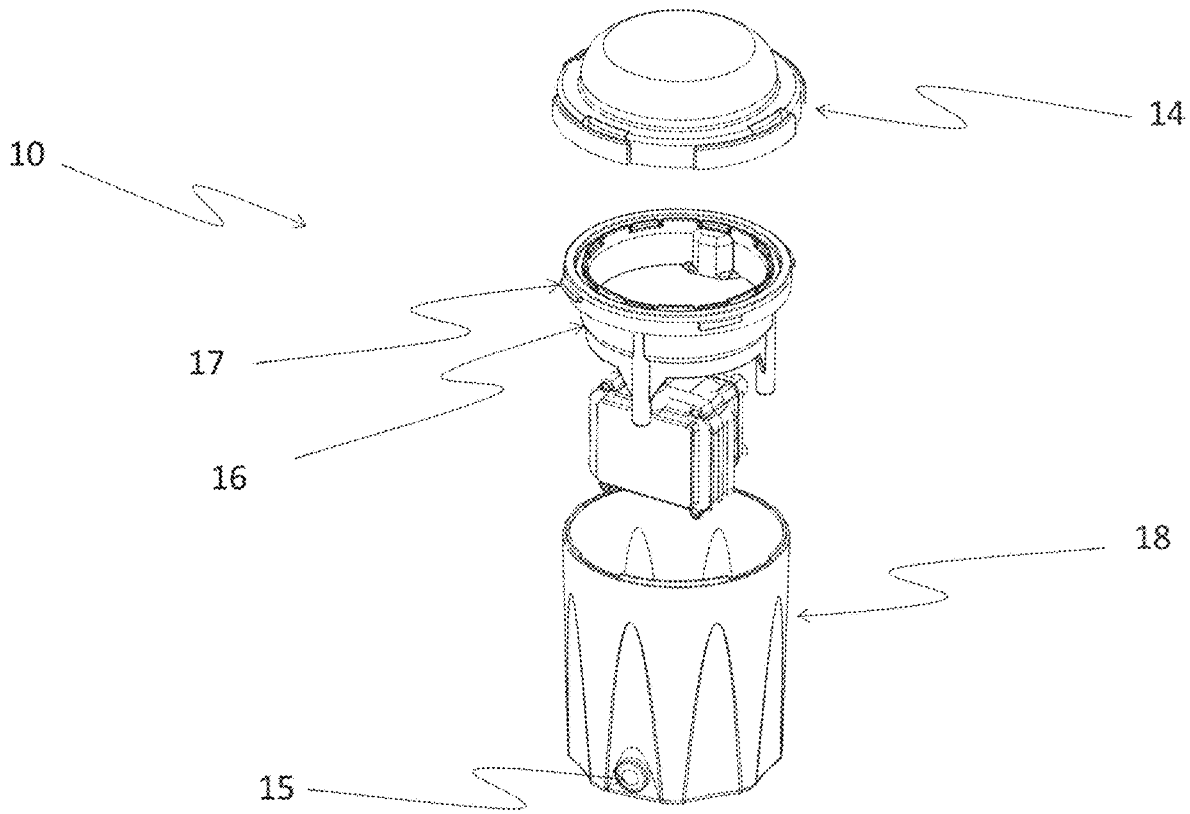
FIG. 1 shows an exploded perspective view of a dryer.

In some embodiments, an airtight enclosure is employed to store a drying apparatus together with a pair of hearing aids, cochlear implant, or wireless earbuds. Under a static airflow condition, water vapor transfer occurs over time, with the water vapor transfer phase and drying endpoint being identifiable with indicating LED's.

In other embodiments, a hearing aid/hearable case itself is airtight with a low (e.g., very low) MVTR and has an integrated and replaceable desiccant cartridge or the like, which can be replaced and reactivated in a low (e.g., ultra-low) humidity environment or baked out in a heated enclosure.

In further embodiments, another set of features that provide an isolated (e.g., at least partially isolated) drying environment for hearables, cochlear implants, and hearing aids is an airtight case with similar features as an eyeglass case. The airtight case could be lined and/or coated and/or overlayed and/or laminated with a low Moisture Vapor Transmission Rate (MVTR) silicone rubber or other materials which could be over-molded on the interior or exterior of the case and would provide an airtight seal at the case edge. This airtight drying case could be fabricated to house reactivatable desiccant cartridges which would be stored next to or near the device that had absorbed moisture. Yet another method would be a rechargeable or non-rechargeable hearing aid/hearable case lined and/or coated and/or overlayed and/or laminated with a material (e.g., low MVTR material) and completely airtight, with a replaceable desiccant cartridge that could be swapped out and reactivated, thus having a low humidity (e.g., ultra-low humidity) environment with minimal (e.g., zero, little, etc.) discarded desiccant inside a hearing aid or wireless hearable case.

In some embodiments, a low MVTR material provides a barrier (e.g., a hydrophobic barrier) to reduce (e.g., drastically reduce, strongly reduce, substantially reduce, etc.) transmission of vapor. Furthermore, in some cases, the barrier may prevent or at least partially prevent transmission of vapor (e.g., ambient vapor) into sealed environments, such as those associated with embodiments described herein. In other embodiments, an over-molded process comprises a post injection molding process whereby a molded plastic part is fixtured into tooling, with an elastomeric material being dispensed under pressure to any or all features of the molded plastic part. According to yet other embodiments, an over-molded process comprises applying and/or adhering a material coating to a part (e.g., a plastic part) using heat and/or pressure.

Methods and apparatuses for drying electronic devices and non-electronic objects are disclosed. Embodiments include methods and apparatuses that utilized a closed-loop air path. Some embodiments control the amount of dry air that is impinged on an electronic device and non-electronic objects that holds moisture. In such embodiments, the dry air that is statically pressurized. Still other embodiments include, using an air valve that is configured to rotate and coupled with a printed circuit board, to switch between multiple plenums. In such embodiments, the air valve is rotated in response to instructions configured to execute a calibration process, drying process, or regeneration process. Further still, in such embodiments, the instructions are provided in response to feedback provided by one or more sensors to control the moisture absorption occurring within a closed loop.

For the purposes of promoting an understanding of the principles of the disclosure, reference is made to selected embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in detail, although it will be apparent to those skilled in the relevant art that some features or some combinations of features may not be shown for the sake of clarity.

Any reference to "disclosure" within this document is a reference to an embodiment of a family of disclosures, with no single embodiment including features that are necessarily included in all embodiments, unless otherwise stated. Furthermore, although there may be references to "advantages" provided by some embodiments of the present disclosure, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include devices and equipment generally used for drying materials using dry air. Embodiments include methods and apparatuses for drying electronic devices that have been subjected to high humidity conditions. At least one embodiment provides a pressure-generating device within a closed air path where static pressure generated by the pressure-generating device creates an airflow through a moisture-absorbing substance, an air valve, and a drying chamber, thereby subjecting an electronic device housed in the drying chamber to dry air. The pressure-generating device, moisture-absorbing substance, and air valve may be in various sizes. In some embodiments, the air valve's ports may be 25 mm in diameter. The drying chamber may further be in various sizes and also compatible with multiple sizes of pressure-generating devices, moisture-absorbing substances, and air valves. In some embodiments the drying chamber can be comparable in size to a suitcase. The closed air path may be further provided by a sealed drying chamber. In some embodiments, a multi-positional air valve, including but not limited to rotary or sliding air valves, may permit various stages or modes in drying materials. Embodiments may utilize various power sources including but not limited to 12V DC power sources found in vehicles such as cars, boats, or recreational vehicles.

Further embodiments of the present disclosure include advantages of drying with desiccants at room or lower temperatures while providing charging at the same time. It is known in the art that desiccants have continued and maximized absorption rates at room or lower temperatures. This thermally quiescent condition prevents a desiccant from releasing rather than absorbing moisture. Meanwhile, due to environmental concerns of disposable batteries and state-of-the-art rechargeable battery technology, most personal electronic devices employ rechargeability. To maintain a safe recharging condition, rechargeable batteries incorporate a charge controller for monitoring battery temperature. As the charge controller allows more charge current, the battery temperature increases. The charge controller measures or detects the increase in temperature and reduces the charge current accordingly. This allows a safe, albeit lengthy, charging cycle. In preferred embodiments, battery charging efficiency is maximized by providing room temperature (or lower) environmental charging at the same time as drying. Such charging efficiency can result in increased battery life, increased battery capacity, and decreased charging frequencies. Drying the device while also charging it decreases any potential electromigration or unintended growth of shorts due to copper migrations resulting from the presence of moisture and voltage.

FIG. 1 shows a perspective front view of a first exemplary embodiment of a dryer 10, with chamber lid 14, drying chamber subassembly 16, lower housing 18, and start-stop switch 15. In some embodiments, start stop switch 15 can be a tactical feel membrane switch with integrated LEDs for dryer condition visual feedback (e.g. calibration, regeneration, or drying modes). Chamber lid 14 and drying chamber subassembly 16 are mated together through twist-lock features 17.

Figure 2:
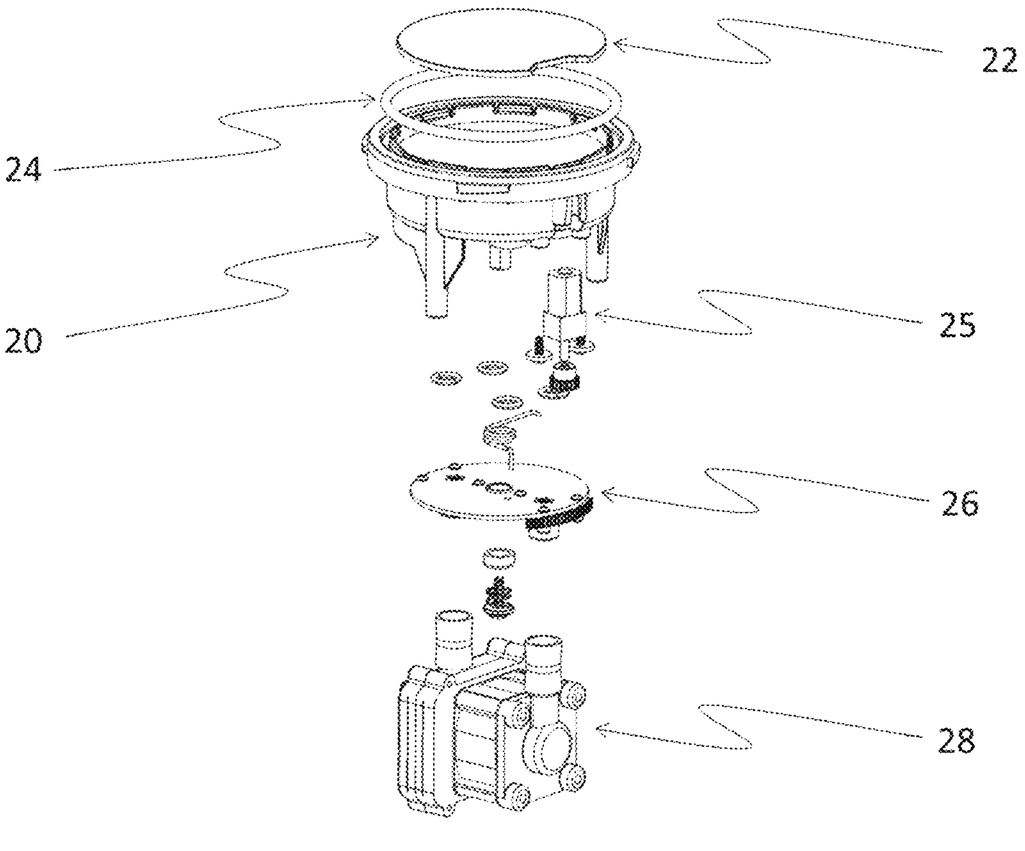
FIG. 2 shows an exploded perspective view of the main components of a dryer.

As best shown in FIG. 2, chamber 20 utilizes chamber O-ring 24 to seal against chamber lid 14 of FIG. 1. Bypass seal plate 22 is firmly attached to the interior bottom of chamber 20 using ultrasonic welding, plastic glue, or equivalent. Gearmotor 25 which is mounted to chamber 20 is depicted with air valve and sensor subassembly 26 together with pressure-generating device and moisture-absorbing substance subassembly 28.

Figure 3:
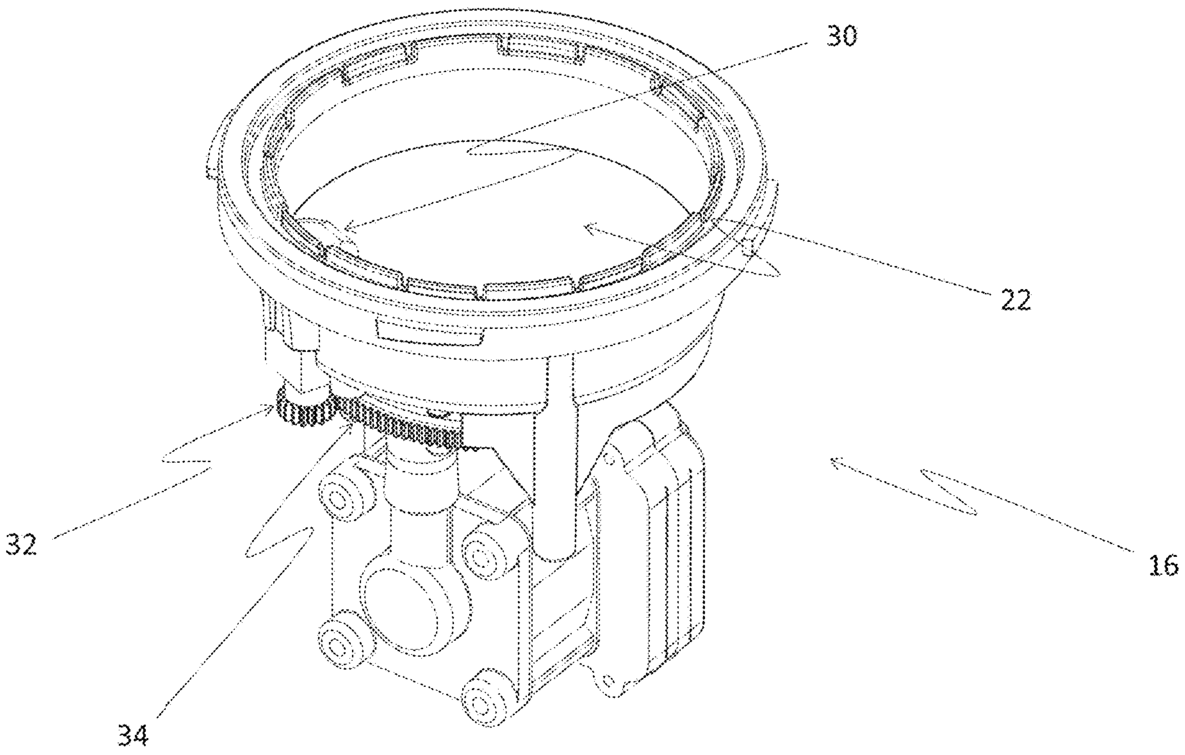
FIG. 3 shows a top perspective view of a drying chamber subassembly and a pressure-generating device subassembly of a dryer of FIG. 1.

Referring now to FIG. 3, drying chamber subassembly 16 of FIG. 1 is shown with bypass seal plate 22, gearmotor mounting pocket 30, pinion gear 32, and valve pinion rack 34. Pinion gear 32 is permanently mounted to output shaft of gearmotor 25 of FIG. 2 and is mated with valve pinion rack 34. Gearmotor 25, when powered, can provide rotational force onto valve pinion rack 34 and therefore translate valve pinion rack 34 into rotational movement.

Figure 4:
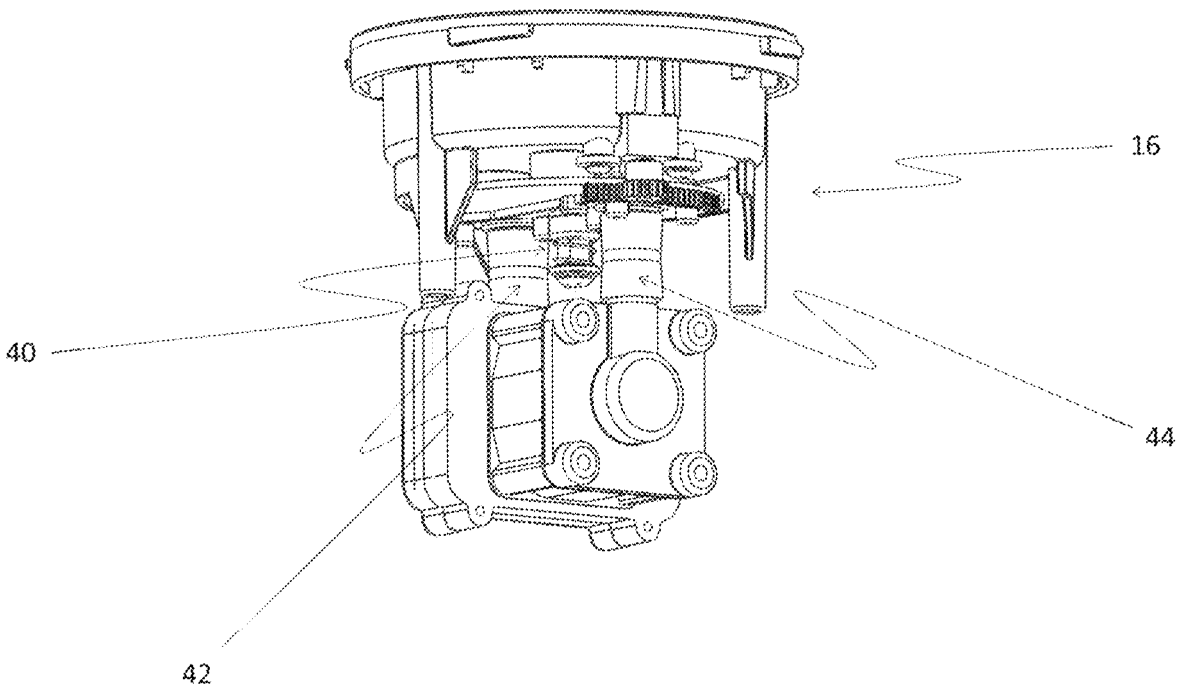
FIG. 4 shows a bottom perspective view of a drying chamber subassembly and a pressure-generating device subassembly of a dryer of FIG. 1.
Figure 5:
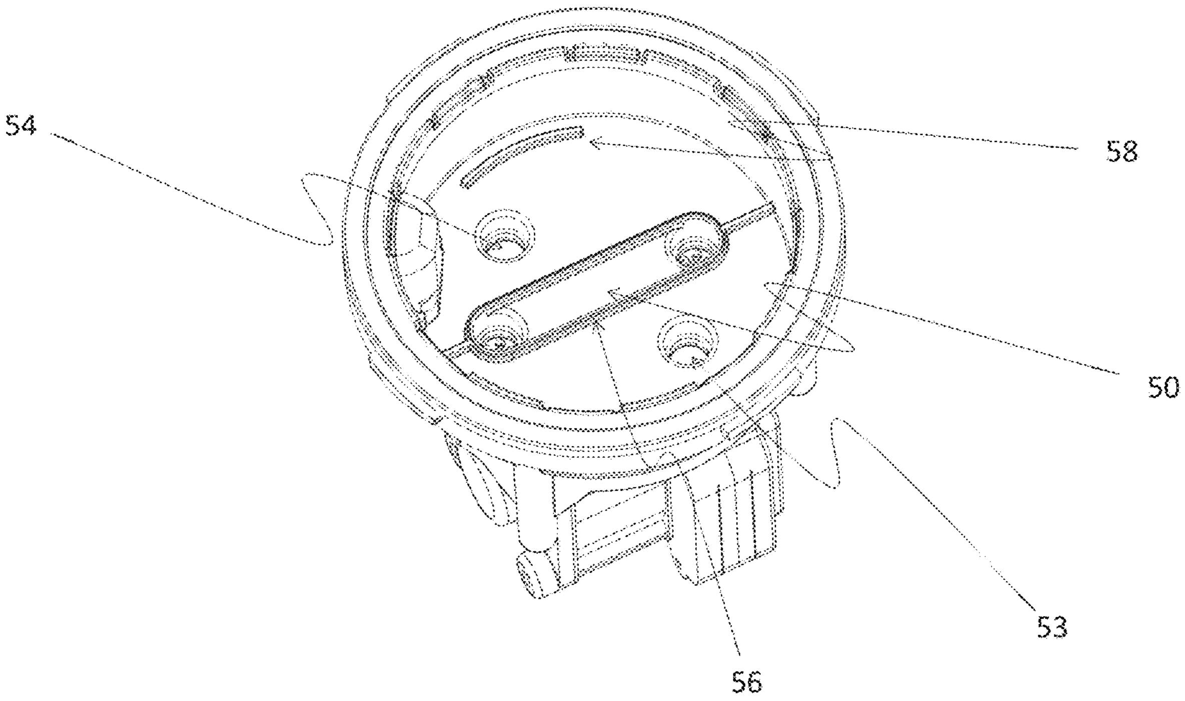
FIG. 5 shows a top perspective view of a drying chamber contemplated in a dryer.

FIG. 4 which is a bottom perspective view of drying chamber subassembly 16 of FIG. 2 is shown with center pivot point 40, negative pressure plenum 44 and positive pressure plenum 42. Negative pressure plenum 44 together with positive pressure plenum 42 provide air flow means to chamber 20 of FIG. 2. As best shown in FIG. 5, chamber 20 is depicted with bypass channel 50, input port 53, and output port 54. Bypass channel 50 incorporates a raised circumferential edge 56 to allow bypass sealing plate 22 of FIG. 3 to seal against this feature. Conversely, input port 53 and output port 54 are recessed below raised circumferential edge 56 to allow unrestricted air flow. Raised support ribs 58 provide support features for bypass sealing plate 22 to rest on without impeding air flow to input port 53 and output port 54.

Figure 6:
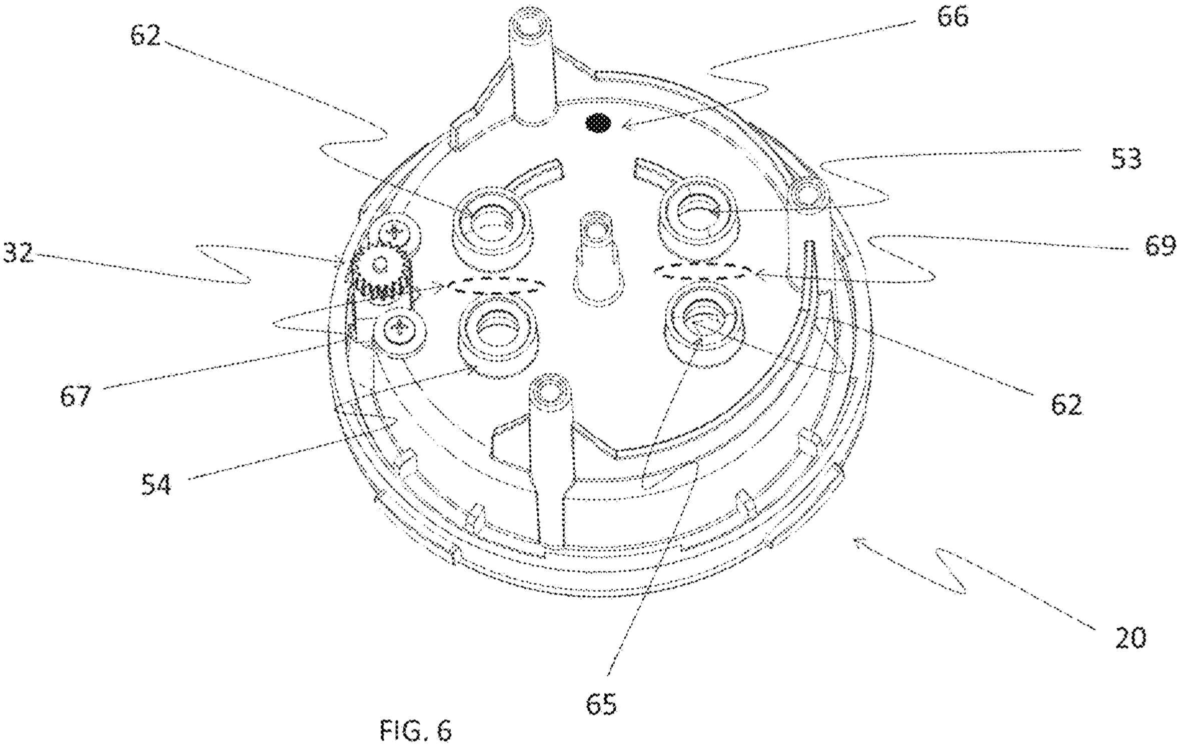
FIG. 6 shows a bottom perspective view of a drying chamber contemplated in a dryer.

As best shown in FIG. 6, chamber 20 is depicted from the bottom side showing bypass channel ports 62 together with input port 53 and output port 54 of FIG. 5. Position location magnet or optical signal reflection rivet 66 is permanently mounted into chamber 20 and provides a magnetic field or optical reflective surface for position sensing. Bypass channel ports 62, input port 53 and output port 54 are all recessed to permit the mounting of sealing O-rings 65. Sealing O-rings 65 are slightly proud of recessed ports to provide a compliant air-tight seal to any planar surface resting on them with some level of force applied on the planar surface. Non-ported areas 67 and 69 allow for airflow between bypass channel ports 62 and input port 53 and output port 54.

Figure 7:
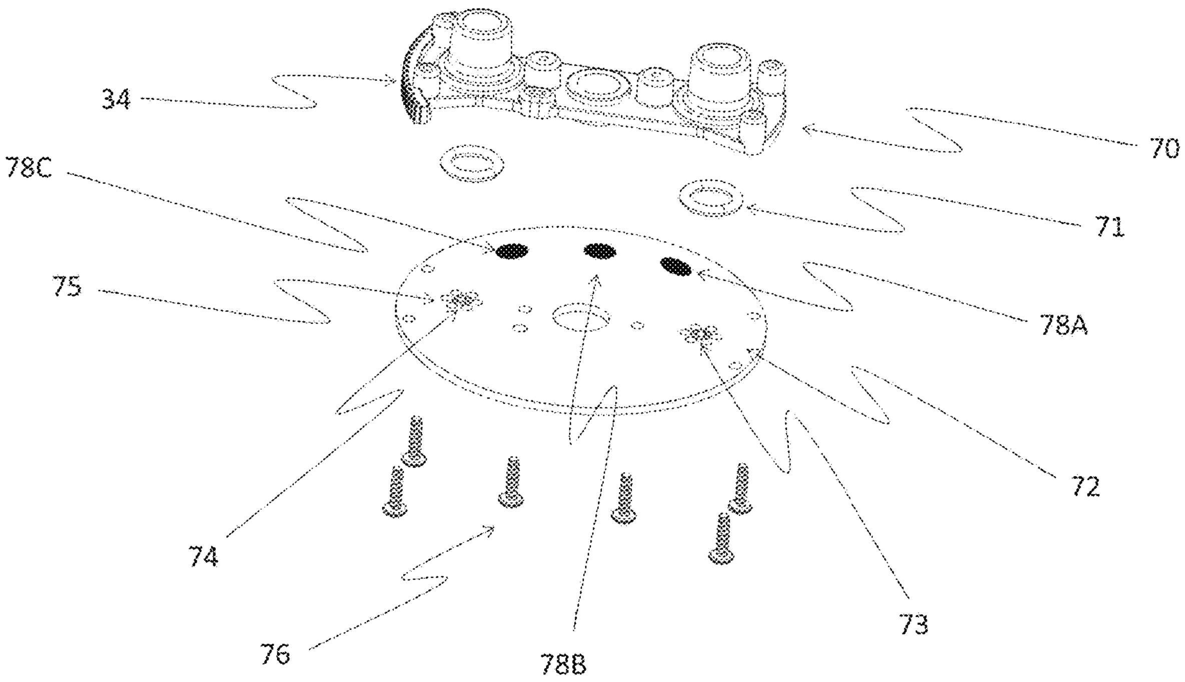
FIG. 7 depicts an exploded isometric top view of an air valve and sensor subassembly in a dryer.

Referring now to FIG. 7, rotary valve 70 is depicted with valve pinion rack 34 of FIG. 3. Rotary valve 70 captivates sealing O-rings 71 against sensor control board 72 and is fastened together with fasteners 76. Sensor control board 72 contains hall effect or optical reflective sensors 78A, 78B, and 78C and output port humidity sensor 74 and input port humidity sensor 73. Through holes 75 surround input port humidity sensor 73 and output port humidity sensor 74 such that airflow can impinge onto humidity sensors 73 and 74 and flow through input port 53 and output port 54 of FIG. 6. The compressive force imparted onto sealing O-rings 71 through fasteners 76 compressing rotary valve 70 and sensor control board 72 results in an airtight seal between sensor control board 72 and rotary valve 70. Although not shown, the underside of rotary valve 70 can have recessed pockets for sealing O-rings 71 similar to the recessed pockets of FIG. 6.

Figure 8:
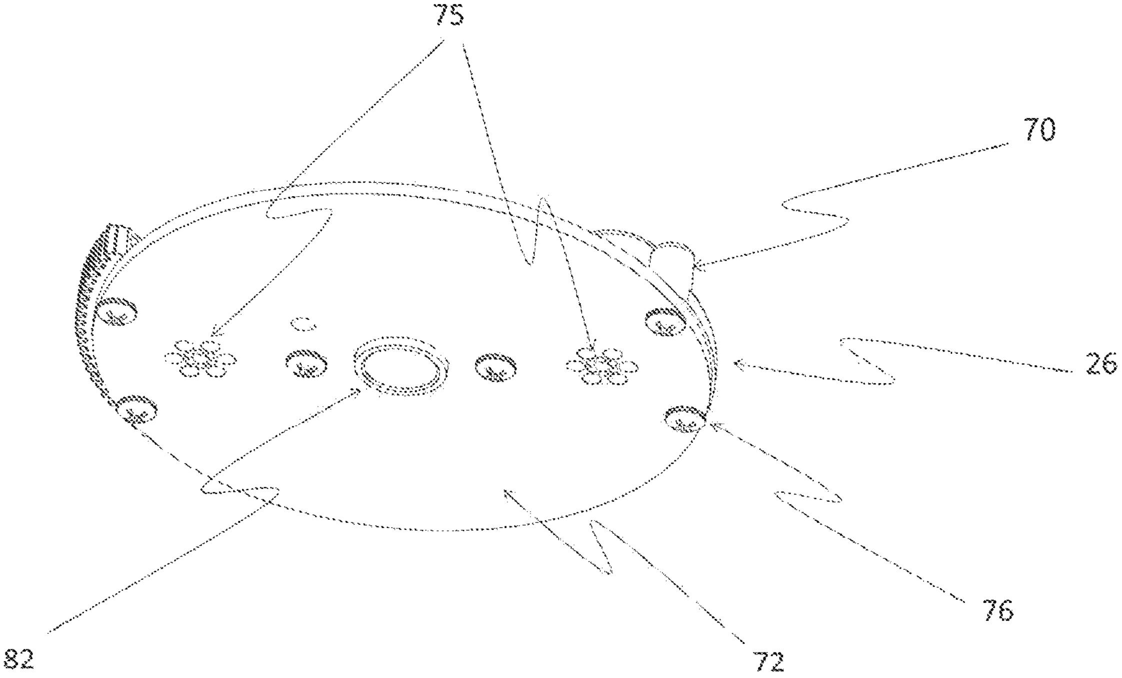
FIG. 8 depicts an isometric bottom view of an air valve and sensor subassembly in a dryer.
Figure 9:
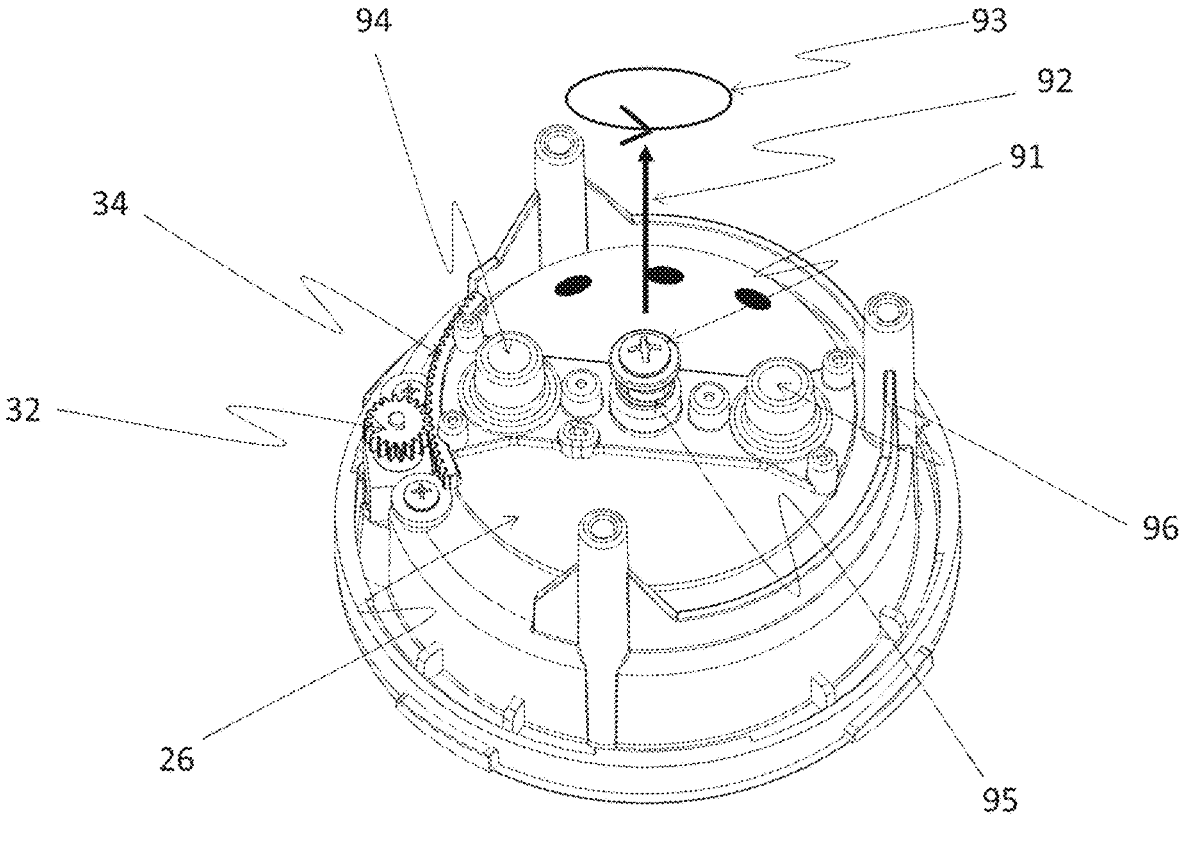
FIG. 9 depicts an exploded isometric bottom view of an air valve and sensor subassembly attached to a drying chamber in a dryer.

As best shown in FIG. 8, the underside of sensor control board 72 is mechanically attached to rotary valve 70 using fasteners 76. Center through hole 82 is used to provide a rotational center point for air valve and sensor subassembly 26. FIG. 9 depicts air valve and sensor subassembly 26 mounted to chamber 20 via captivating fastener 91 and spring 95. Captivating fastener 91 can be a screw, nut, or press-on captivation washer. Spring 95 provides necessary force to air valve and sensor subassembly 26 to allow control sensor board 72 to seal against sealing O-rings 65 of FIG. 6. Pinion gear 32 which mates with valve pinion rack 34 provides a moment about axis 92 and develops rotary motion 93. Valve input port 94 and valve output port 96 allows a means to impinge on input port humidity sensor 73 and output port humidity sensor 74 of FIG. 7.

Figure 10A:
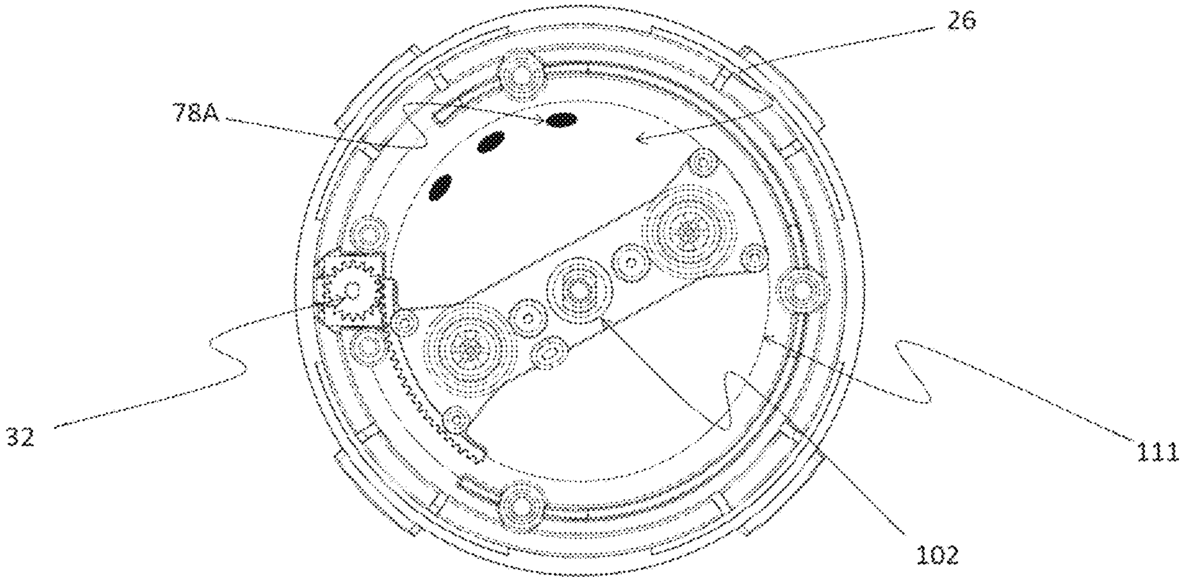
FIG. 10A depicts a bottom view of an air valve and sensor subassembly attached to a drying chamber in a calibration position in a dryer.
Figure 10B:
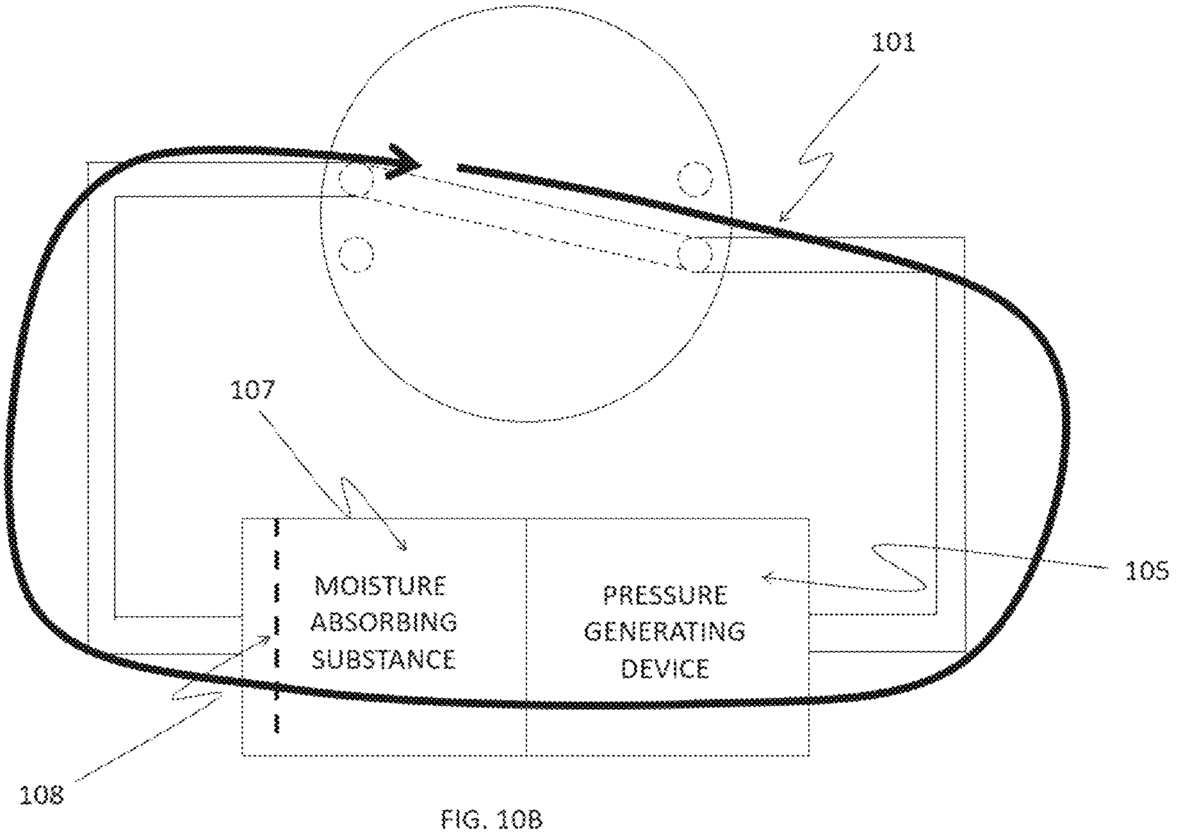
FIG. 10B depicts the air flow when an air valve and sensor subassembly attached to a drying chamber is in the calibration position in the dryer of FIG. 10A.
Figure 10C:
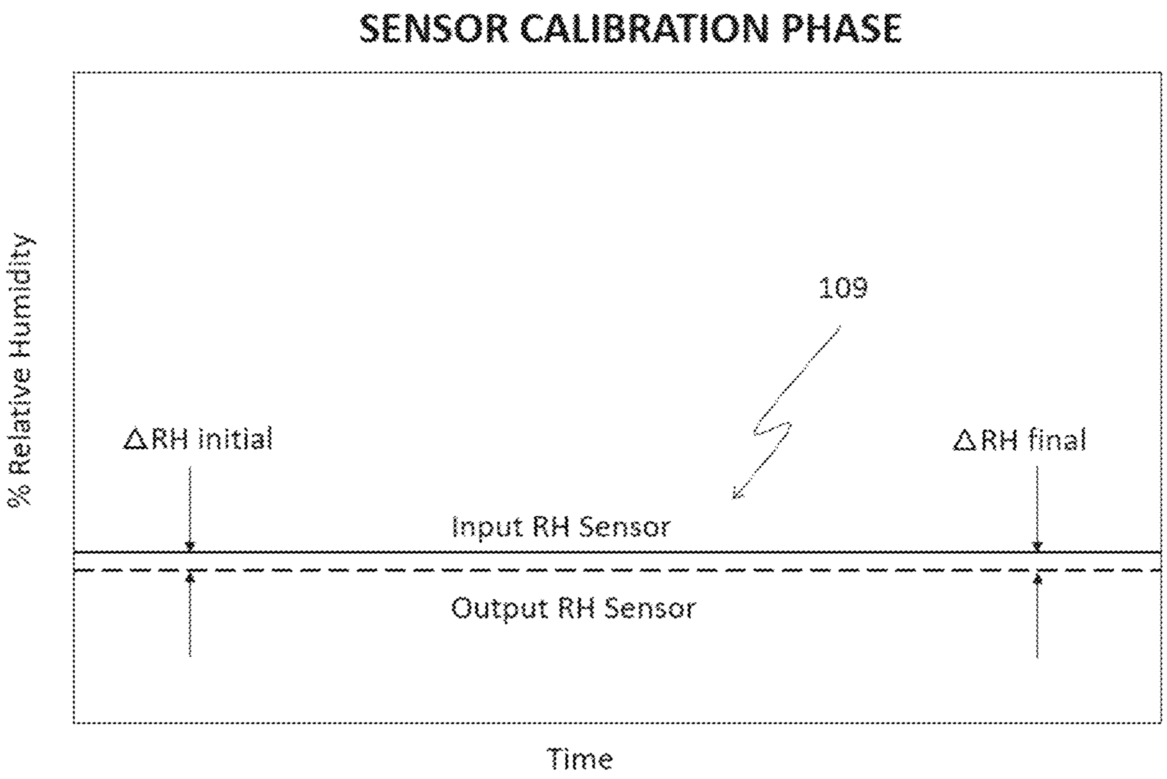
FIG. 10C depicts typical relative humidity response curves for relative humidity sensors during a calibration phase when an air valve and sensor subassembly attached to a drying chamber is in the calibration position in the dryer of FIG. 10A.

FIG. 10A depicts air valve and sensor subassembly 26 in the two and eight o-clock position (111) such that bypass channel 50 of FIG. 5 which is sealed using bypass seal plate 22 of FIG. 3 provides airflow across input port humidity sensor 73, through bypass channel 50, and across output port humidity sensor 74. This position is controlled by the rotation of gearmotor 25 of FIG. 2, pinion gear 32 and valve pinion rack 34 of FIG. 3 and calibration hall effect sensor or optical reflective sensor 78A which is aligned with position location magnet or optical signal reflection rivet 66 of FIG. 6 and electronically locates air valve and sensor subassembly 26 under computer control. Airflow path 101 of FIG. 10B is now engaged via pressure-generating device 105 which pushes air through moisture-absorbing substance 107. Airflow path 101 produces calibration humidity response curves 109 depicted in FIG. 10C which allows for baseline humidity calculation values for input and output humidity sensors 73 and 74 of FIG. 7. Due to airtight, closed loop drying, these readings are stored in microcontroller memory as a baseline micro-environment calibration starting point and therefore desired drying ending point for closed loop device drying.

Figure 11A:
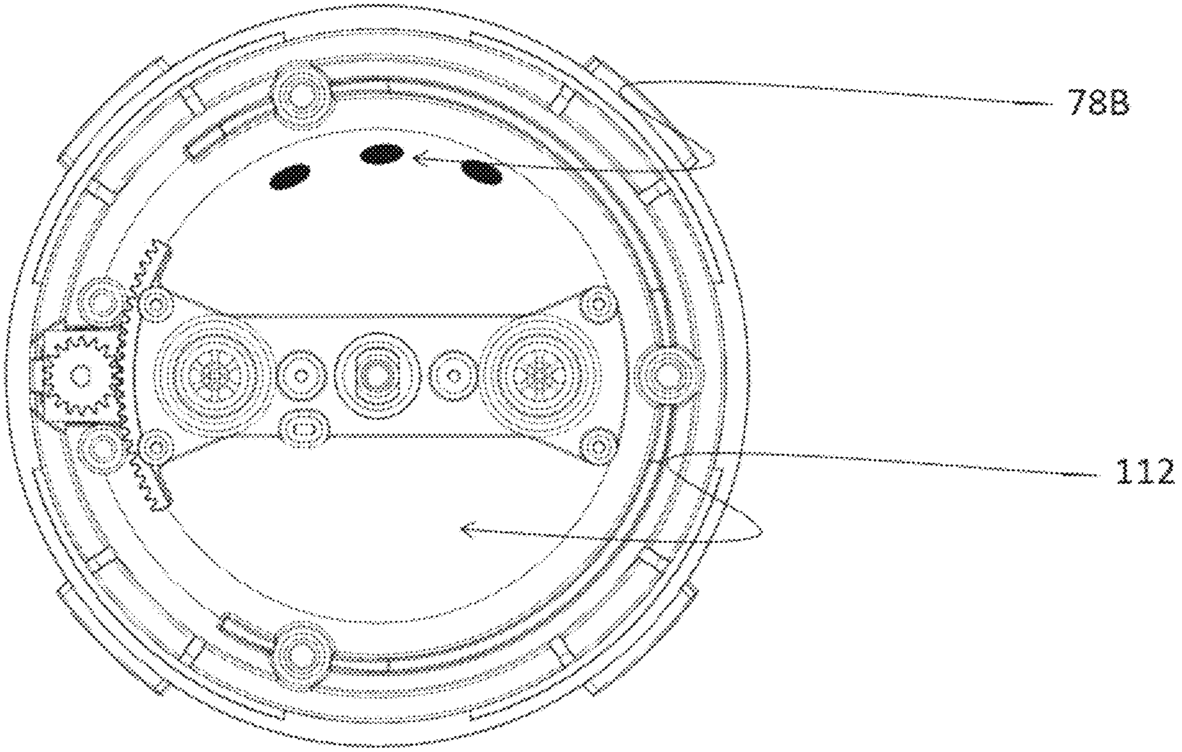
FIG. 11A depicts a bottom view of an air valve and sensor subassembly attached to a drying chamber at a regeneration position in a dryer.
Figure 11B:
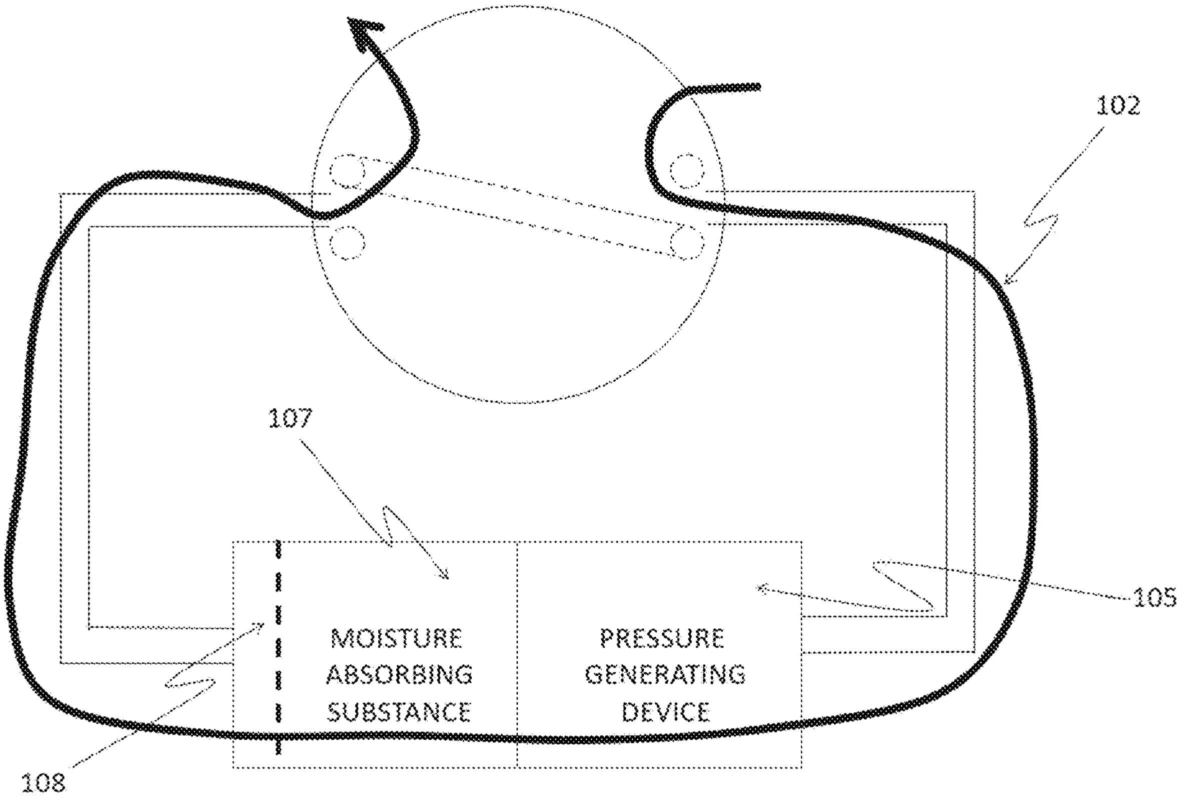
FIG. 11B depicts the air flow with an air valve and sensor subassembly attached to a drying chamber at the regeneration position in the dryer of FIG. 11A.
Figure 11C:
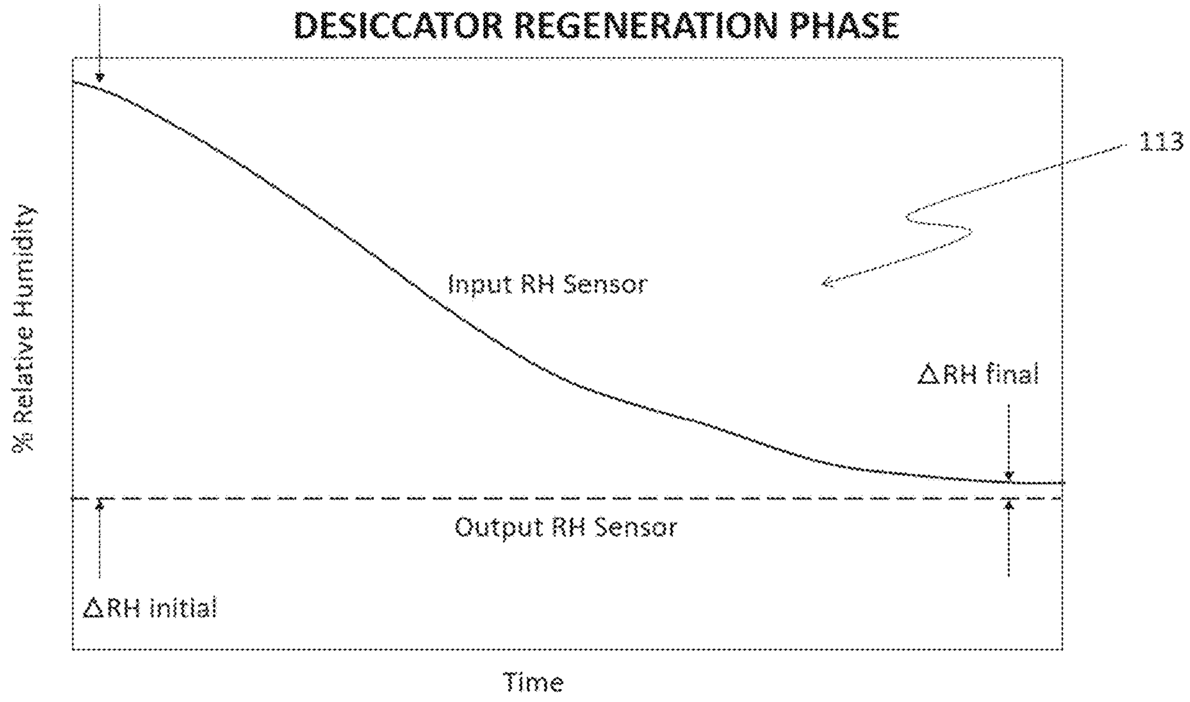
FIG. 11C depicts typical relative humidity response curves for relative humidity sensors during a desiccator regeneration phase when an air valve and sensor subassembly attached to a drying chamber is at the regeneration position in the dryer of FIG. 11A.

FIG. 11A depicts air valve and sensor subassembly 26 in the three and nine o-clock position (112) which is the desiccant regeneration position. In the three and nine o-clock position, the air valve and sensor subassembly 26 are positioned such that through holes 75 of FIG. 8 are directly in-between bypass channel ports 62, input port 53 and output port 54 of FIG. 6. This provides an air valve and sensor subassembly 26 position which disengages flow to the airtight chamber altogether. Air flow path 102 depicted in FIG. 11B flows through non-ported exhaust channel 67 and non-ported input channel 69 of FIG. 6 and between bypass channel ports 62 and input port 63 and output port 64. Air flows across input port humidity sensor 73, through non-ported exhaust channel 67 and non-ported input channel 69 and across output port humidity sensor 74. The three and nine o-clock position is controlled by regen hall effect sensor or optical reflective sensor 78B which is aligned with position location magnet or optical signal reflection rivet 66. Again, referring to FIG. 11B, airflow path 102 is now engaged via pressure-generating device 105 which pushes moisture laden air through moisture-absorbing substance 107 being baked by perforated desiccant heater 108. Airflow path 102 ensures moisture laden air being sampled on input port humidity sensor 73 response is compared to output port humidity sensor 74 response and continues a baking sequence until input port humidity sensor 73 response converges to output port humidity sensor 74 response. FIG. 11C depicts example relative humidity response curves for humidity sensors during a desiccator regeneration phase (e.g., when an air valve and sensor subassembly attached to a drying chamber is at the regeneration position in the dryer of FIG. 11A).

Figure 12A:
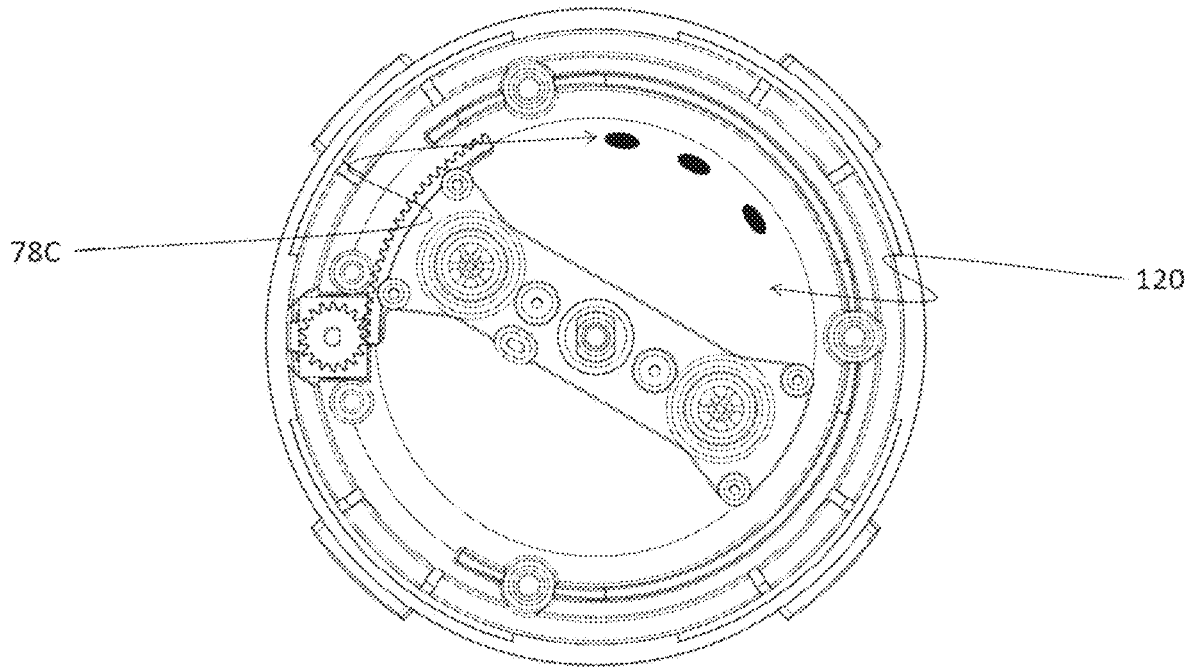
FIG. 12A depicts a bottom view of an air valve and sensor subassembly attached to a drying chamber at a drying position in a dryer.
Figure 12B:
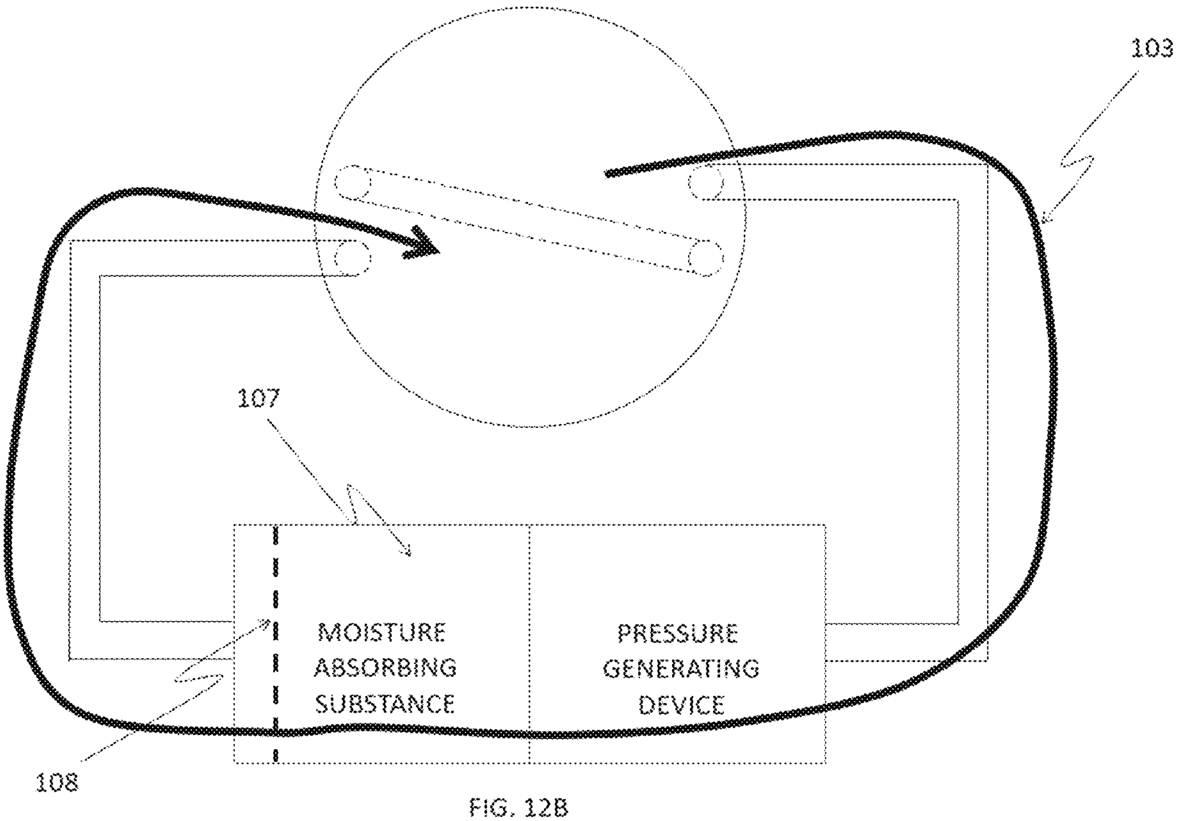
FIG. 12B depicts the air flow with an air valve and sensor subassembly attached to a drying chamber at the drying position in the dryer of FIG. 12A.

FIG. 12A depicts air valve and sensor subassembly 26 of FIG. 9 in the four and ten o-clock position (120) such that input port 53 of FIG. 6 provides airflow across input port humidity sensor 73 of FIG. 7, through chamber 20 of FIG. 2 interior, across output port humidity sensor 74 of FIG. 7 and output port 54 of FIG. 6. This position is controlled by hall effect sensor or optical reflective sensor 78C which is aligned with position location magnet or optical signal reflection rivet 66. Airflow path 103 of FIG. 12B is now engaged via pressure-generating device 105 which pushes air through moisture-absorbing substance 107. As the airflow flows across the desiccant, the humidity of the airflow drops below 20% relative humidity. This closed loop drying path 103 produces a low-humidity environment at room ambient temperature and allows for consistent and reliable moisture uptake in any device within chamber 20 interior. The airflow on airflow path 103 has a flow rate of at least 2 CFM and no more than 4 CFM. The combination of the flow rate, low relative humidity, and room ambient temperature maximizes evaporation of water. Any moisture entrained inside in any device within chamber 20 interior will migrate out through the device's plastic due to the hygroscopic quality of plastic. In some embodiments, the air volume within chamber 20 interior may be decreased while the static pressure generated by pressure-generating device 105 is increased to further expedite the moisture uptake.

Figure 12C:
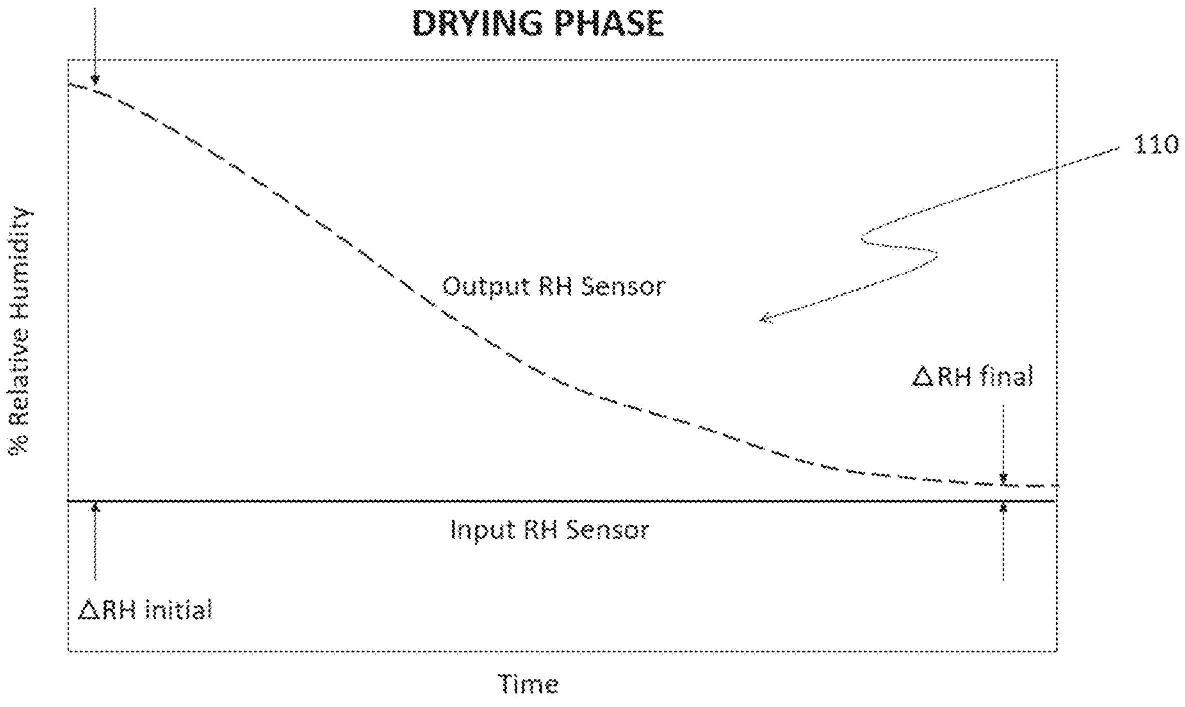
FIG. 12C depicts typical relative humidity response curves for relative humidity sensors during a drying phase when an air valve and sensor subassembly attached to a drying chamber is at the drying position in the dryer of FIG. 12A.

Airflow path 103 of FIG. 12B produces humidity response curves 110 depicted in FIG. 12C which allows for moisture laden air being sampled on output port humidity sensor 74 response to be compared to input port humidity sensor 73 response and continues a drying sequence until output port humidity sensor 74 response converges to input port humidity sensor 73 response saved in memory during calibration. These response curves are compared to baseline response curves 109 of FIG. 10C which allows a drying endpoint to be calculated.

Figure 13:
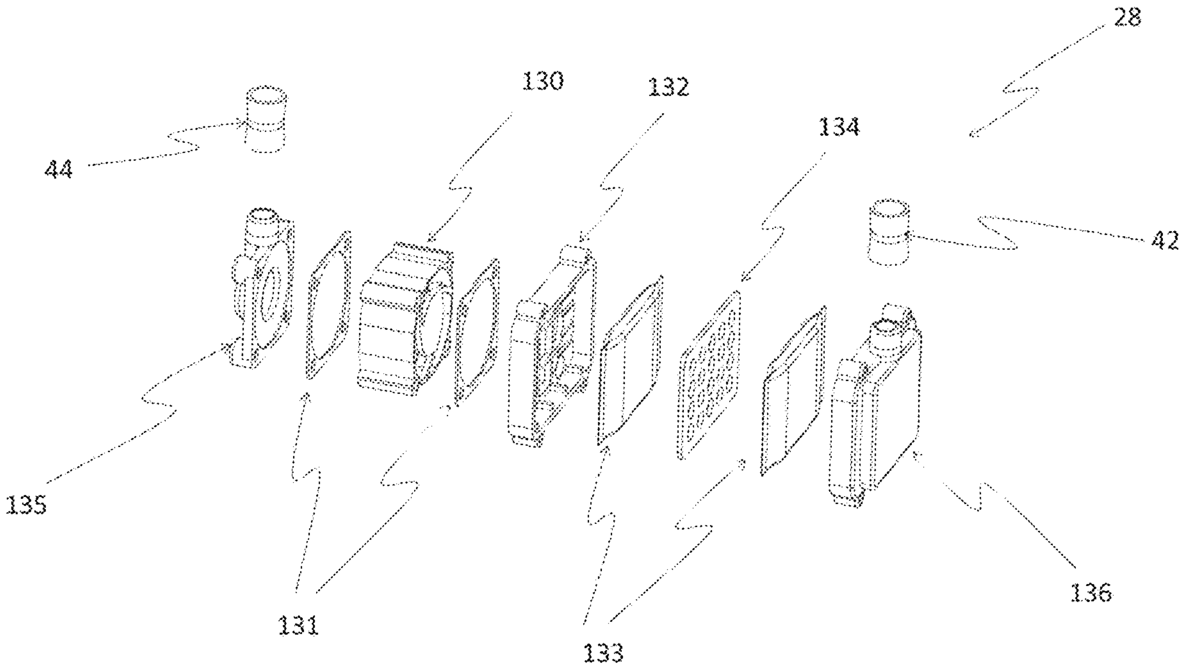
FIG. 13 depicts an exploded isometric view of a pressure-generating device and moisture-absorbing substance subassembly in the dryer.
Figure 14:
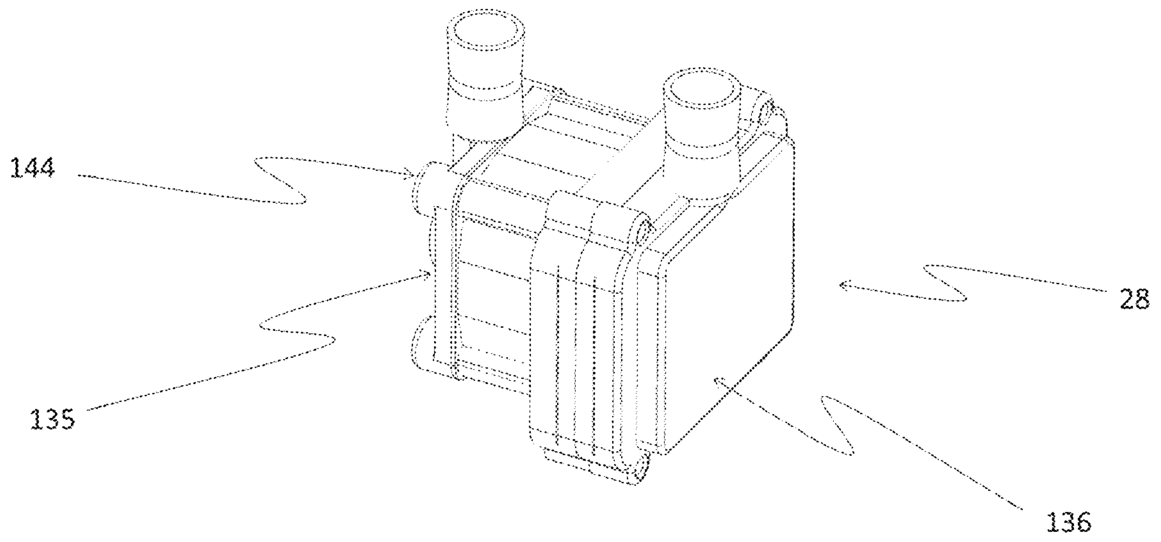
FIG. 14 depicts an isometric view of an assembled pressure-generating device and moisture-absorbing substance subassembly in the dryer of FIG. 13.

As best shown in FIG. 13, pressure-generating device and moisture-absorbing substance subassembly 28 is depicted in an exploded view. Pressure-generating device 130 utilizes seals 131 to provide an airtight seal against input header 135 and desiccator grill 132. Desiccator regenerative heater 134 is captivated between desiccator pouches 133 and held together by desiccator grill 132 and output header 136. Input header 135 utilizes suction plenum 44 to draw air in from drying chamber subassembly 16 of FIG. 1, while output header 136 incorporates pressure plenum 42 to push air into drying chamber subassembly 16 of FIG. 1. Suction plenum 44 and pressure plenum 42 utilize o-rings for air-tight sealing purposes and snap features to mechanically couple to valve input port 44 and valve output port 96 of FIG. 9. Once assembled, pressure-generating device and moisture-absorbing substance subassembly 28 is shown in FIG. 14 as an assembled stack utilizing fasteners 144 to compress input header 135 and pressure output 136 thus providing an airtight subassembly.

Figure 15:
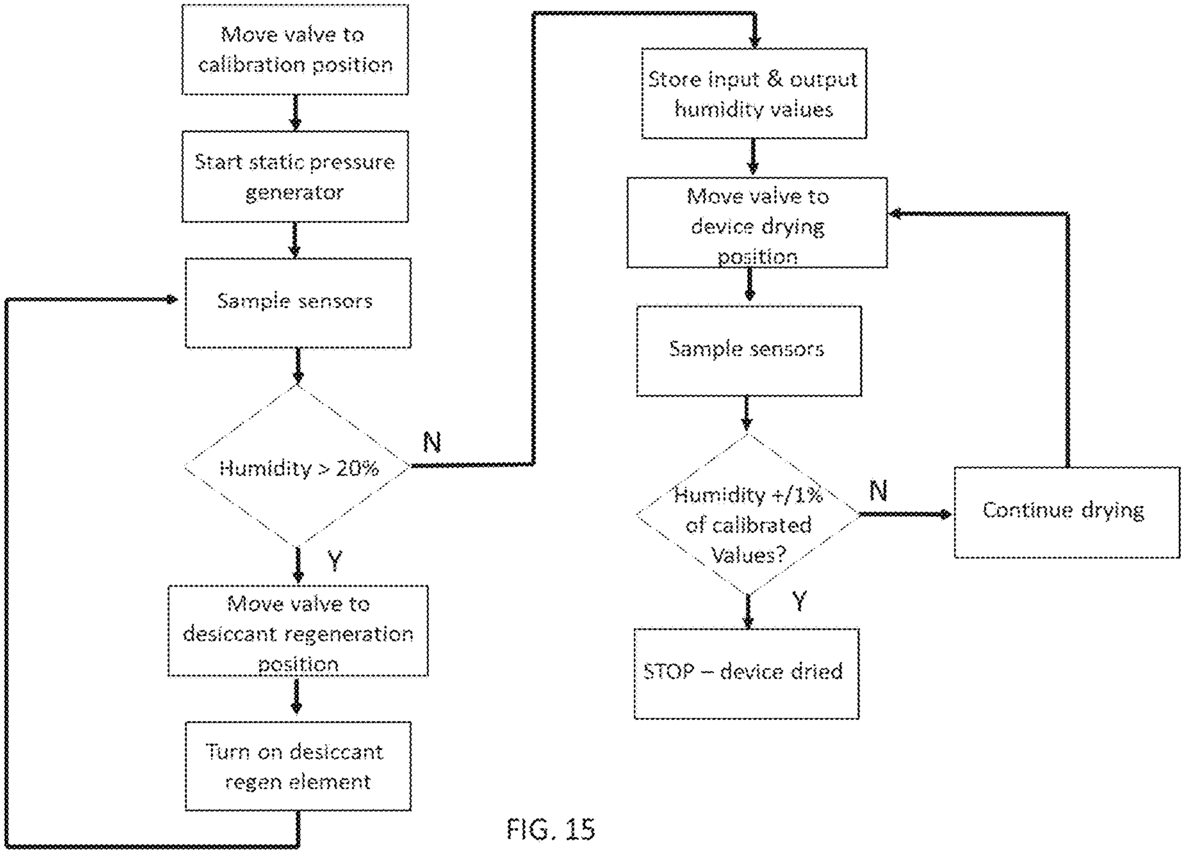
FIG. 15 depicts a flowchart of the control code algorithm provided to a microcontroller in the dryer of FIG. 13.

FIG. 15 describes the control code algorithms which allow the calibration, desiccant regeneration, and drying phases of the dryer. The process is started with moving the valve to the calibration position of FIG. 10, sampling the humidity sensors 73 and 74 of FIG. 7, and if the humidity is greater than 20%, moving the valve to the desiccant regeneration position of FIG. 11A. During calibration, the humidity threshold may be adjusted to compensate for temperature increases in the humidity sensors 73 and 74 in order to increase the accuracy of humidity readings. Once position of FIG. 11A is achieved, the desiccator regenerative heater 134 of FIG. 13 is powered and the desiccant bakes out the moisture which has been entrained. Humidity sensors are constantly sampled until the humidity drops below 20% which signifies the desiccant is dried to a point whereby it can now produce an ultra-dry microenvironment. In some embodiments, the dryer can be configured to maintain a different humidity level for purposes of maintaining products for which humidity level is critical for optimal usage, such as tobacco products, medical marijuana, and leather products like baseballs. Then, air valve and sensor subassembly 26 of FIG. 9 is moved to the position in FIG. 12A and humidity sensors 73 and 74 are once again constantly sampled. Once the humidity values are within +/−1% of each other, the closed loop is not taking up any additional moisture and the device is dry.

Figure 16:
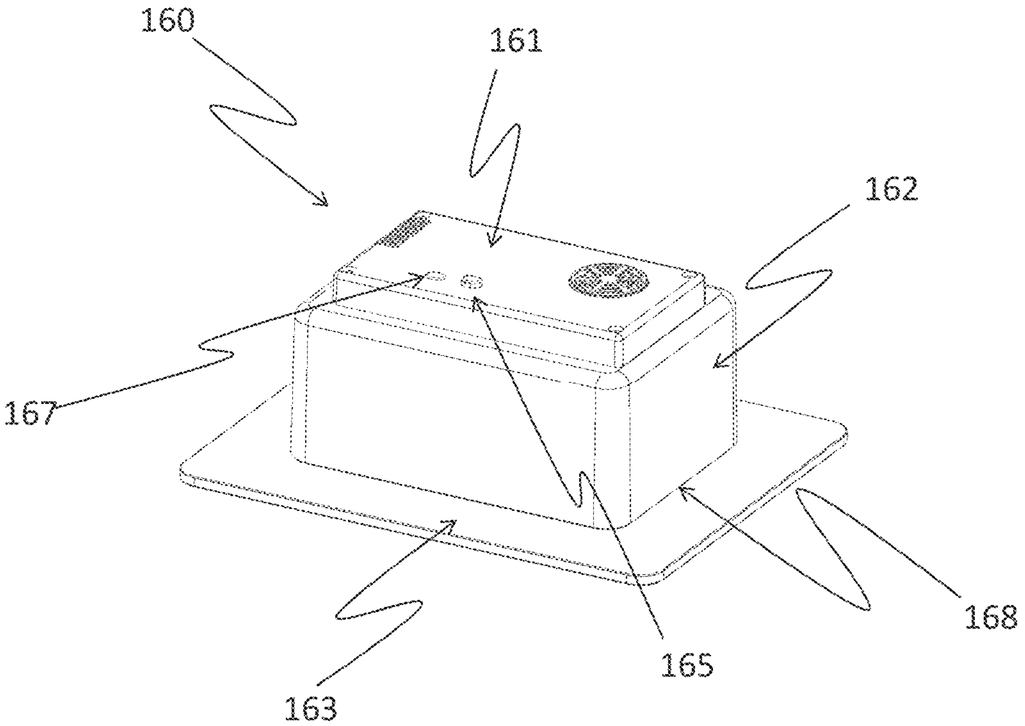
FIG. 16 shows a perspective view of a dry and charge system.

As shown in FIG. 16, a perspective front view of a first exemplary embodiment of a dry and charge device 160, with outer heat transfer unit 161, drying chamber subassembly 162, lower housing base 163, start-stop switch 165, and LED indicator 167. In some embodiments, start stop switch 165 can be a tactical feel membrane switch with integrated LEDs for dryer condition visual feedback (e.g. drying mode, reactivation mode, or charging mode). Drying chamber subassembly 162 and lower housing base 163 are mated together through an elastomeric material 168 on the edge of drying chamber subassembly 162. In some embodiments, lower housing base 163 can be a flat elastomeric pad which is self-sealing against drying chamber subassembly 162.

Figure 17:
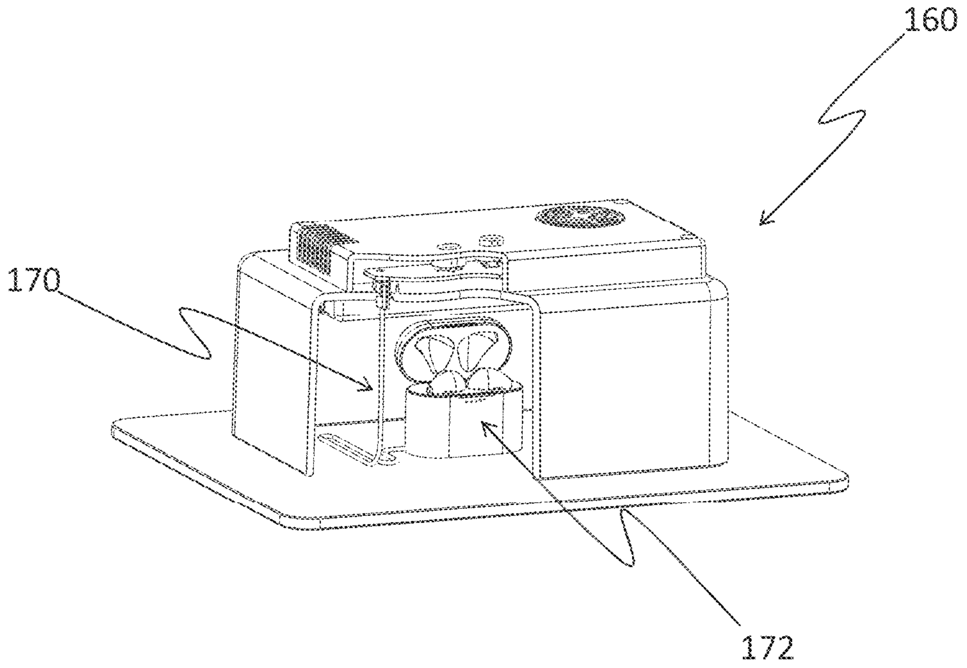
FIG. 17 shows a cutaway perspective view of a dry and charge system together with a hearing aid charging case.

As shown in FIG. 17, dry and charge device 160 is depicted with a cutaway of drying chamber subassembly 162 of FIG. 16, hearing aid charging case 172, and charging cord 170.

Figure 18:
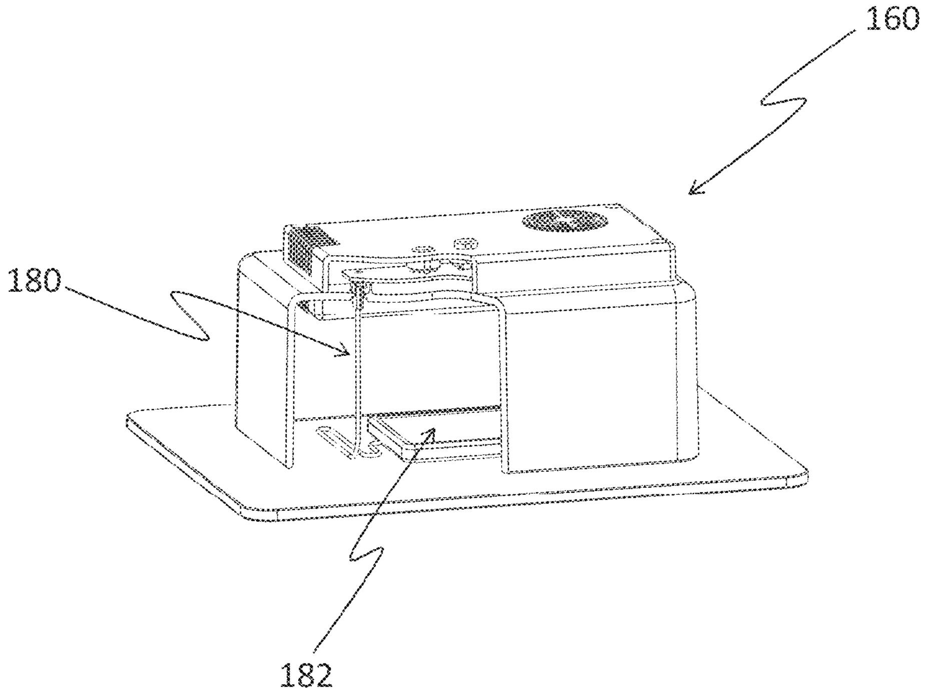
FIG. 18 shows a cutaway perspective view of a dry and charge system together with a smart phone inside the dry and charge system.

Referring now to FIG. 18, dry and charge device 160 is shown with a cutaway of drying chamber subassembly 162 of FIG. 16, smart phone 182, and charging cord 180. In other embodiments, any device other than smart phones or hearing aid charging cases can be housed within drying chamber subassembly 162 and be subjected to cool and dry recirculating air and power for charging. Charging cord 180 FIG. 18 and charging cord 170 of FIG. 17 are normally powered via USB-C receptacle which is universally recognized as a 5 V DC source; however, any USB receptacle could be contemplated for use.

Figure 19:
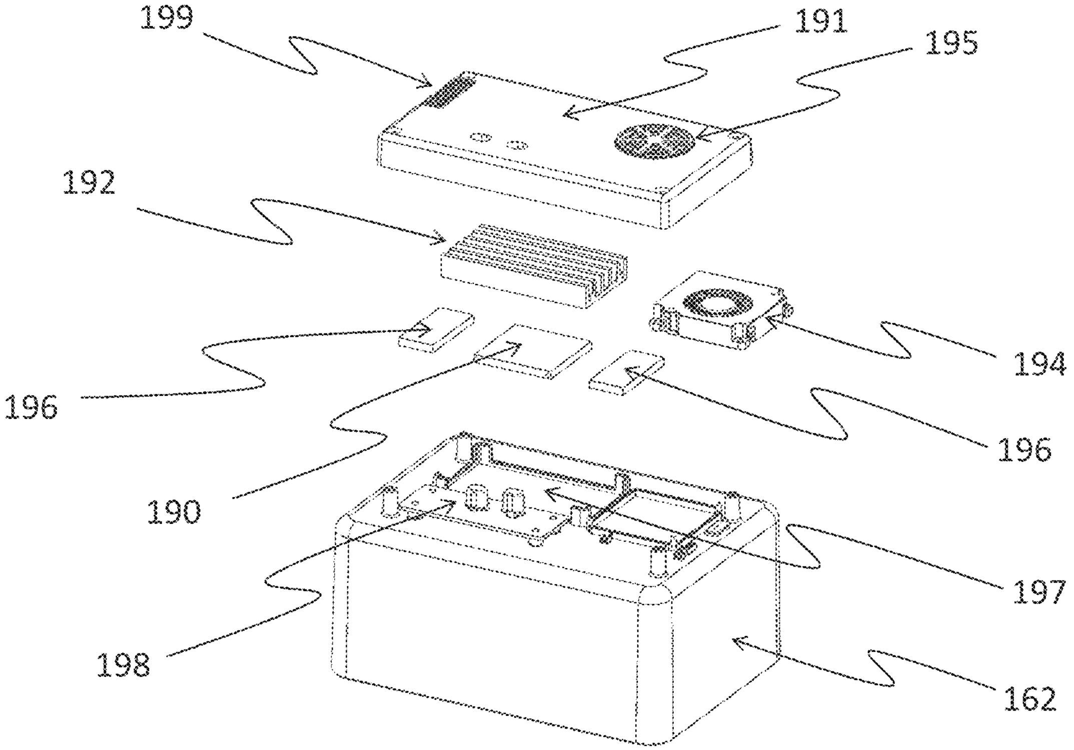
FIG. 19 shows a top exploded perspective view of a dry and charge system with the main external components of the heat transfer subassembly.

FIG. 19 is an exploded perspective view of a dry and charge system 160 of FIG. 16, showing an outer subassembly housing thermoelectric module 190, exterior heat sink 192, exterior pressure generator 194, thermal insulating pads 196, heat transfer plate 197, printed circuit board controller 198, and exterior housing 191. In preferred embodiments, heat transfer plate 197 is overmolded into drying chamber subassembly 162 to maintain an integral, airtight seal. Heat transfer plate 197 is preferably made from aluminium having a thickness in the range from 0.0625" to 0.1875" and a width to match the width of thermoelectric module 190. Heat transfer plate 197 could also be made from steel, copper, or any other metal or metal alloy which provides adequate heat transfer characteristics. In preferred embodiments, the width of heat transfer plate 197 is approximately 40 mm-60 mm, and heat transfer plate 197 mates with a 40 mm thermoelectric module 190 producing 40 W-60 W of thermal cooling. Exterior heat sink 192 has a length of approximately 70 mm-100 mm which provides adequate heat dissipation for 40 W-60 W thermoelectric module 190. In other embodiments, the dimensions of exterior heat sink 192 can vary depending on the drying capacity application. Exterior pressure generator 194 is preferably 2 CFM-10 CFM which transports air from exterior housing intake 195, across exterior heat sink 192, and exhausted through exterior housing exhaust port 199.

Figure 20:
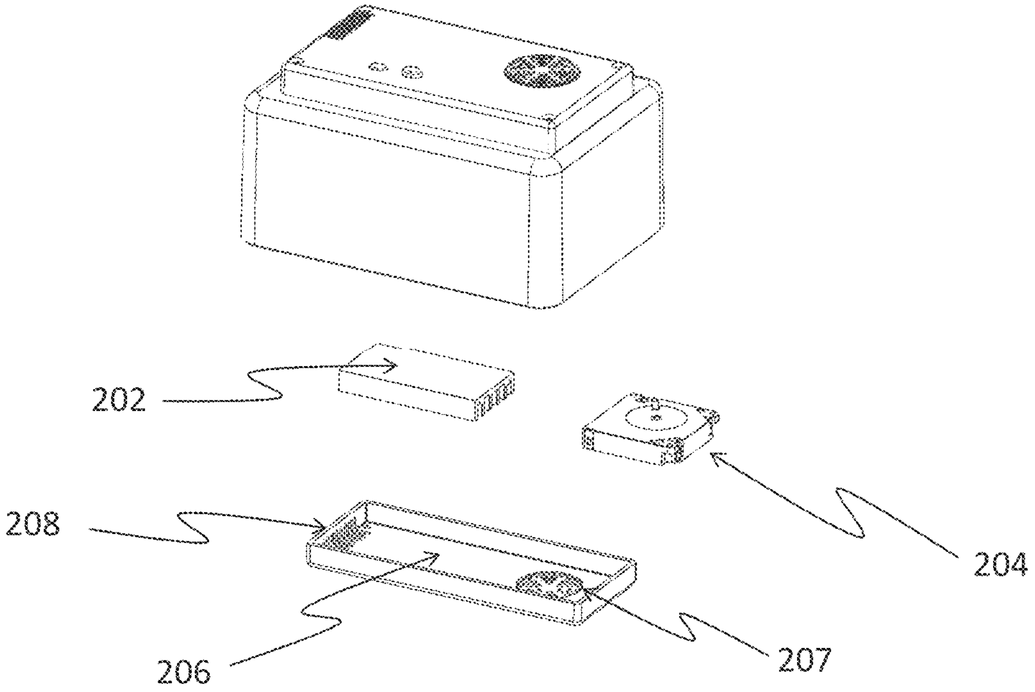
FIG. 20 shows a top exploded perspective view of the main internal components of a heat transfer technique of a dry and charge system.

FIG. 20, an exploded perspective view of a dry and charge system 160, shows an interior subassembly housing interior heat sink 202, interior pressure generator 204, and interior housing 206. Interior pressure generator 204 is preferably matched to exterior pressure generator 194 of FIG. 19 which is 2 CFM-10 CFM in capacity. Interior pressure generator 204 collects air through interior housing intake 207, forces the air across interior heat sink 202, and exhausts the air out of inner exhaust port 208. Interior housing 206, which is preferably plastic injection molded from high temperature plastic such as Ultem 1000, provides a tight fit over interior pressure generator 204 and interior heat sink 202 such that air can be channeled efficiently across interior heat sink 202.

Figure 21:
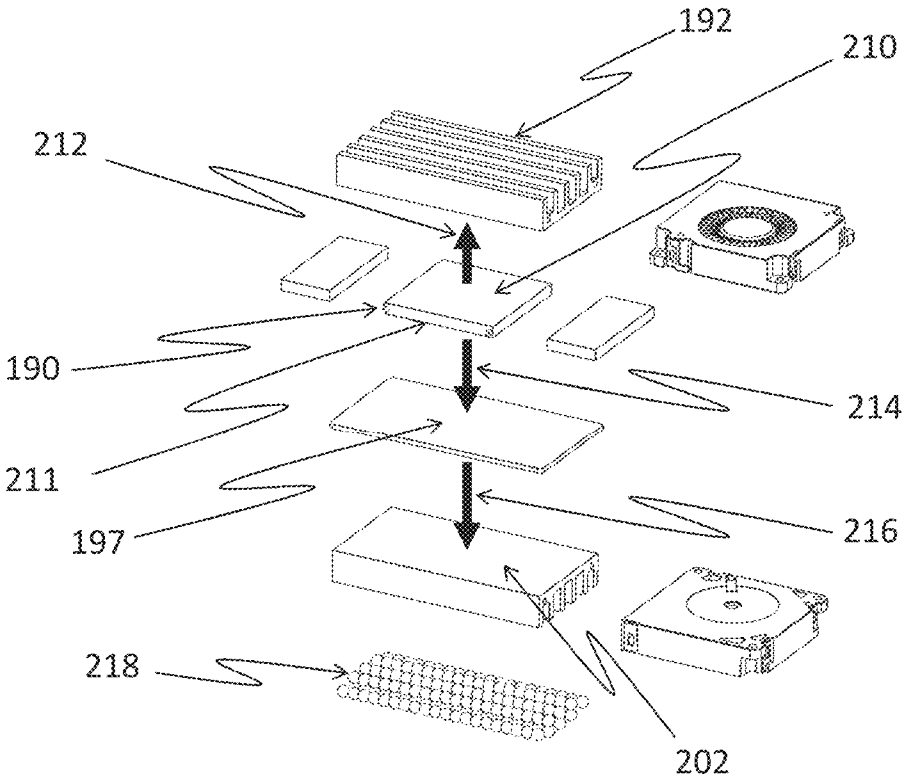
FIG. 21 shows an exploded perspective view of the external and internal heat transfer mechanism in a dry and charge system.

As shown in FIG. 21, thermal conductivity paths 212, 214, and 216 are provided when thermoelectric module 190 of FIG. 19 is energized. When thermoelectric module 190 is energized in the forward conducting scheme, thermoelectric module exterior side 210 is heated while thermoelectric module interior side 211 is cooled. Heat energy 212 is transferred to exterior heat sink 192, while cooling energy 214 is transferred to heat transfer plate 197 which transfers cooling energy 216 to interior heat sink 202. Desiccant 218 which is embedded within interior heat sink 202 cools down based on cooling capacity and heat transfer paths 214 and 216.

Figure 22:
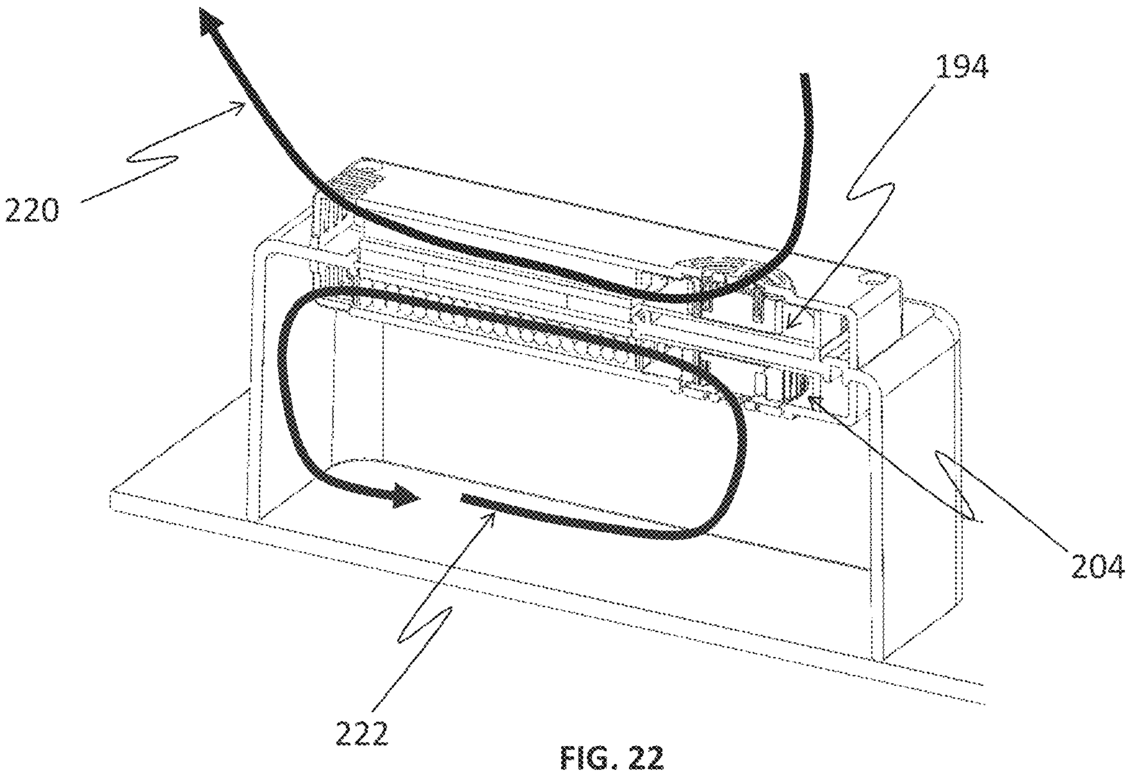
FIG. 22 depicts a cutaway isometric side view of the air transport paths of the internal and external air movements in a dry and charge system.

Referring now to FIG. 22, exterior airflow path 220 and interior airflow path 222 are generated when the dry and charge system is operating. Exterior airflow path 220 is enabled through exterior pressure generator 194 being energized while interior airflow path 222 is enabled through interior pressure generator 204 being energized.

Figure 23A:
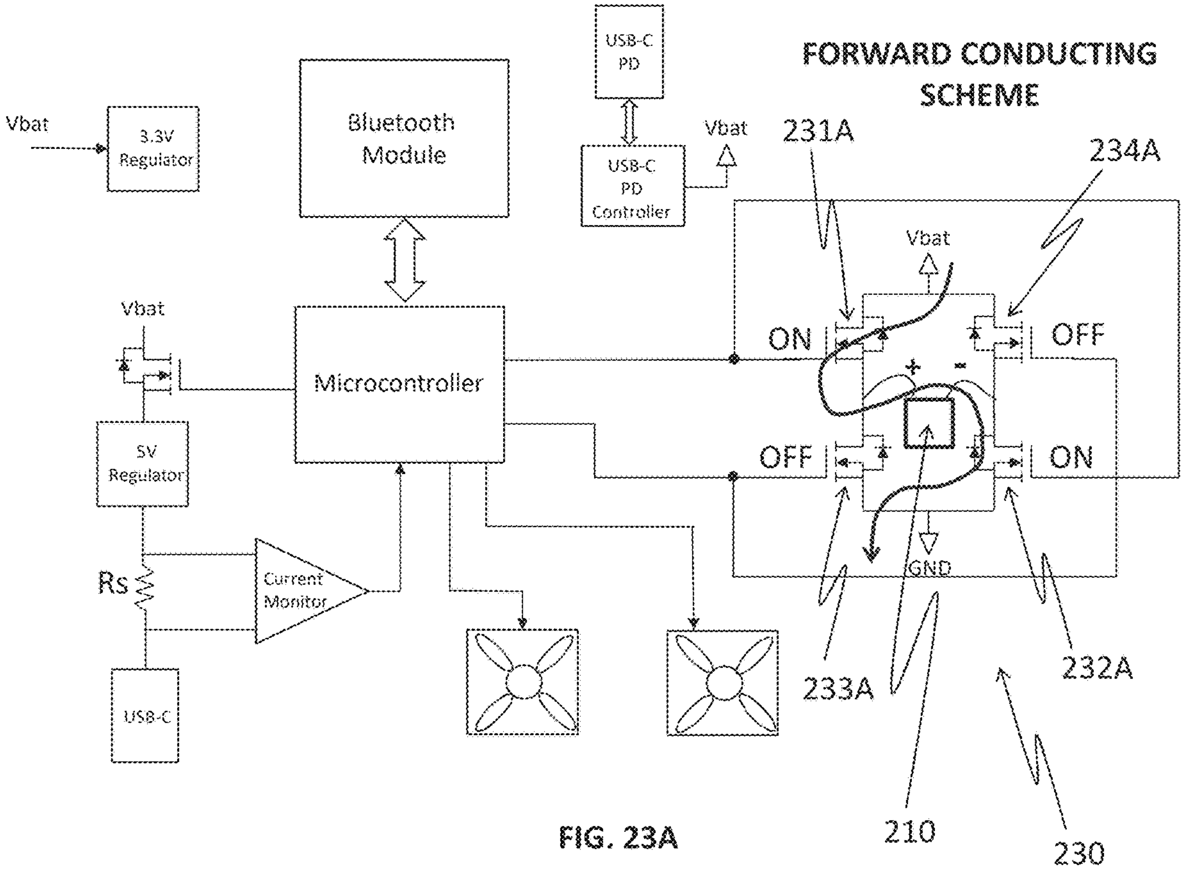
FIG. 23A depicts a schematic diagram for a dry and charge system with a half-bridge driver and thermoelectric device in a forward conducting state.

FIG. 23A is a schematic diagram depicting electronic controls of a preferred embodiment for the dry and charge system 160. Half bridge driver 230 is controlled via a microcontroller in such a manner as to allow transistors 231A and 232A to conduct ("ON" state) while transistors 233A and 234A are non-conducting ("OFF" state). This permits thermoelectric device 190 of FIG. 19 to run in the forward conducting electrical path and enables heating of thermoelectric module exterior side 210 while cooling of thermoelectric module interior side 211.

Figure 23B:
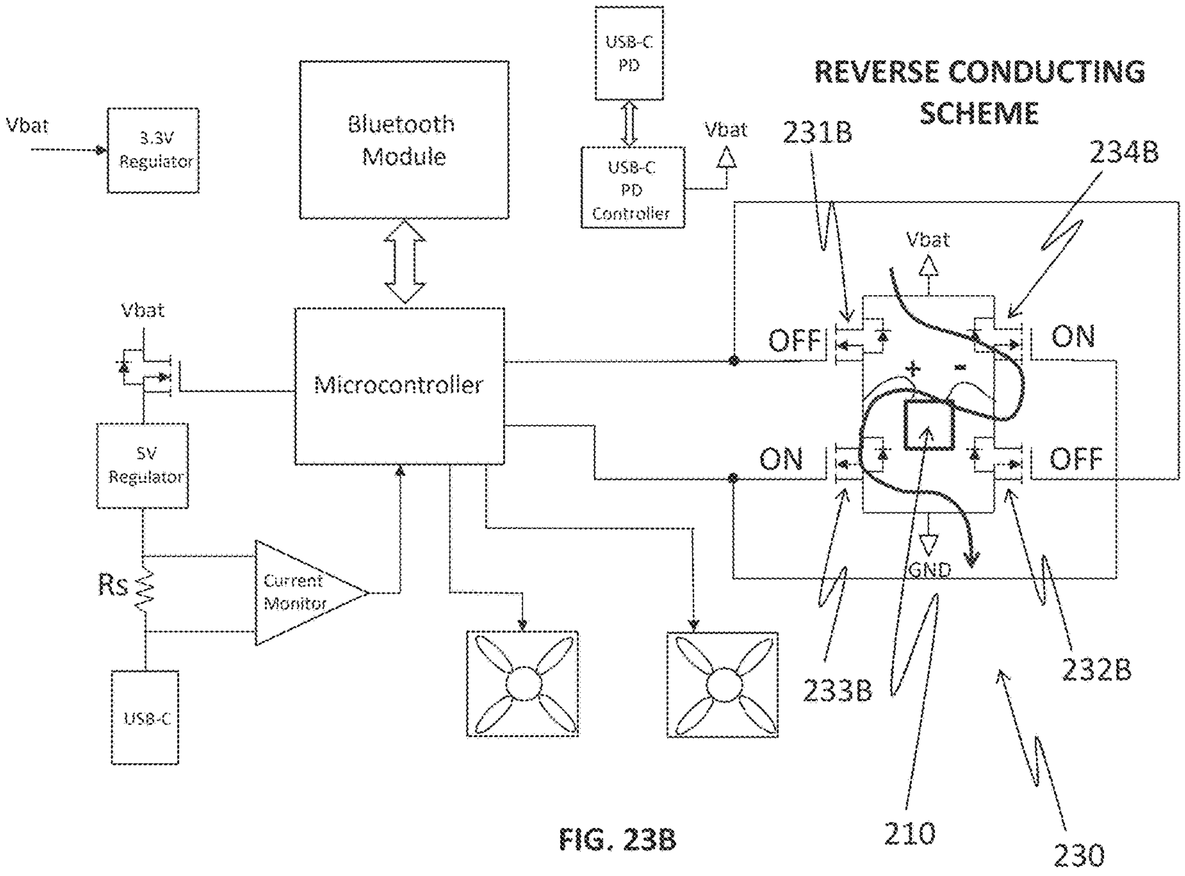
FIG. 23B depicts a schematic diagram for a dry and charge system with a half-bridge driver and thermoelectric device in a reverse conducting state.

Referring now to FIG. 23B, a schematic diagram depicts electronic controls of a preferred embodiment for dry and charge system 160. Half bridge driver 230 is controlled via microcontroller in such a manner as to allow transistors 233B and 234B to conduct ("ON" state) while transistors 231B and 232B are non-conducting ("OFF" state). This permits thermoelectric device 160 to run in the reverse conducting electrical path and enables thermoelectric module exterior side 210 to cool while thermoelectric module interior side 211 heats.

Figure 24:
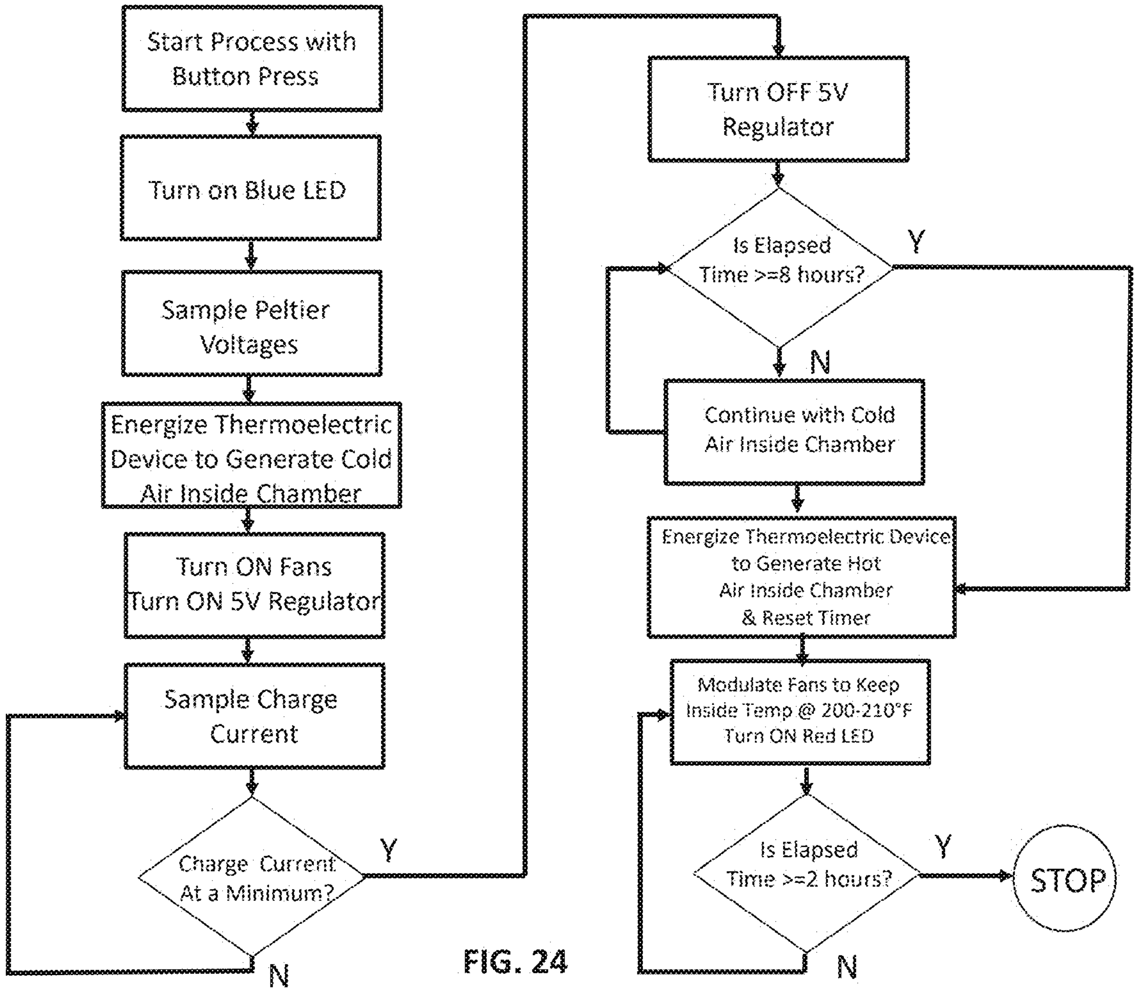
FIG. 24 depicts a flow chart for a dry and charge system according to the schematics in FIG. 23A and FIG. 23B.

FIG. 24 describes the control code algorithms which allow the charging, drying, and desiccant reactivation/regeneration phases of the dry and charge system.

Figure 25:
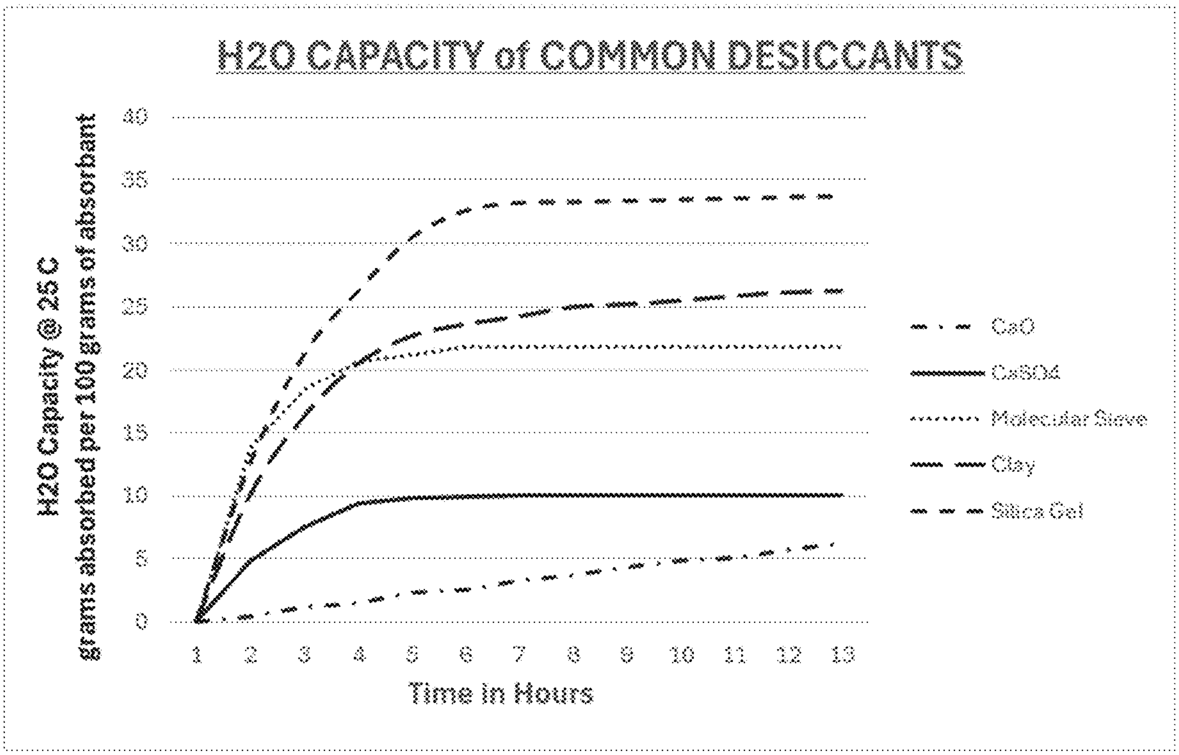
FIG. 25 depicts water (H2O) absorption capacity of various common desiccants over time at room temperature.

FIG. 25 shows the water absorption capacity of various desiccants with slopes of absorption over time at room temperature. These curves, which manufacturers of desiccants specify, demonstrate that desiccants have the highest efficiencies at lower temperatures, which is the ideal conditions to utilize said desiccants for drying. Silica gel desiccant provides the fastest and highest water absorption rate while molecular sieve provides equally fast absorption rates within the first 2½ hours.

Figure 26:
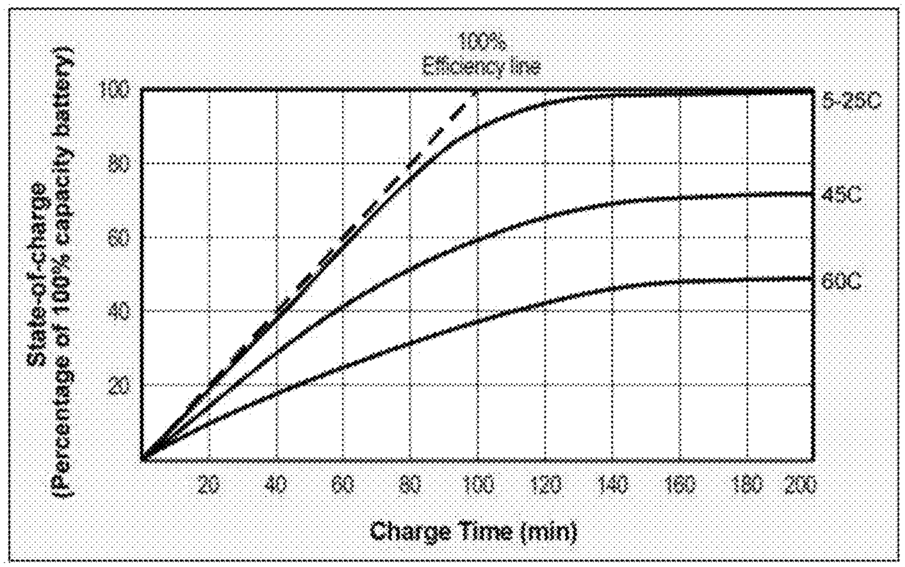
FIG. 26 is a graphical representation of typical rechargeable battery charge efficiency curves, depicting the benefits of charging at room temperature or lower.

Now referring to FIG. 26, a graphical representation of battery charging efficiencies is depicted at various temperatures over time. Based on the data, it can be understood the maximum charge efficiency occurs with lower temperatures, thus allowing faster charge times.

In general, the dry and charge system works as follows: a user places a hearing aid case/charger 172 or a smart phone 182 under drying chamber subassembly 162 and connects charging cord 170 or charging cord 180. The user depresses start/stop button 165 and LED indicator light 167 lights up with microcontroller control and indicates drying and charging is underway. The microcontroller biases thermoelectric module 190 in the forward conducting scheme and allows cooling of interior heat sink 202 while heating exterior heat sink 192. Simultaneously, exterior pressure generator 194 and interior pressure generator 204 energize and generate air path 220 and air path 222. Airpath 222 recirculates cool air which is generated from interior heat sink 192 which also cools desiccant 218. This cooling of desiccant 218 of FIG. 21 produces the highest capacity to absorb water as depicted in the $H_2O$ Capacity of Common Desiccants. In preferred embodiments, silica gel or molecular sieve are utilized for the greatest absorption efficiency capacity within the first 2½ hours at room temperature. As drying commences, power to charging cord 170 of FIG. 17 or charging code 180 is energized via turning on a 5V regulator. The hearing aid case/charger 172 or smart phone 182 are now subjected to a room temperature environment which permits the maximum charging efficiency possible. Once drying and charging is completed, the user disconnects the device being dried and charged. Microcontroller schematic senses this disconnection vis-à-vis current monitor circuitry. Microcontroller commands half bridge controller to provide power to thermoelectric module 190 in a reverse conducting scheme. This now reverses the heat and cooling of thermoelectric module 190 as shown in FIG. 23B. This reversal of heating and cooling allows interior heat sink 202 to heat to 190° F.-225° F. and thus bakes out (reactivates) the desiccant for future drying/moisture absorption.

Figure 27:
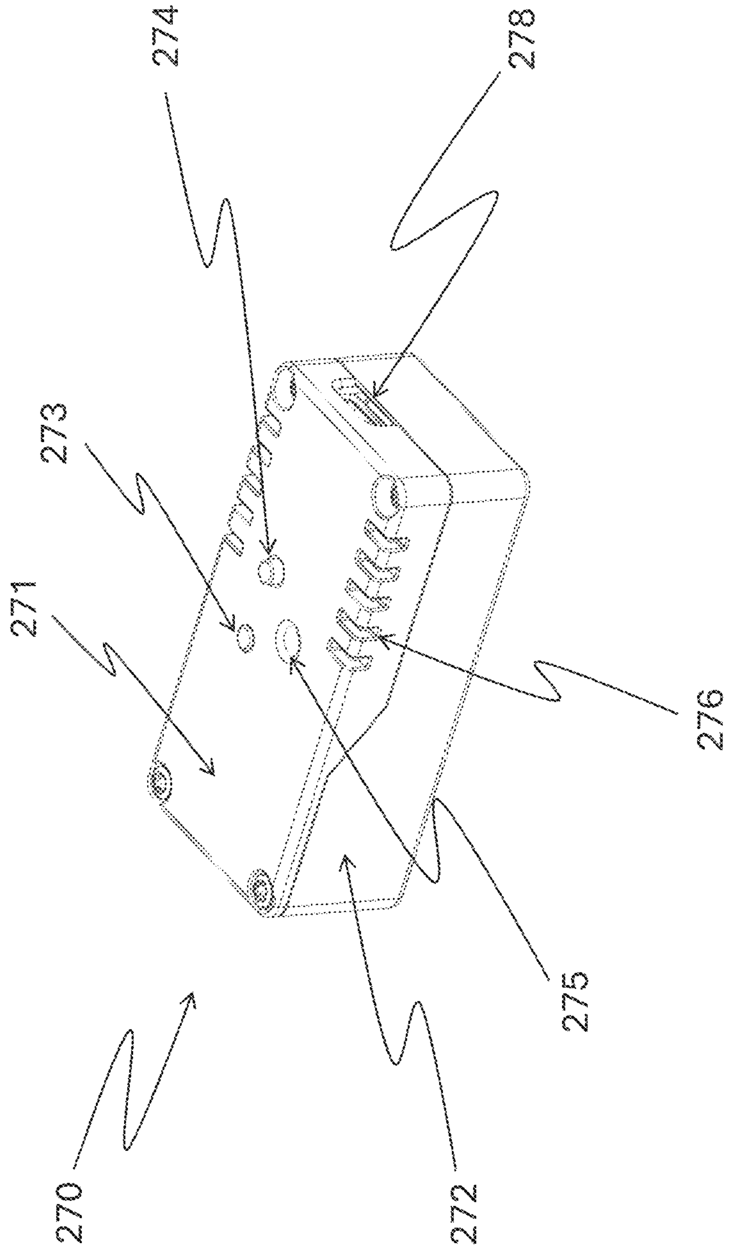
FIG. 27 depicts an emergency drying accessory kit reuseable cartridge.
Figure 28:
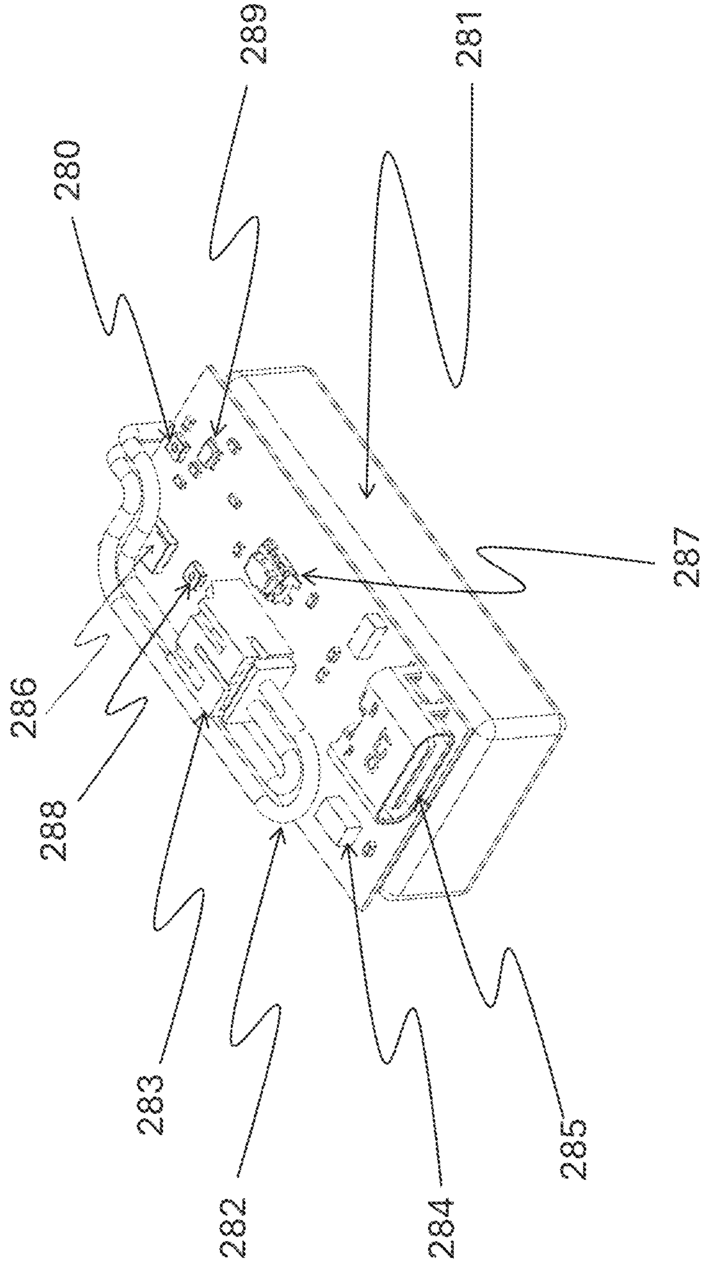
FIG. 28 depicts the electronics of an emergency drying accessory kit reuseable cartridge of FIG. 27 with the housing removed.
Figure 29:
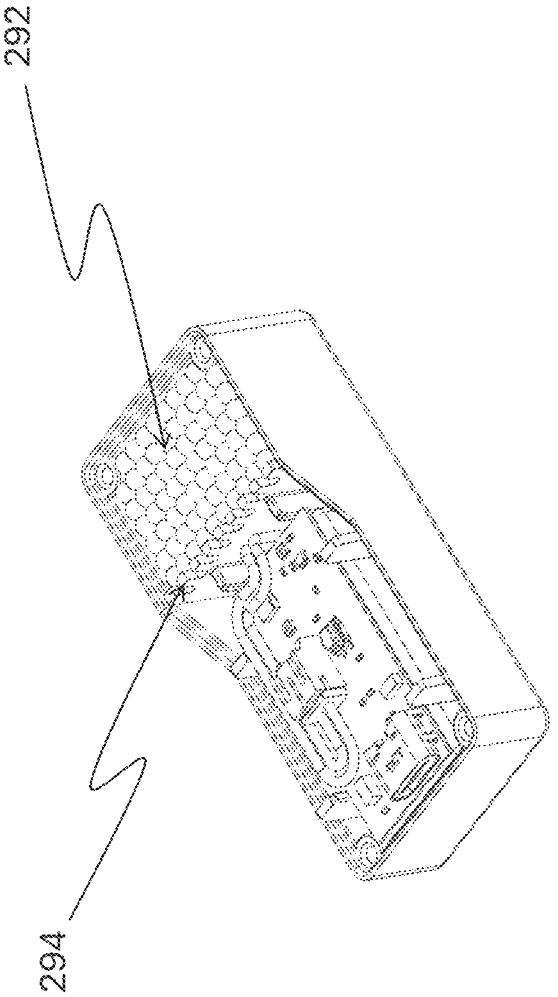
FIG. 29 depicts the electronics and desiccant of an emergency drying accessory kit reuseable cartridge of FIG. 27 with the housing top cover removed.

Referring now to FIG. 27, an emergency drying accessory apparatus 270 is shown with upper housing 271, lower housing 272, LED indicator 273, start button 274, ambient humidity sensor port 275, airflow slots 276, and charge port 278. Emergency drying apparatus 270 upper housing 271 and lower housing 272 are preferably fabricated from non-hydroscopic plastic such as polycarbonate. As best shown in FIG. 28, emergency drying accessory apparatus electronics is depicted with rechargeable battery 281, rechargeable battery wiring 282, ambient humidity sensor 288, charging controller 284, charging port connector 285, microcontroller 286, desiccant humidity sensor 280, start switch 287, and LED indicator 289. In preferred embodiments, LED indicator is a Red-Yellow-Green array for simplicity. LED indicator could be substituted with a LED bar graph or LED/LCD display. In some embodiments, charging port connector 285 is a standard USB-C, however, this could be USB micro or USB mini which are generally available for charging. Upon initial connection of rechargeable battery 281, microcontroller 286 samples ambient humidity sensor 288 and desiccant humidity sensor 280 and stores these values. Microcontroller 286 is programmed to "go to sleep" to preserve power and has firmware to "wake up" at timed periods to sample ambient humidity sensor 288 and desiccant humidity sensor 280. These humidity values are stored as initial static conditions. As best shown in FIG. 29, lower housing 272 of FIG. 27 houses electronics subassembly 291 and desiccant beads 292. Lower housing 272 has castellated wall feature 294 which provides airflow to and from desiccant relative humidity sensor 288 of FIG. 28 and captivates desiccant beads 292. In preferred embodiments, the desired dry weight of desiccant beads 292 is 2-10 grams and are silica gel type, which provide the maximum absorption rate of any desiccant. In other embodiments, desiccant beads 292 could be molecular sieve, clay, calcium sulphate, or calcium oxide. However, these materials have lesser absorptive ability and therefore the preferred embodiment is silica gel.

Figure 30:
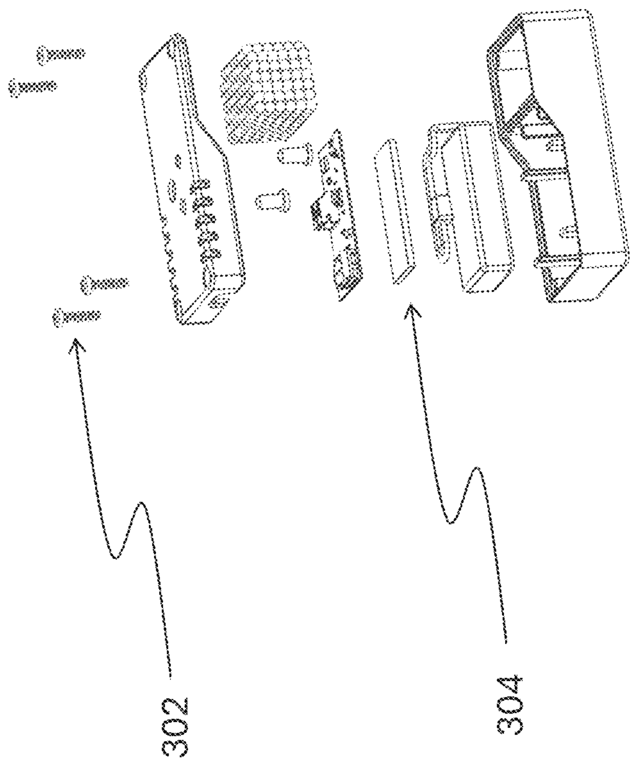
FIG. 30 shows an exploded perspective view of an emergency drying accessory kit.
Figure 31:
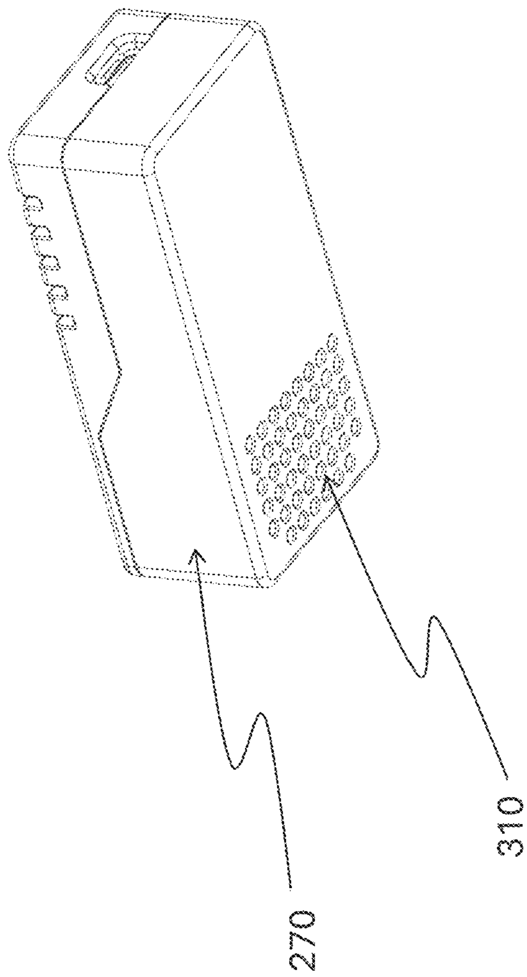
FIG. 31 depicts a bottom perspective view of the emergency drying accessory kit of FIG. 27.

Referring now to FIG. 30, an exploded perspective view of an emergency drying accessory apparatus 270 showing at least one preferred assembly embodiment. Electronics subassembly 291 of FIG. 29 is attached to rechargeable battery 281 of FIG. 28 using double sided adhesive tape 304. In some embodiments, double side adhesive tape 304 is substituted with a suitable permanent adhesive, RTV, or no adhesives. Fasteners 302 hold upper housing 271 of FIG. 27 to lower housing 272 of FIG. 27 which captivates all internal componentry. In preferred embodiments, upper housing 271 and lower housing 272 of FIG. 27 are ultrasonically welded together. As best shown in FIG. 31, a perspective view of the underside of lower housing 272 of FIG. 27 with an air hole array 310 to permit air exchange of dry air from desiccant 292 of FIG. 29 and the ambient environment. Air hole array 310 have a plurality of holes sized at 0.050-0.070 inches in diameter to permit captivation of desiccant beads 292 with minimal air exchange restriction. In preferred embodiments, the number of holes is between 30-50 to permit adequate air exchange and moisture absorption.

Figure 32:
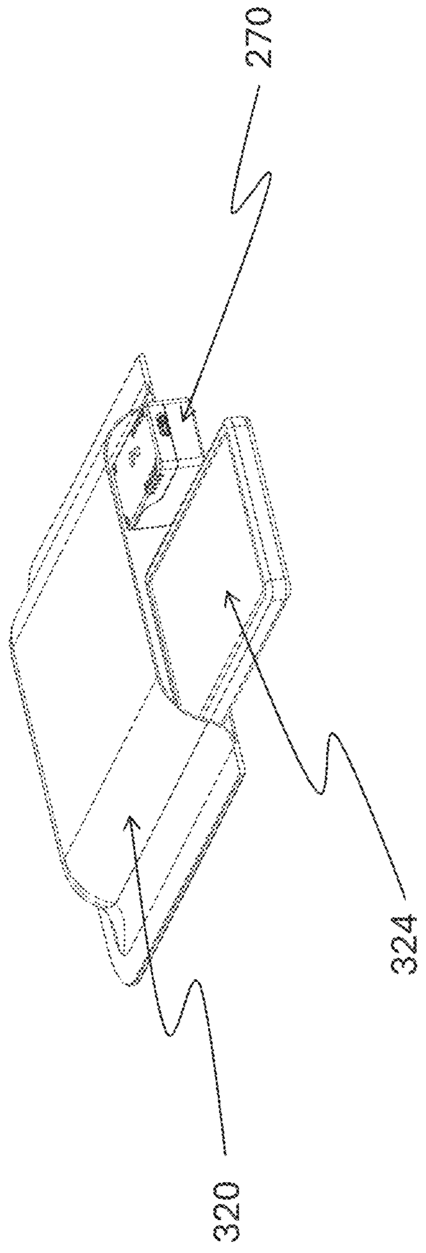
FIG. 32 shows an emergency drying accessory kit together with a smart phone and resealable mylar pouch in the initial drying phase.
Figure 33:
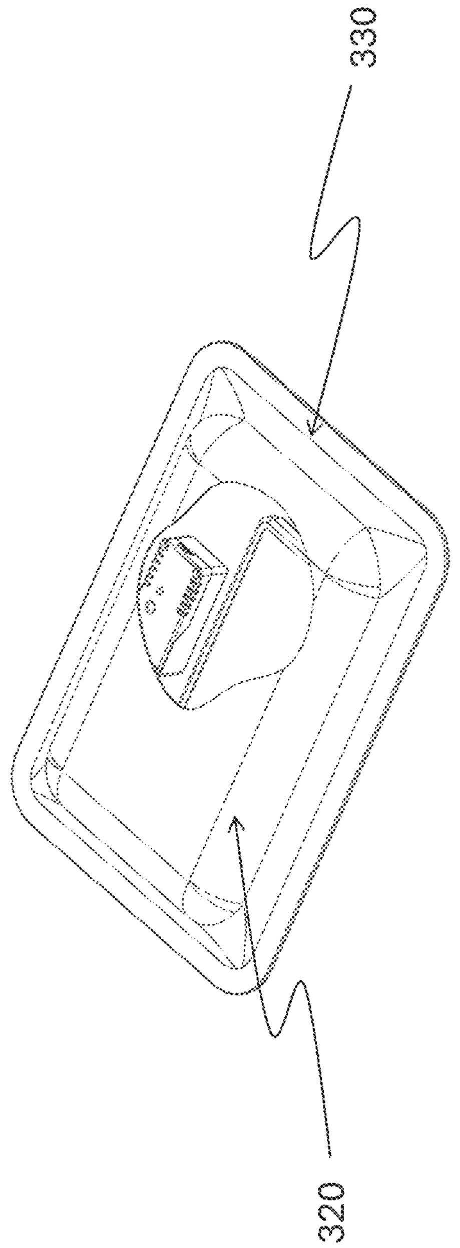
FIG. 33 depicts the emergency drying kit sealed inside a mylar pouch with a smart phone and visible through a partially clear cover.
Figure 40:
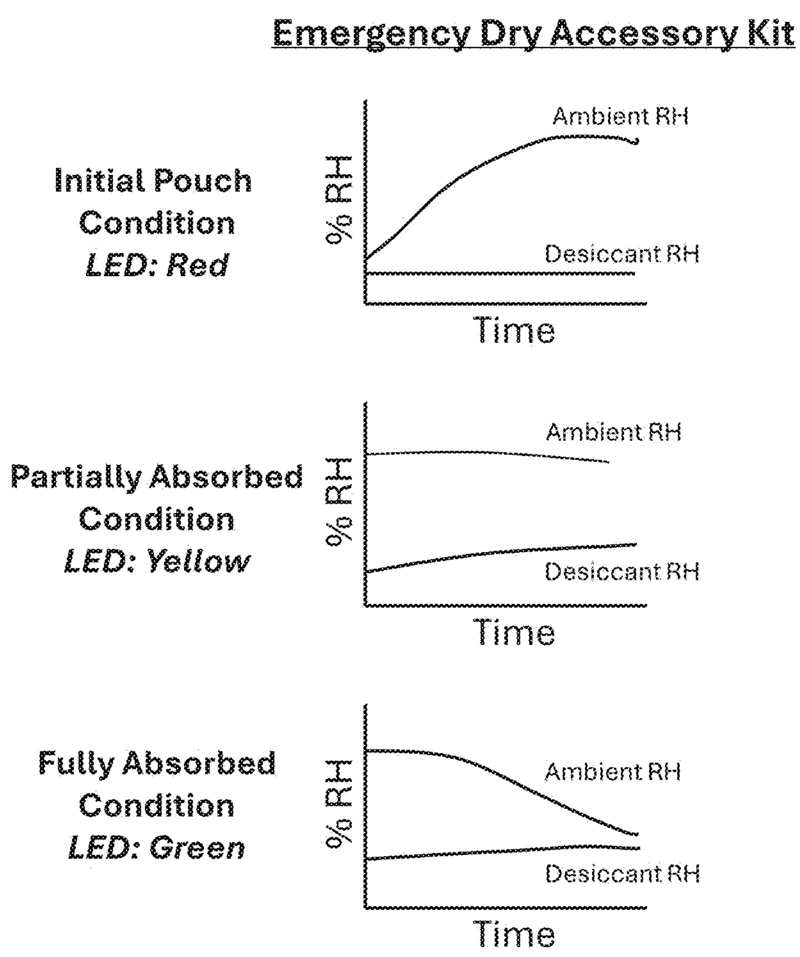
FIG. 40 depicts the various states of relative humidities and LED indication of an emergency dry accessory of FIG. 33.

As best shown in FIG. 32, emergency drying accessory apparatus 270 is shown inside mylar pouch 320 with smart phone 324. Mylar pouch 320 is resealable airtight type with a clear side for visual indication of LEDs. Once mylar pouch 320 is opened, the user presses the start button 273 of FIG. 27 and places smart phone 324 next to the emergency drying accessory apparatus 270 and reseals the mylar pouch 320. FIG. 33 depicts emergency drying accessory apparatus 270 of FIG. 27 inside mylar pouch 320 with airtight seal 330 sealed closed. The user observes LED indicator through clear mylar window 332 until the LED indicator 273 of FIG. 27 turns from red, to yellow, to green, indicating the smart phone is dry. As best shown in FIG. 40, ambient relative humidity sensor 283 of FIG. 28 is compared to desiccant relative humidity sensor 288 through computations run by microcontroller 286 of FIG. 28. During initial placement of smart phone 324 of FIG. 32, the difference of humidities increases to a value greater than 30% and microcontroller 286 toggles LED 289 to red and begins to sample ambient humidity sensor 288 and desiccant humidity sensor 280 at faster frequency. In preferred embodiments, firmware housed in microcontroller 286 computes the difference of ambient humidity and desiccant humidity in real-time and monitors for these values to converge. As the humidity difference reaches a 15-20% threshold as depicted in FIG. 40, microcontroller 286 toggles LED 289 to yellow. Once the humidity difference reaches 5% or less as shown in FIG. 40, microcontroller 286 toggles LED 289 to green, indicating quiescent moisture levels between ambient and desiccant environments. This quiescent state is indicative of transport of water vapor from smart phone 324 of FIG. 32 to desiccant 292 of FIG. 29 as part of emergency drying accessory apparatus 270 of FIG. 27. The emergency drying accessory apparatus 270 of FIG. 27 can be recharged and desiccant 292 of FIG. 29 can be reactivated by subjecting the emergency drying accessory apparatus 270 to a simultaneous charge and drying system.

Figure 34:
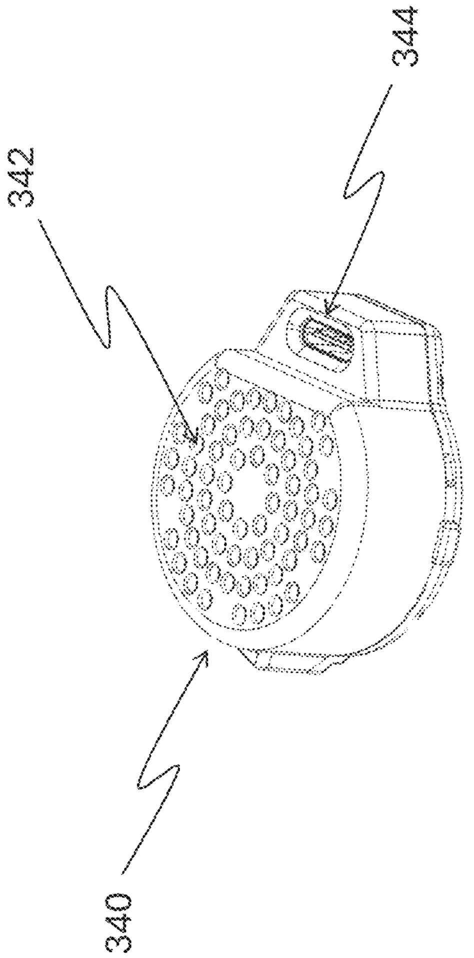
FIG. 34 shows a top perspective view of a hearing aid and wireless earbud travel accessory.
Figure 35:
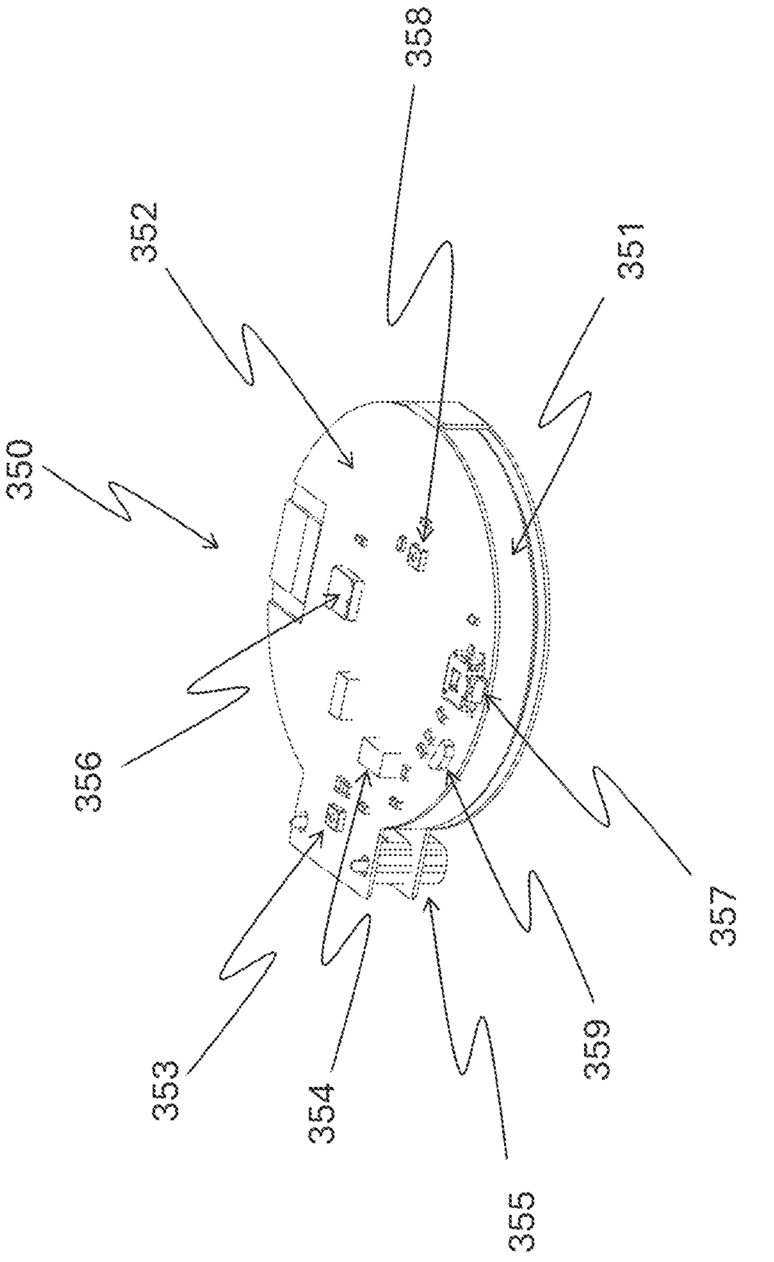
FIG. 35 depicts the electronics of a hearing aid and wireless earbud travel accessory of FIG. 34 with the housing removed.

Referring now to FIG. 34, travel dryer accessory 340 for hearing aids or wireless earbuds is shown with a plurality of air holes 342 and charge port 344. In preferred embodiments, the number of air holes 342 is 30-50 and are sized at 0.050-0.070 inches in diameter. In other embodiments, charge port 344 is a USB-C port, however, charge port 344 could be micro-USB or mini-USB. As best shown in FIG. 35, travel dryer accessory 340 electronics sub-assembly 350 is depicted with rechargeable battery 351, flexible printed circuit board 352, ambient humidity sensor 353, microcontroller 356, charge controller 354, charge port connector 355, desiccant humidity sensor 358, LED indicator 359, and start switch 357. In preferred embodiments, rechargeable battery 351 is at least 40 mAh in capacity. In other embodiments, flexible printed circuit board 352 is designed to fold over and captivate rechargeable battery 351.

Figure 36:
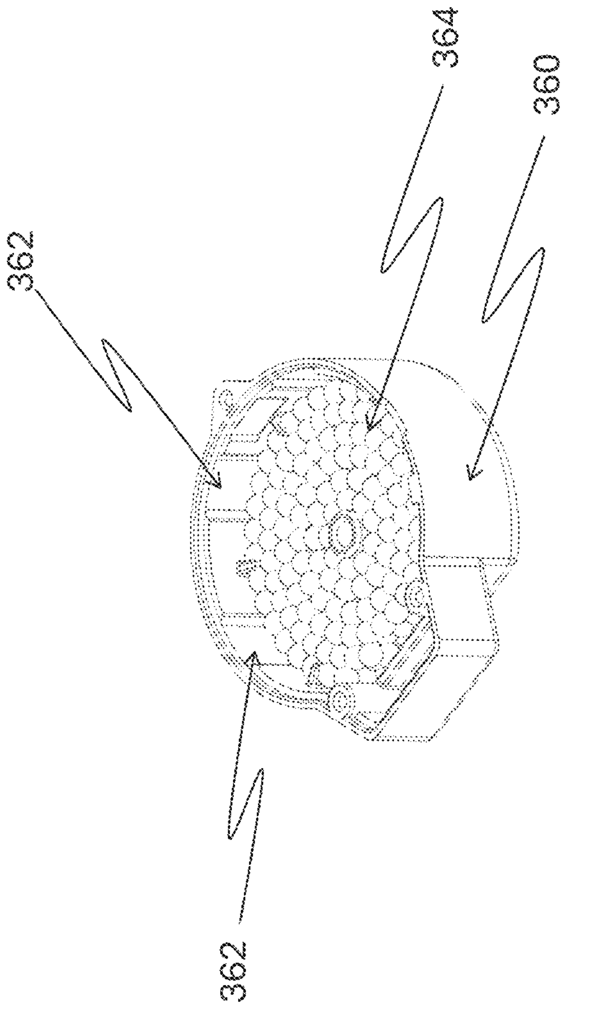
FIG. 36 shows the desiccant residing inside the lower housing of the hearing aid and wireless earbud accessory kit of FIG. 34.
Figure 37:
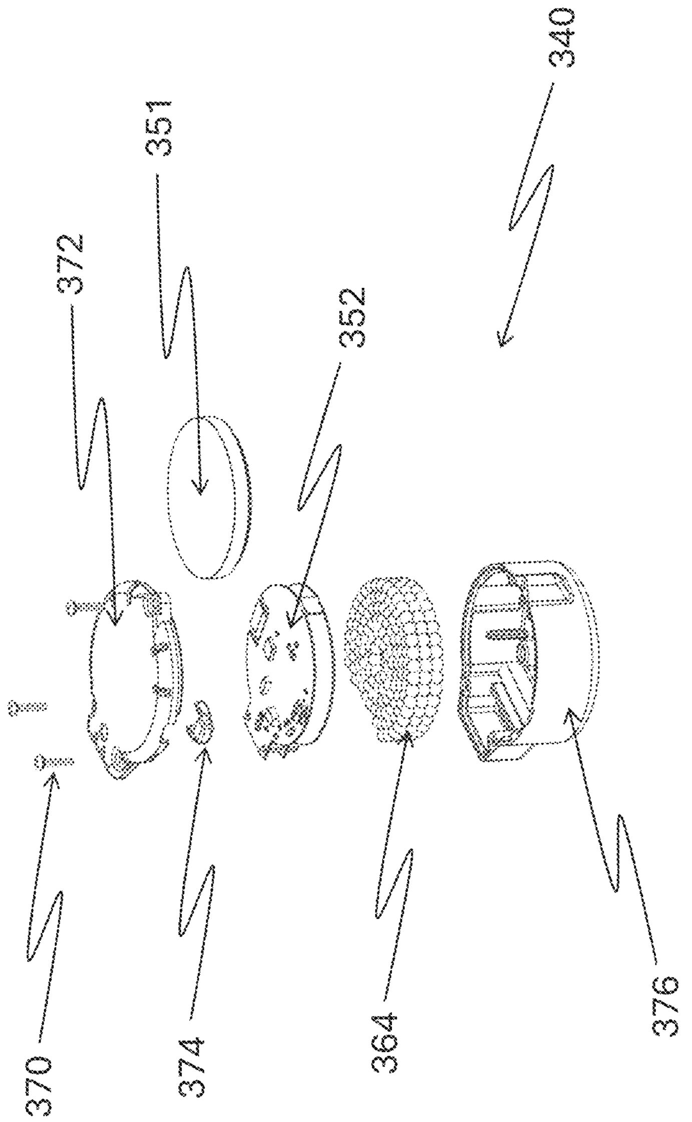
FIG. 37 depicts an exploded perspective view of the hearing aid and wireless earbud accessory kit of FIG. 34.
Figure 38:
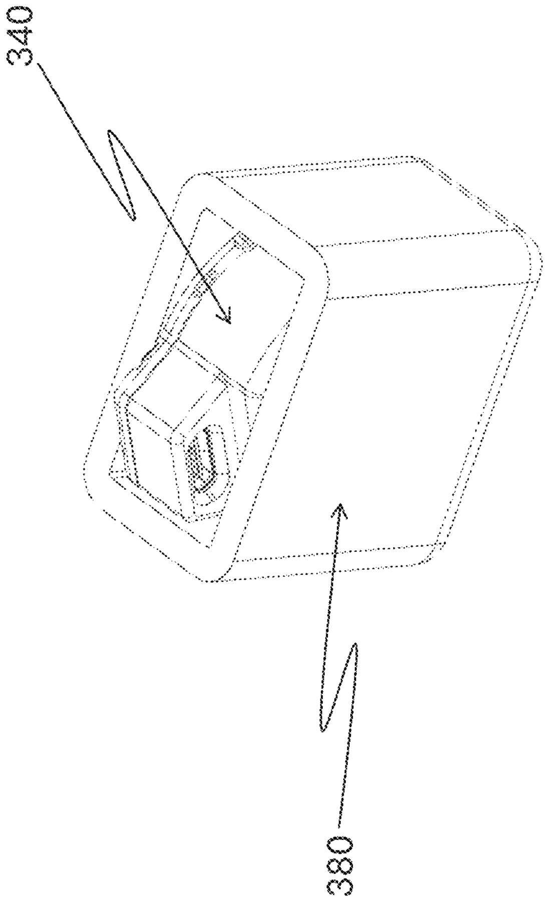
FIG. 38 shows the hearing aid and wireless earbud accessory kit of FIG. 34 residing in a hearing aid charging case pocket.
Figure 39:
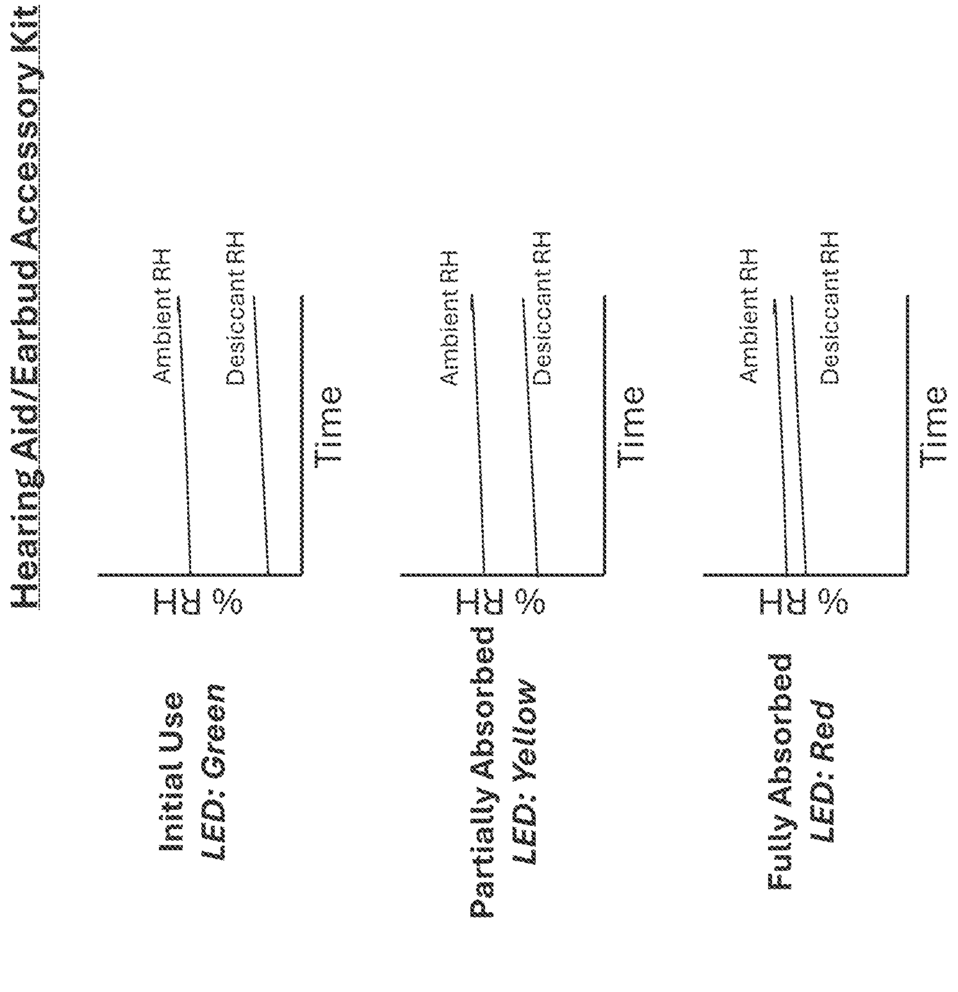
FIG. 39 depicts the various states of relative humidities and LED indication of a hearing aid and wireless earbud drying accessory kit of FIG. 34.

Referring now to FIG. 36, travel dryer accessory lower housing 364 is shown with desiccant beads 364 and side air channels 362. Side air channels 362 permits desiccant air to flow up and around electronics sub-assembly 350 of FIG. 35. In preferred embodiments, 1-5 grams of desiccant beads 364 are present and made of silica gel for maximum absorption rate. As best shown in FIG. 37, travel dryer accessory 340 is assembled with fasteners 370, upper housing 372, start button 374, flexible printed circuit board 352 of FIG. 35, rechargeable battery 351 of FIG. 35, desiccant beads 364 of FIG. 36, and lower housing 360 of FIG. 36. In some embodiments, upper housing 370 is ultrasonically welded to lower housing 360 to create an airtight seal. As best shown in FIG. 38, travel dryer accessory 340 is depicted in a hearing aid charging case pocket 380. In preferred embodiments, travel dryer accessory 340 is integrated into hearing aid charging case 380 and electrically share hearing aid case 380 rechargeable battery. In some embodiments, a reduced number of desiccant beads 364 are integrated into hearing aids or wireless earbuds and can absorb moisture real-time during use. When the travel dryer accessory 340 is first used out of an airtight package, the desiccant beads 364 are dry (little moisture absorption). Microcontroller 356 samples ambient humidity sensor 353 and desiccant humidity sensor of FIG. 35 and computes the difference in humidity. Initially, this difference is 40% or greater and microcontroller 356 toggles LED 359 of FIG. 35 green. This indicates to the user the travel dryer accessory 340 is absorbing moisture in and around the hearing aid or wireless earbuds in their respective cases. As the desiccant beads 364 absorb moisture the difference of humidities is reduced to 25-35% and microcontroller 356 toggles LED 359 to yellow. Over a period of time, microcontroller 356 which is sampling ambient humidity sensor 353 and desiccant humidity sensor 358 real time begin to converge as depicted in FIG. 39 and when the humidity differential is less than 10%, microcontroller 356 toggles LED 359 to red, indicating the travel dryer accessory desiccant beads 364 requires reactivation.

Figure 41:
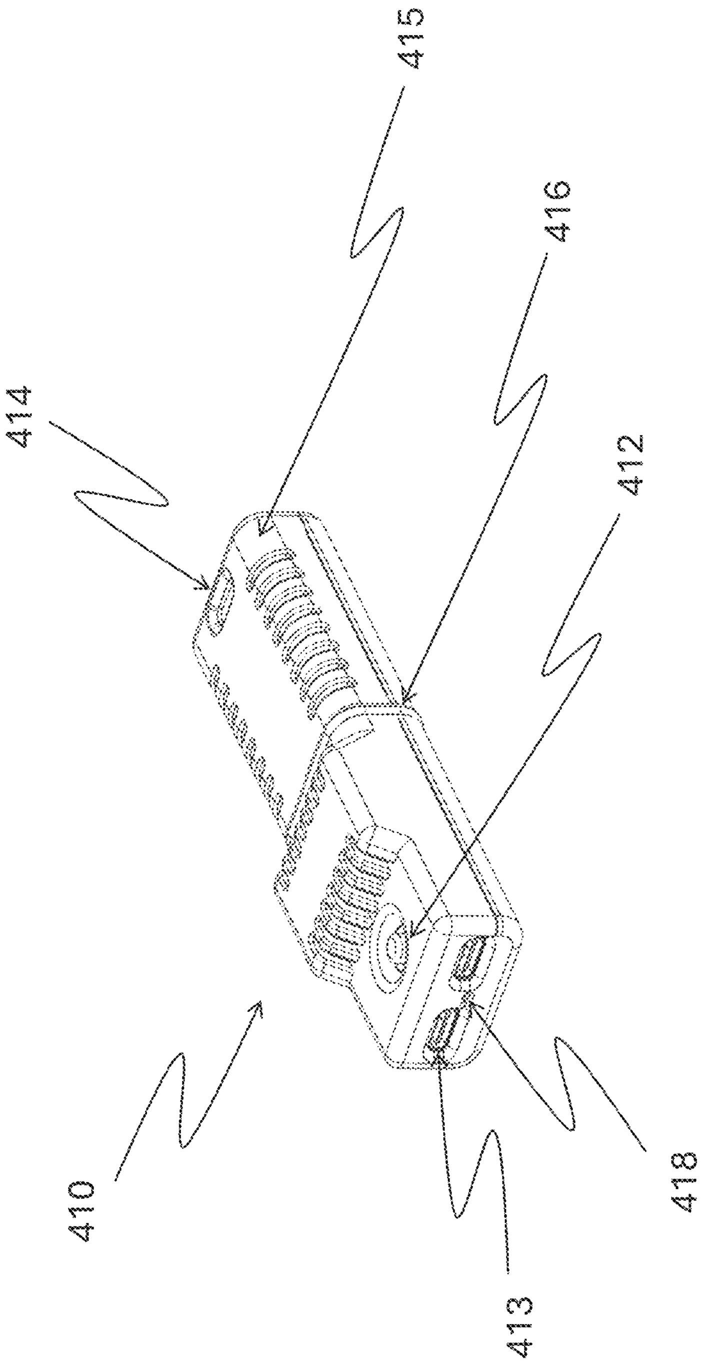
FIG. 41 shows a perspective view of a drying and reactivation accessory combination.

In preferred embodiments, both desiccant drying and reactivation can be contemplated in a combination device. Referring to FIG. 41, a drying and reactivation combination accessory device 410 is depicted with external power input ports 413, LED status indicator 418, start-stop button 412, elastomer seal 416, internal power port 414, and enclosure 415.

Figure 42:
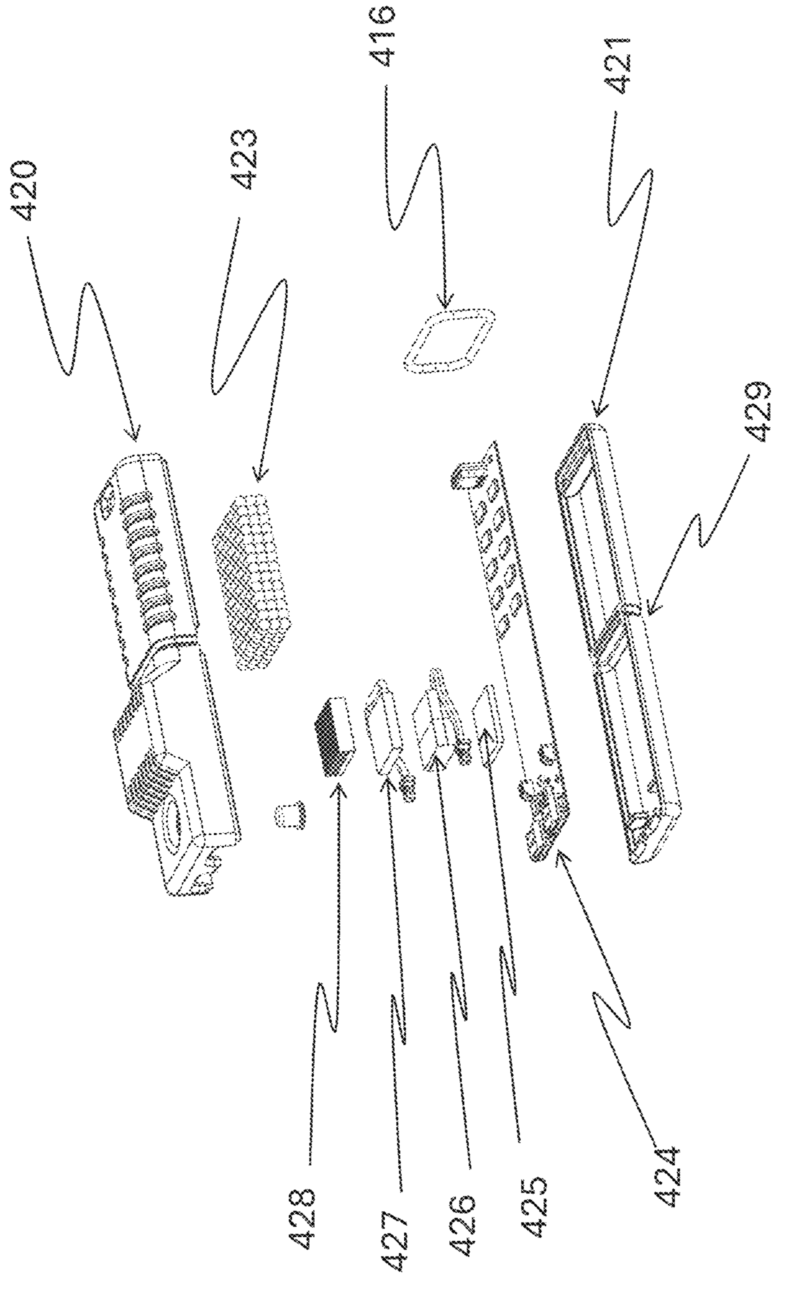
FIG. 42 is an exploded view of the drying and reactivation accessory of FIG. 41.
Figure 43:
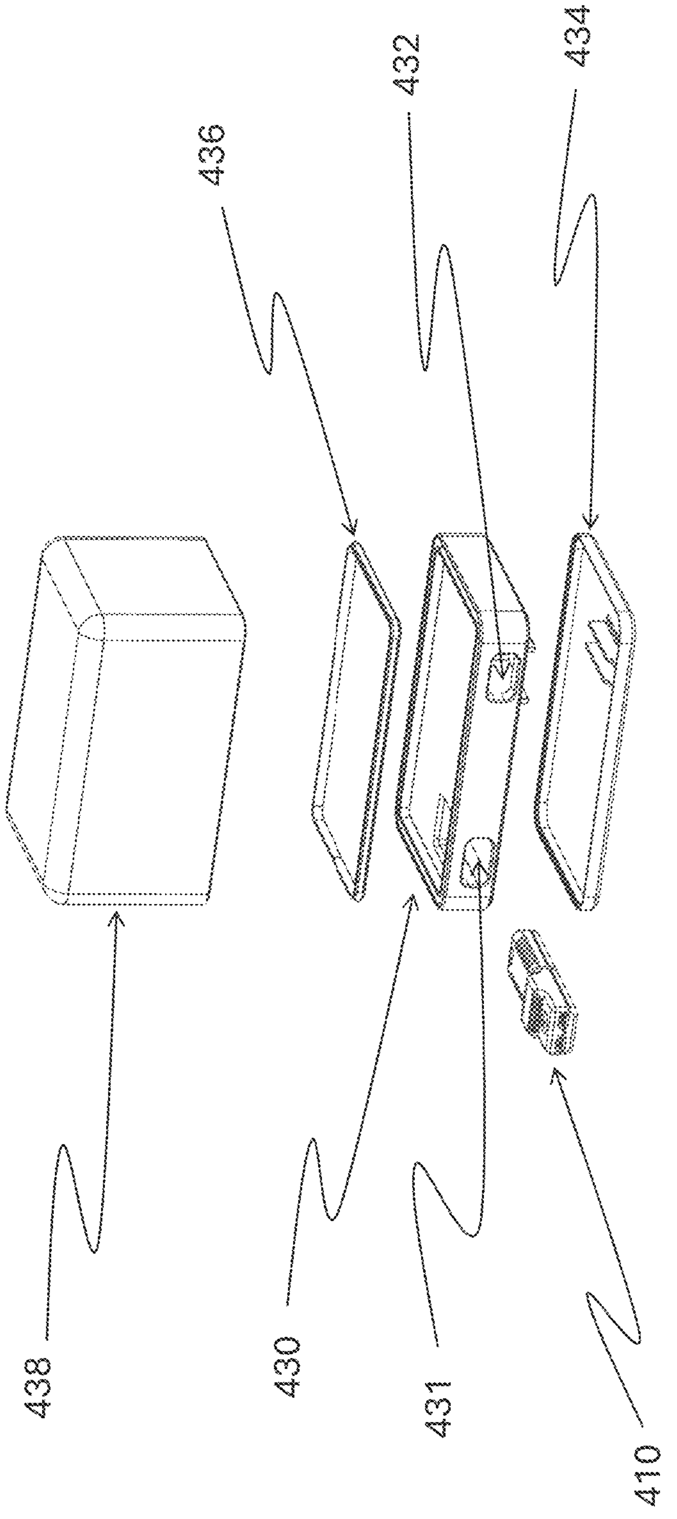
FIG. 43 depicts an exploded view of a drying chamber together with the drying and reactivation accessory of FIG. 41.

Referring now to FIG. 42, an exploded view of drying and reactivation combination accessory of FIG. 41 is shown in an exploded perspective view. Upper housing 420 and lower housing 421 are injection molded from high temperature plastic such as Ultem 1000 and mate together forming a hermetically sealed internal environment. Elastomeric seal ring 416 of FIG. 41 fits in seal groove 429 to allow airtight sealing of desiccant 423. Printed circuit board 424 contains control electronics for humidity monitoring and heating control. Insulation pad 425 is mounted between printed circuit board 424 and rechargeable battery 426. Thermoelectric module 427 is mounted on rechargeable battery 426 which provides a cooling mechanism during reactivation of desiccant 423, thus allowing adequate battery charging. Heat sink 428 is mechanically attached to opposite side of thermoelectric modules 427 and provides heat dissipation during reactivation thus allowing rechargeable battery 426 to maintain an adequate charging temperature. As best shown in FIG. 43, drying and reactivation accessory device 410 of FIG. 41 can be inserted into drying port 431 or reactivation port 432 of drying chamber base 430. Drying chamber base 430 is covered using base cover 434 which permits convective air flow to ambient air which drying and reactivation accessory device 410 is inserted into reactivation port 432. Conversely, when drying and reactivation accessory device 410 is inserted into drying port 431, convective air flows into drying chamber 438 which is sealed to drying chamber base 430 using seal chamber seal 436.

Figure 44:
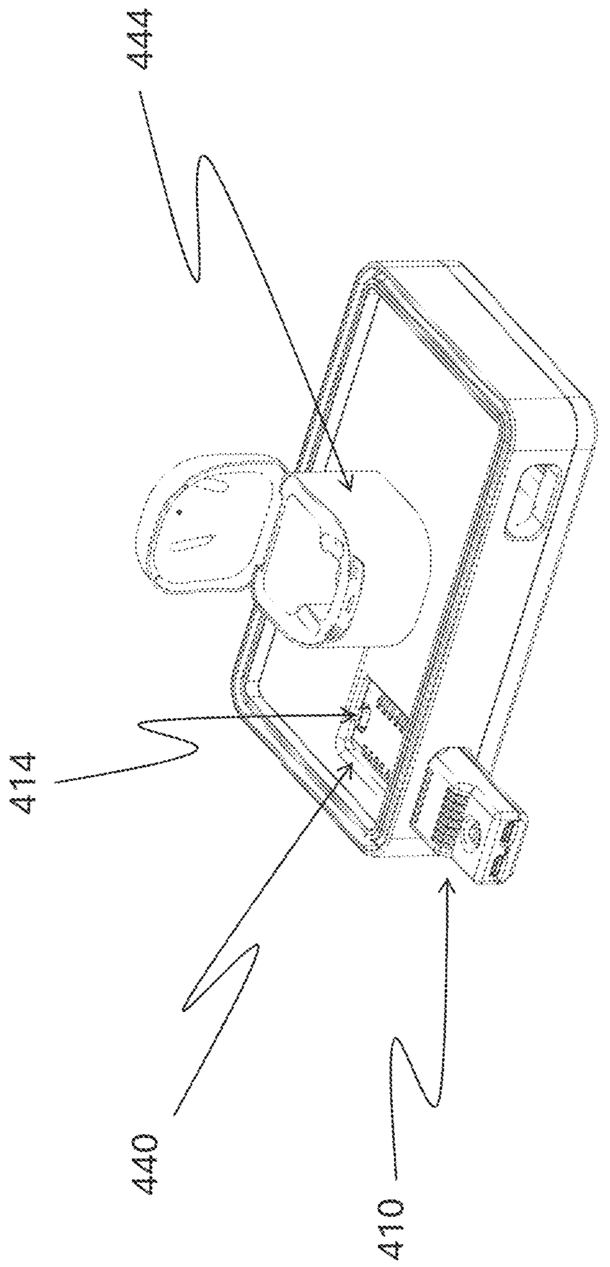
FIG. 44 shows the base of a drying chamber with a typical wireless earbud case together with the drying and reactivation accessory of FIG. 41 inserted in the drying port.
Figure 45:
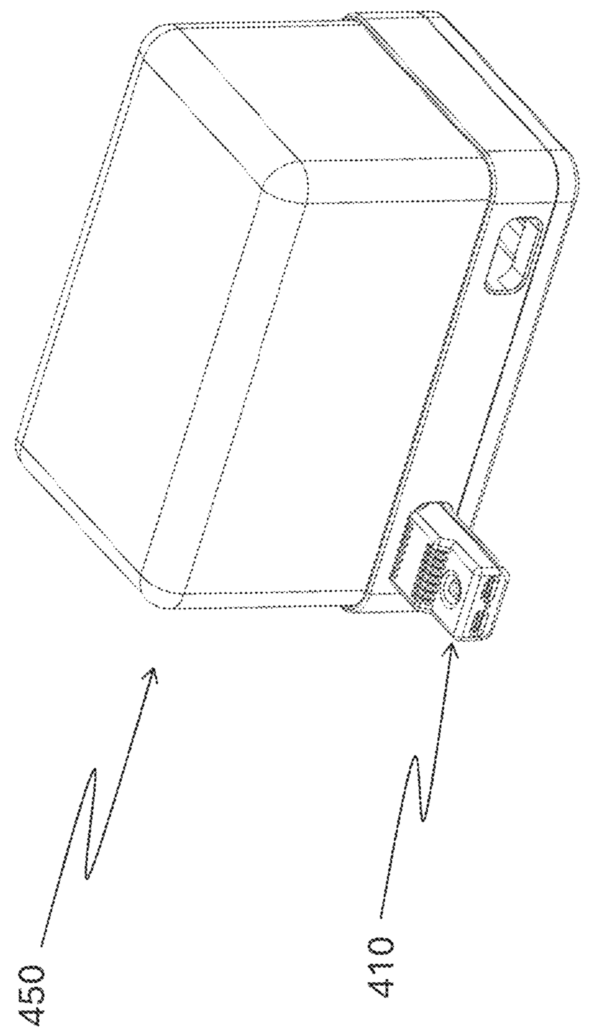
FIG. 45 depicts a typical arrangement for drying wireless earbuds with drying and reactivation accessory of FIG. 41 inserted into the drying port.
Figure 46:
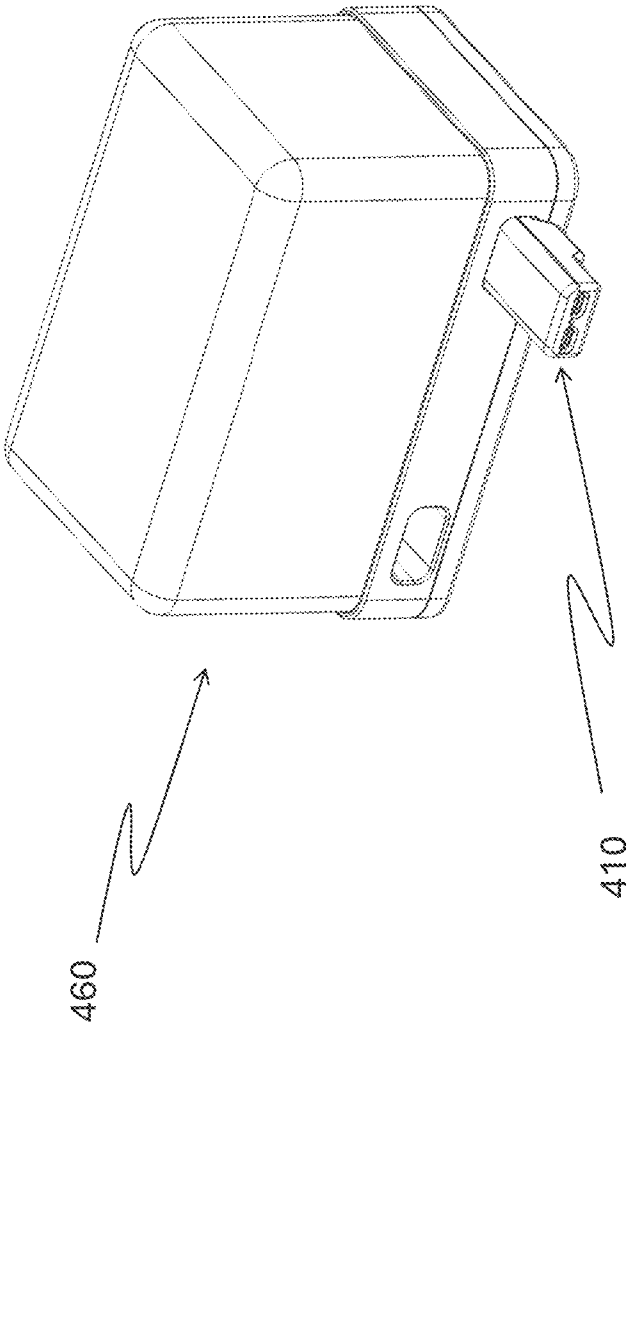
FIG. 46 depicts a typical arrangement for reactivating the desiccant of drying and reactivation accessory of FIG. 41 with insertion into the reactivation port.

Referring now to FIG. 44, drying and reactivation accessory device 410 of FIG. 41 is shown inserted into drying chamber base 430 of FIG. 43, with drying chamber base opening 440 charge port 414 of FIG. 41, and wireless earbud case 444. As best shown in FIG. 45, drying box 450 is depicted with drying and reactivation accessory device 410 of FIG. 41 inserted into drying port 431 of FIG. 43. As best shown in FIG. 46, drying and reactivation accessory device 410 of FIG. 41 is now shown flipped over (180 degrees) and inserted into reactivation port 432 of FIG. 43. This configuration allows desiccant to be heated and reactivated, with heated and moist air being expelled to ambient air.

Figure 47:
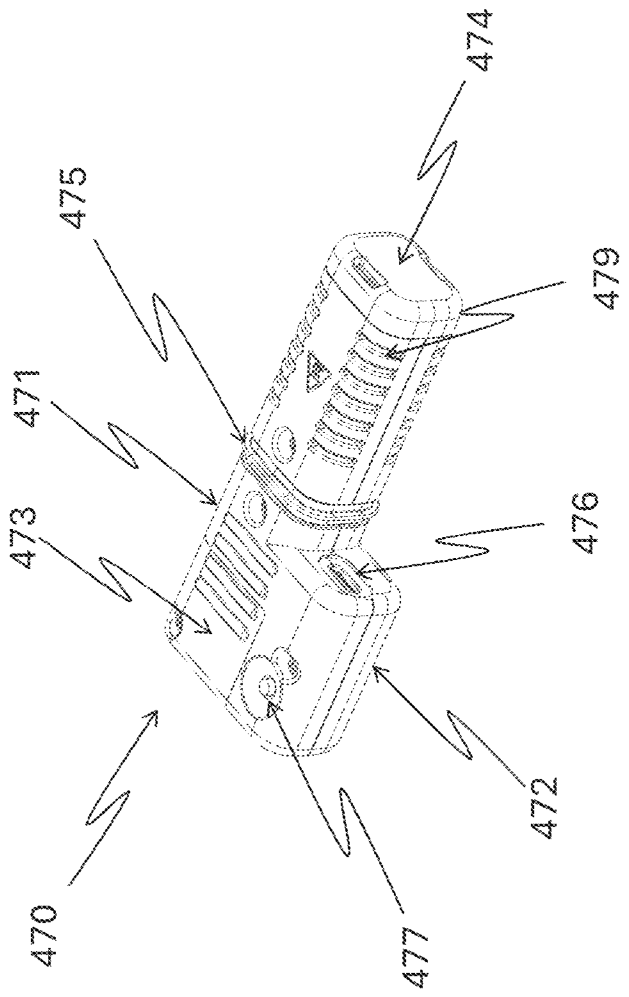
FIG. 47 depicts a reactivating desiccant cartridge that is both USB and battery powered.

Referring to FIG. 47, reactivating desiccant cartridge 470 is shown with upper housing 471, lower housing 472, battery cover 473, desiccant captivation cap 474, external airtight seal 475, USB power port 476, and start button 477.

Figure 48:
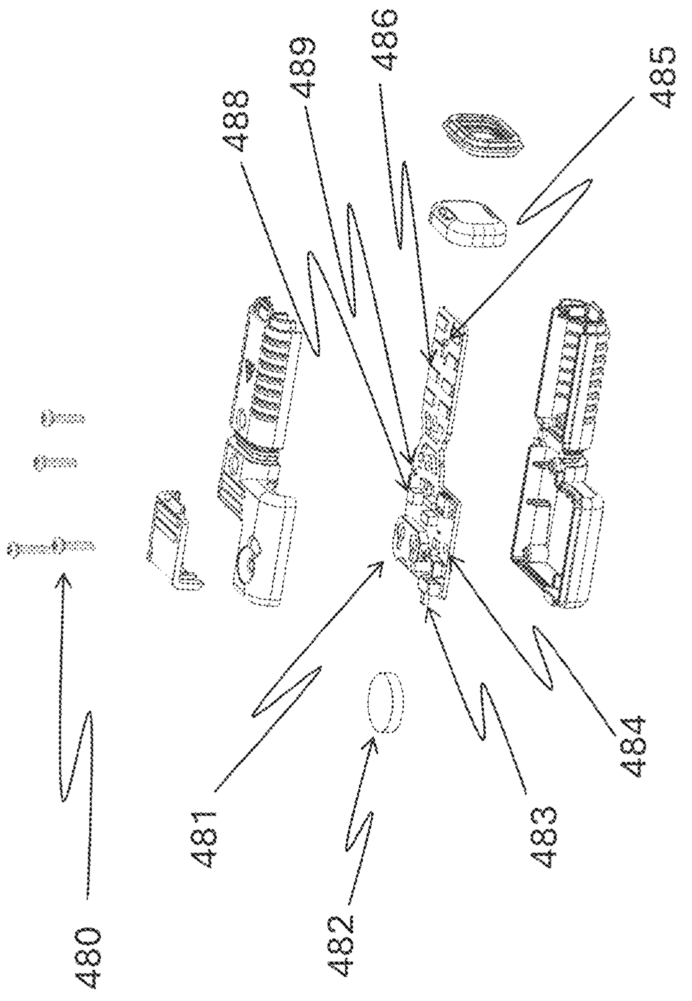
FIG. 48 is an exploded view of the reactivating desiccant cartridge of FIG. 47.

As best shown is FIG. 48, reactivation desiccant cartridge 470 of FIG. 47 has a plurality of fasteners 480, printed circuit board 481, coin cell battery 482, coin cell ON-OFF switch 483, LED indicator 484, desiccant humidity sensor 485, surface mount heating resistors 486, ambient air humidity sensor 488, and hall effect magnetic sensor 489.

Figure 49:
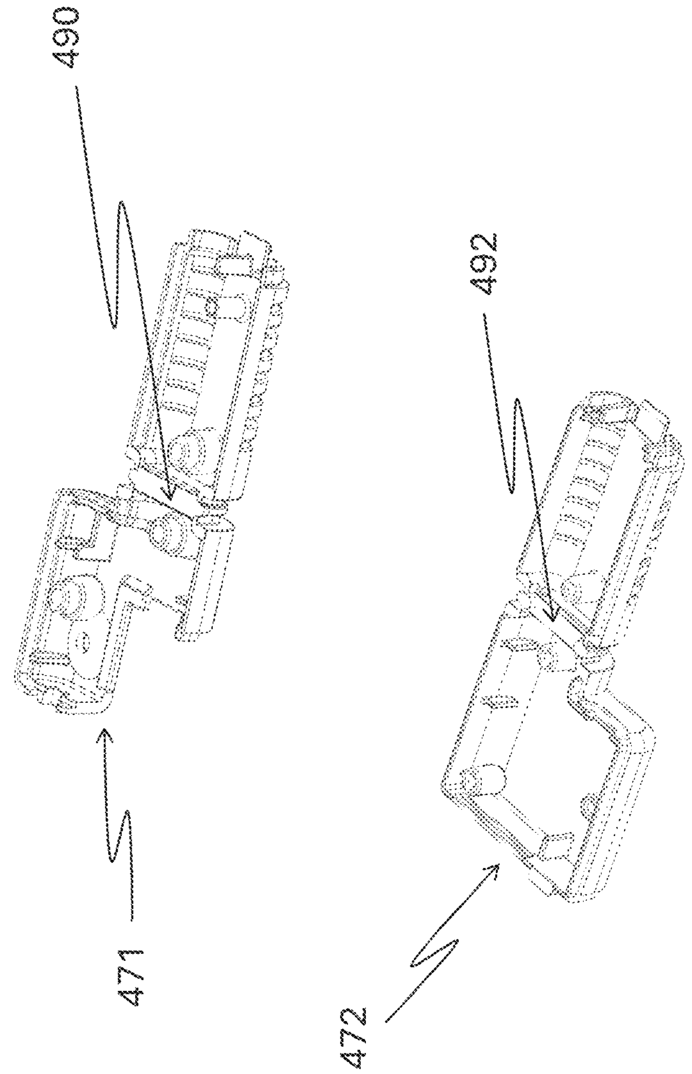
FIG. 49 is an exploded view of the upper and lower housings with internal sealable elastomers of the reactivating desiccant cartridge of FIG. 47.

Referring to FIG. 49, upper housing 471 and lower housing 472 of FIG. 47 are shown with internal upper over-molded seal 490 and internal lower over-molded seal 492. Upper over-molded seal 490 and lower over-molded seal 492 are made from elastomeric RTV and are used to create an airtight seal around printed circuit board 481 of FIG. 48.

Figure 50:
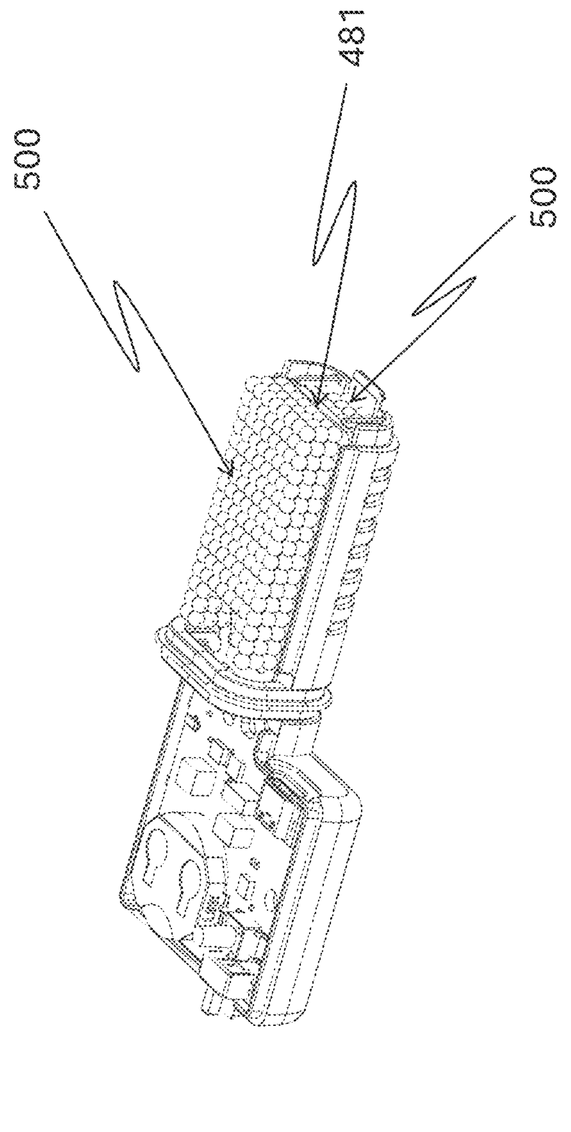
FIG. 50 is an isometric cutaway view of the reactivating cartridge with the lower housing, printed circuit board, and desiccant pellets.

As best shown in FIG. 50, a plurality of adsorbing desiccant pellets 500 are stacked in and around printed circuit board 481 of FIG. 47. Ideally, the amount by weight of desiccant ranges between 5 grams and 10 grams but could be a greater if desired. Through exhaustive testing, silica dioxide and molecular sieve pellets can adsorb 18-20% by weight or approximately 1-2 grams can be adsorbed, or 1000-2000 microliters.

Figure 51:
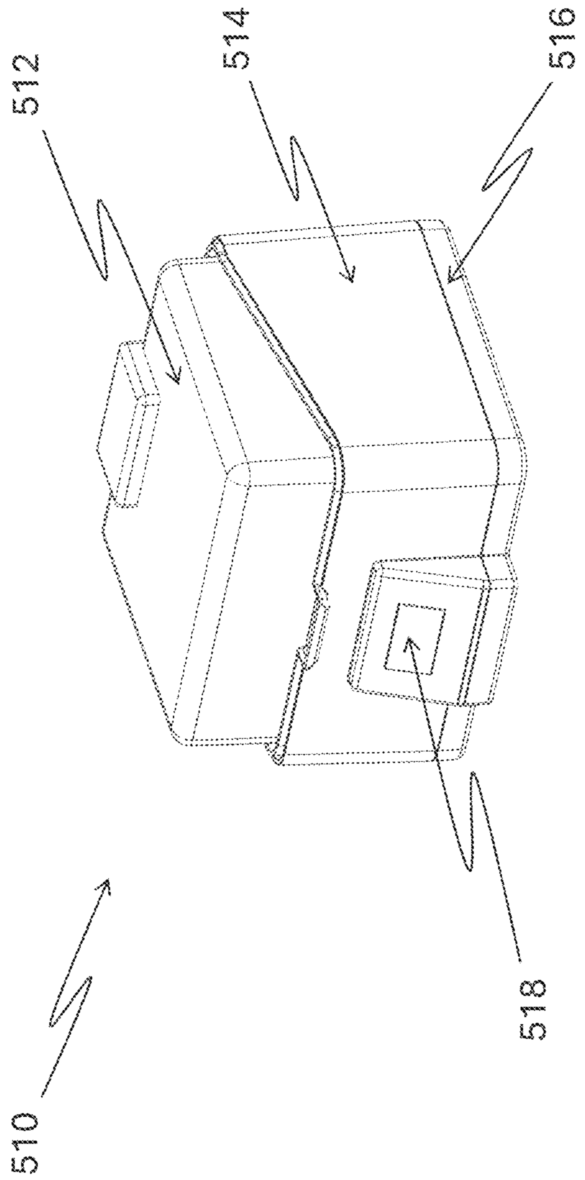
FIG. 51 depicts an airtight drying chamber with hinged lid and display.

Now referring to FIG. 51, an airtight drying and charging chamber 510 has hinged lid 512, chamber base 514, chamber base cover 516, and display 518. Display 518 has an ambient light sensor integrated into the display to allow the automatic dimming of display 518 at night presumably to allow consumers to not be bothered by any extraneous light.

Figure 52:
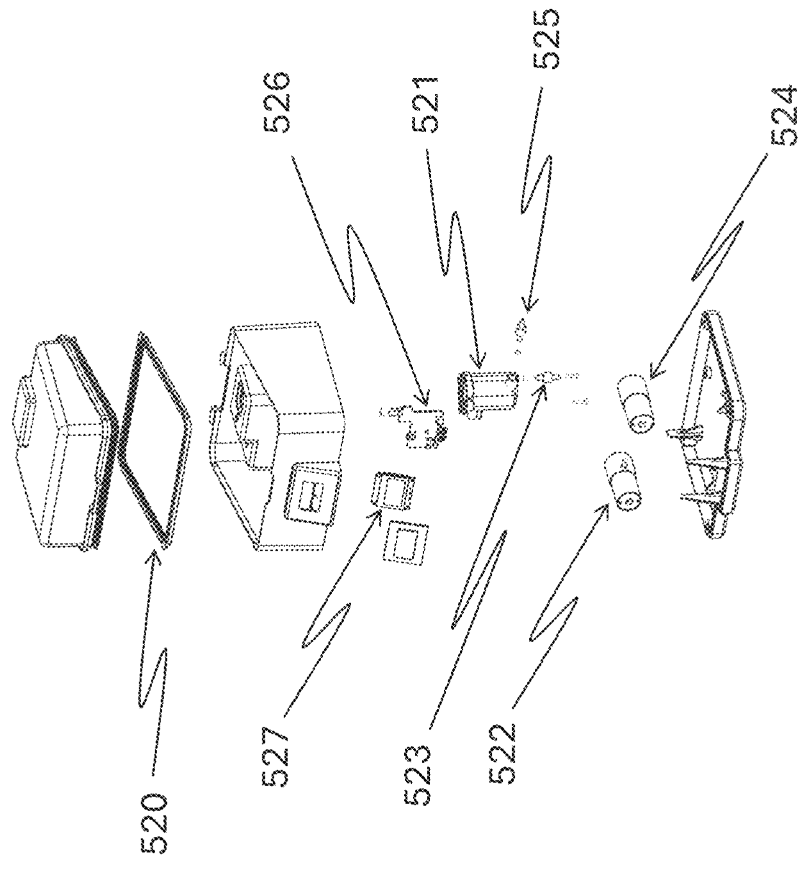
FIG. 52 is an exploded isometric view of an airtight drying assembly.

Referring to FIG. 52, airtight seal 520 which mounts around lid 512 of FIG. 51 provides an airtight seal against chamber base 514 of FIG. 51. Desiccant cartridge receptacle 521 is used to pass airflow using drying air pump 522 and drying valve 523, reactivating air pump 524 and reactivating valve 525, pass-thru power printed circuit board 526, and display board 527. Pass-thru power printed circuit board 526 provides charging power via a USB jack into airtight chamber 510 and provides power to reactivating desiccant cartridge 470 of FIG. 47 when inserted into desiccant cartridge receptacle 521.

Figure 53:
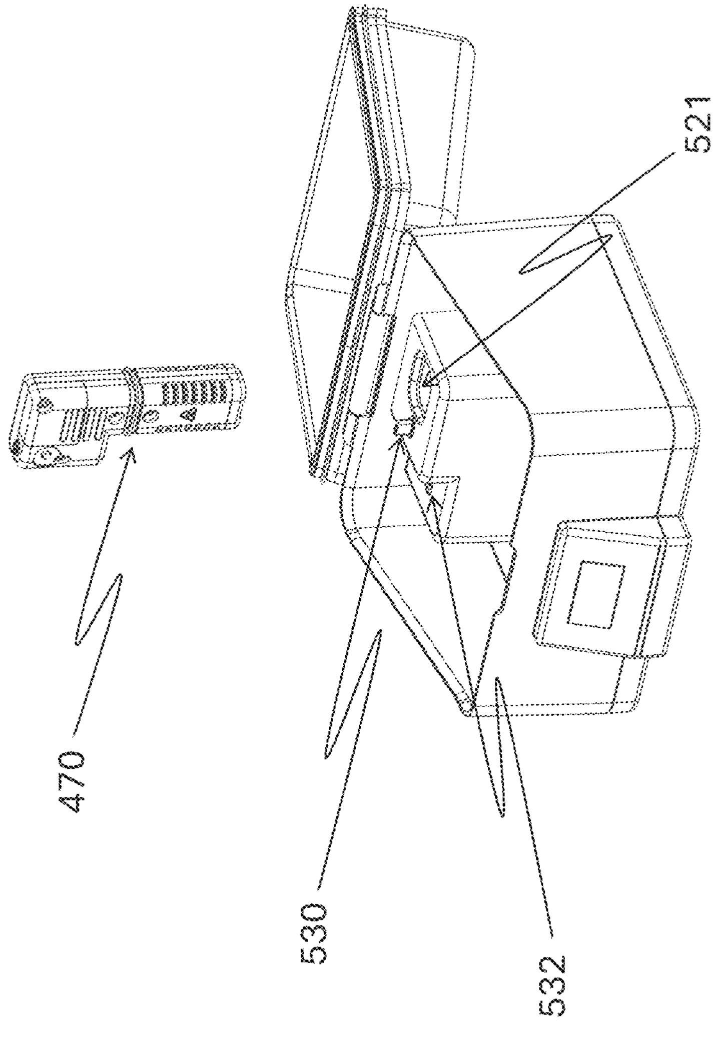
FIG. 53 is an isometric view of the airtight drying assembly and desiccant cartridge prior to insertion into receptacle.

As best shown in FIG. 53, airtight chamber 510 of FIG. 51 has desiccant cartridge power port 530, charging device power port 532, desiccant cartridge 470 of FIG. 47, and desiccant cartridge receptacle 521 of FIG. 52 prior to desiccant cartridge 470 being inserted.

Figure 54:
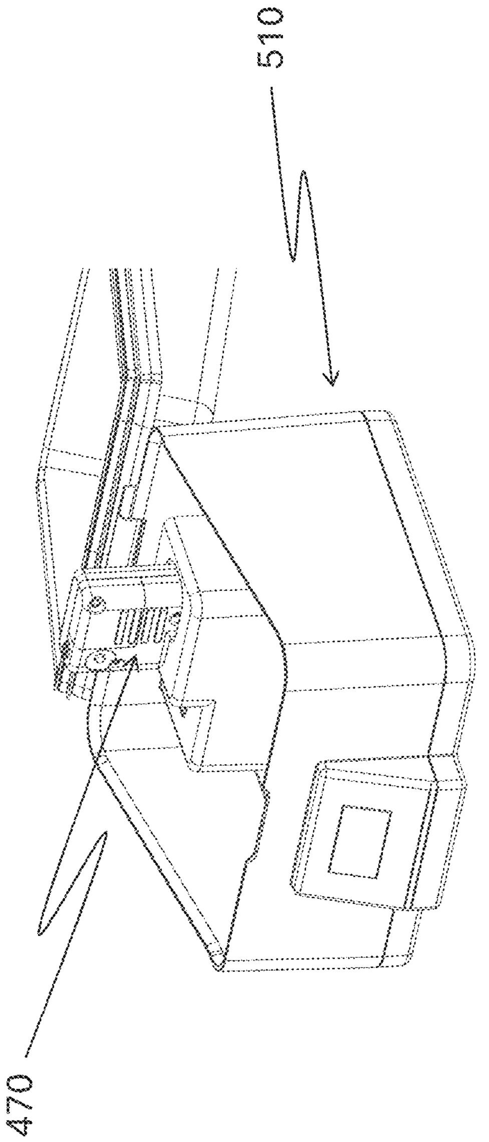
FIG. 54 is an isometric view of the airtight drying chamber of FIG. 53 with desiccant cartridge seated in receptacle.

Referring now to FIG. 54, desiccant cartridge 470 of FIG. 47 is shown fully seated into airtight drying chamber 510 of FIG. 51. As desiccant cartridge 470 of FIG. 47 is inserted, desiccant cartridge power port 530 engages with desiccant cartridge USB power port 476 and draws power from pass-thru power printed circuit board 526 of FIG. 52.

Figure 55:
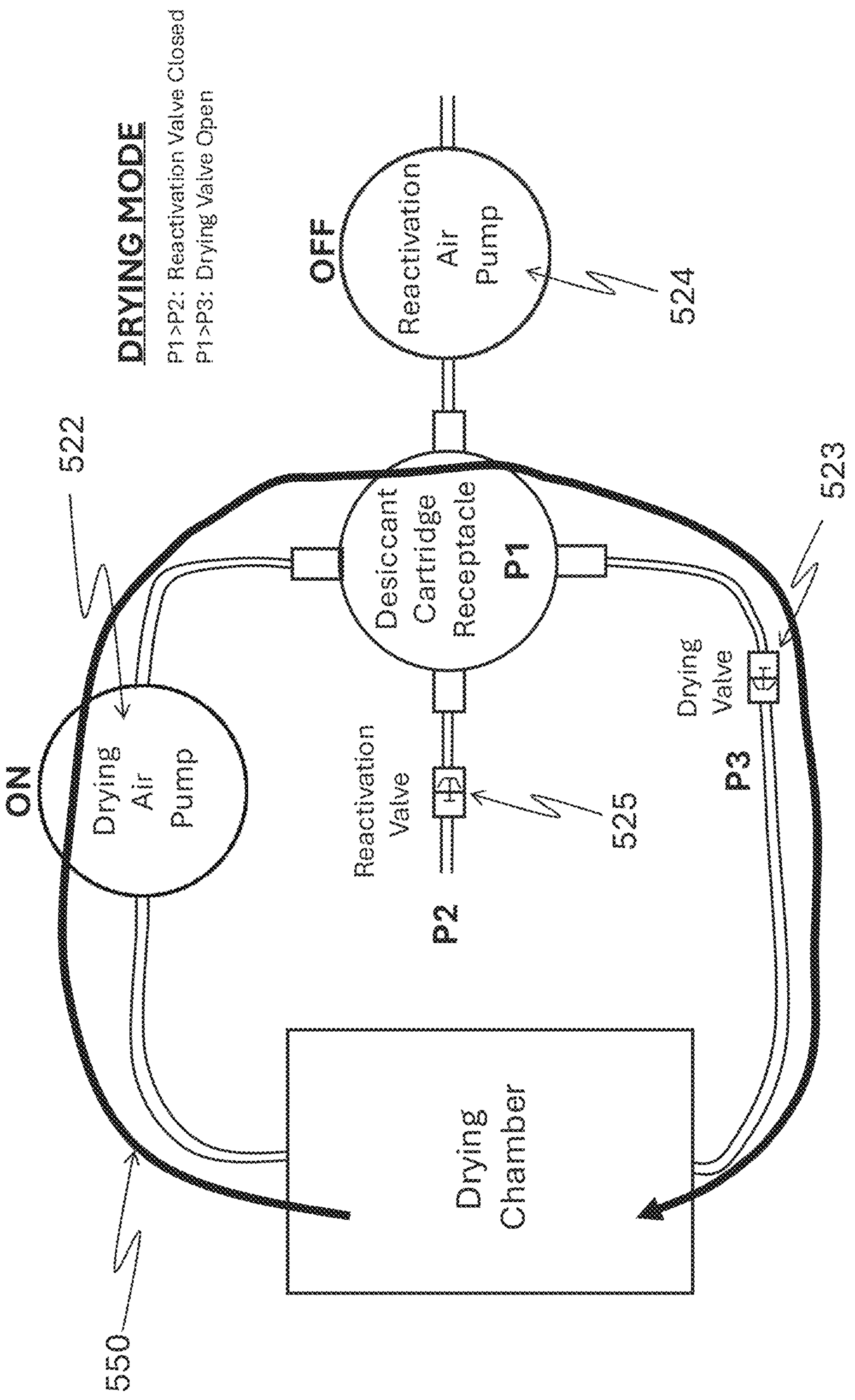
FIG. 55 depicts the airflow path of the drying chamber during the drying phase.

As best shown in FIG. 55, drying air flow path 550 is generated with drying air pump 522 of FIG. 52 powered ON, and reactivating air pump 524 of FIG. 52 powered OFF. Pressure P1 from drying air pump 522 allows drying valve 523 to open and circulate air through drying chamber due to lower pressure P3. Drying air pump 522 pressure P1 keeps reactivation umbrella valve 525 of FIG. 52 closed due to P1 being a higher pressure than P2 while reactivation air pump 524 stops any airflow to ambient thus permitting drying air flow path 550 to be completely isolated.

Figure 56:
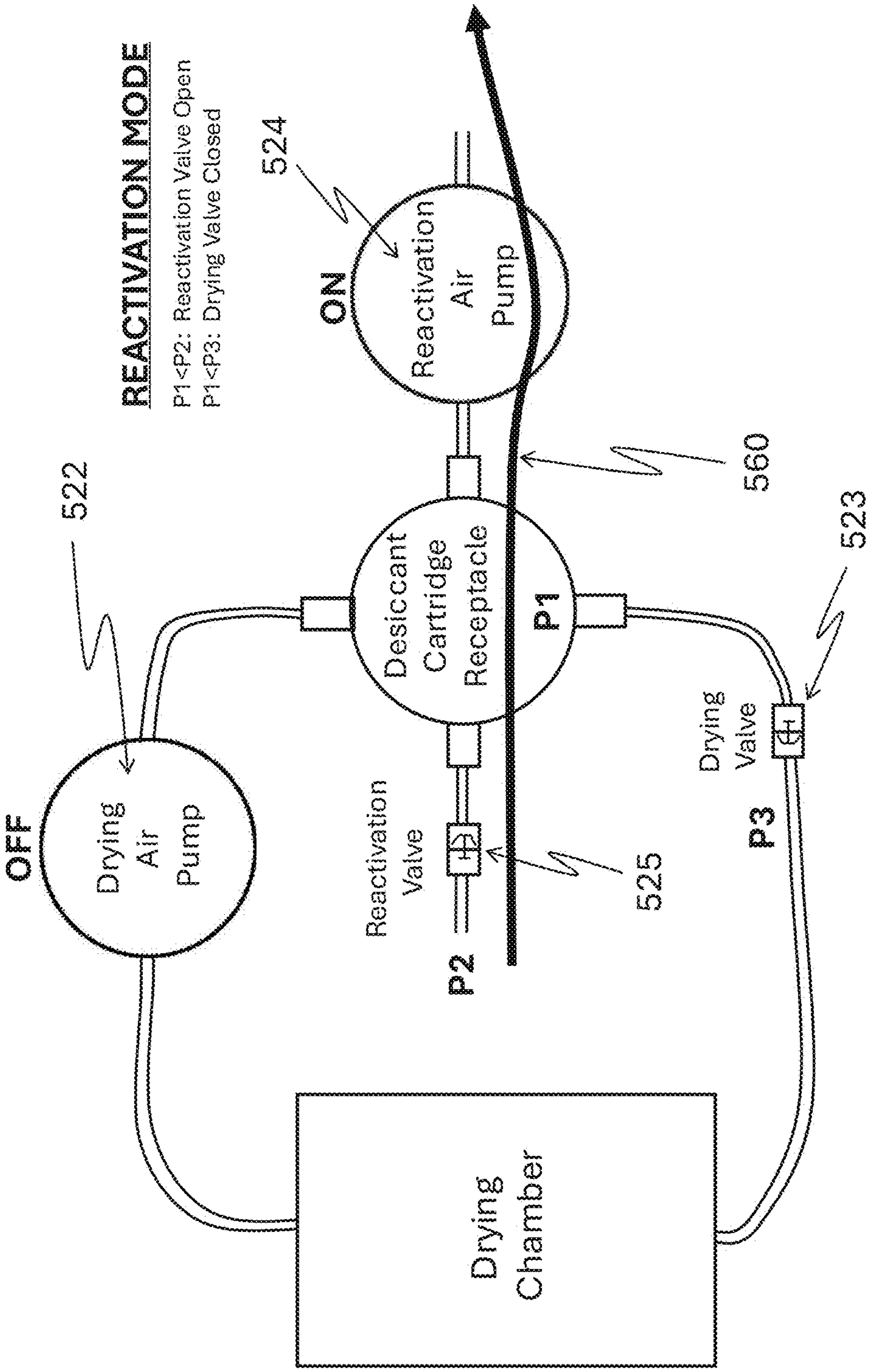
FIG. 56 depicts the airflow path of the drying chamber during the desiccant reactivation phase.

As best shown in FIG. 56, reactivating air flow path 560 is generated with reactivating air pump 524 of FIG. 52 powered ON, while drying air pump 522 of FIG. 52 is powered OFF. Vacuum pressure from reactivating air pump 524 allows reactivating umbrella valve 525 to open due to P1 being less than P2, bringing in ambient air and exhausting this air to ambient. Vacuum pressure P1 from reactivating air pump 524 keeps drying umbrella valve 523 closed, while drying air pump 522 blocks any air flow, isolating the drying chamber from the reactivation phase.

Figure 57:
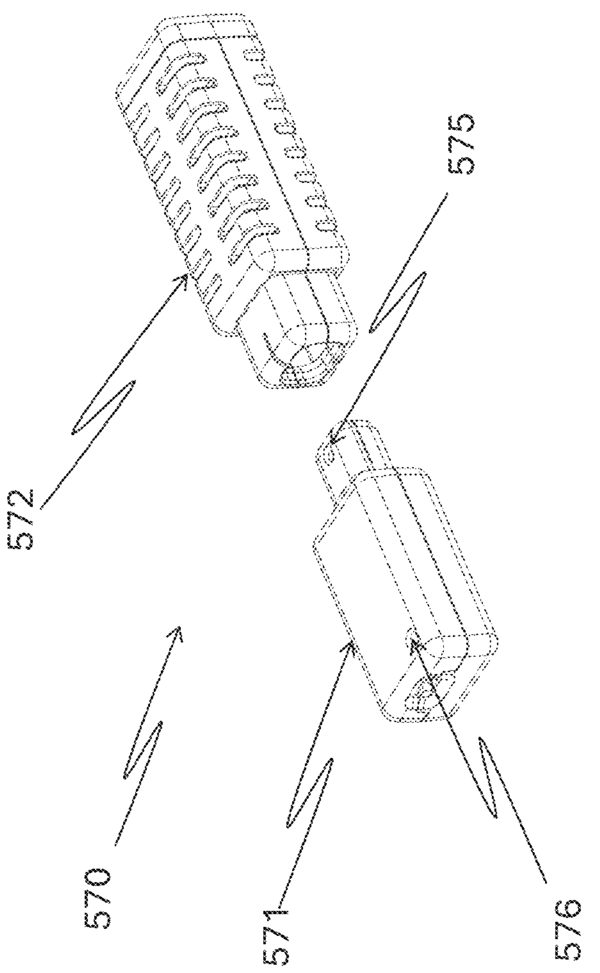
FIG. 57 is an isometric depiction of a small, travel-sized desiccant drying device with the reusable sensor sub-assembly separated from the desiccant cartridge.

Referring now to FIG. 57, non-reactivating desiccant dryer 570 is depicted with reuseable sensor assembly 571 and non-reactivating desiccant cartridge 572. Reusable sensor assembly 571 incorporates ambient humidity sensor port 576 and desiccant humidity sensor port 575.

Figure 58:
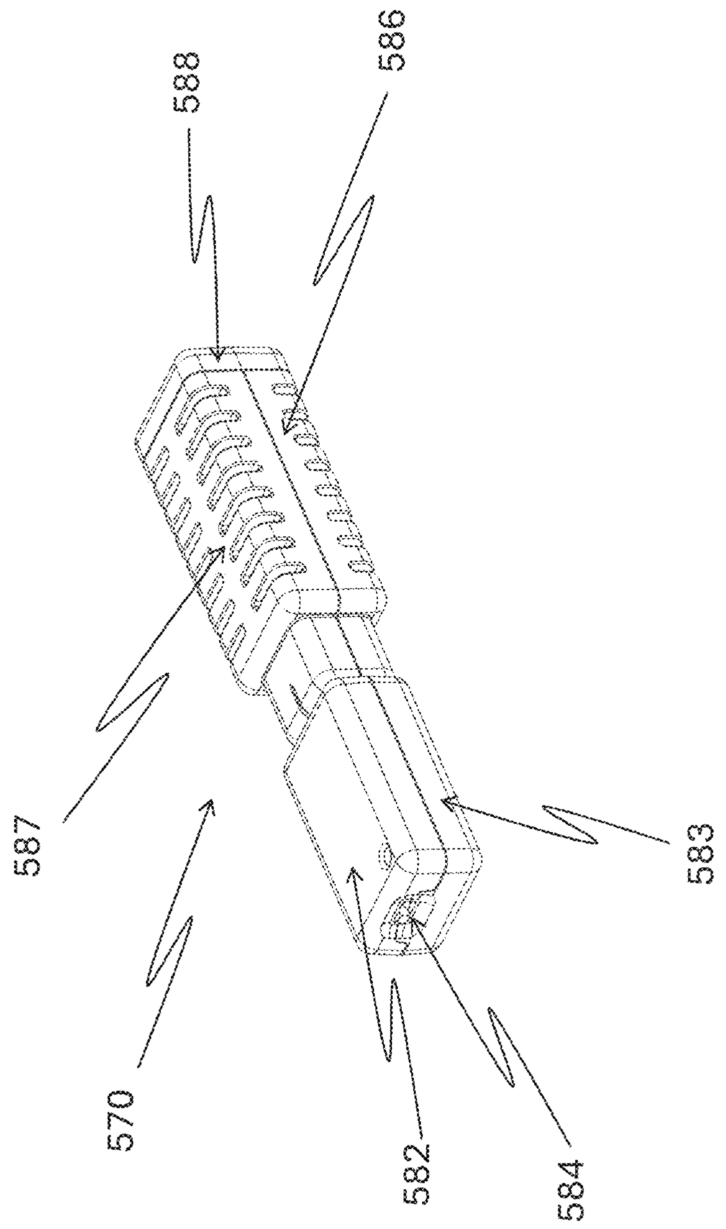
FIG. 58 is an isometric view of the travel-sized desiccant drying device of FIG. 57 with the reusable sensor sub-assembly connected to the desiccant cartridge.

As best shown in FIG. 58, non-reactivating desiccant dryer 570 is depicted with reusable sensor upper housing 582, reusable sensor lower housing 583, non-reactivating desiccant cartridge upper housing 587, non-reactivating desiccant cartridge lower housing 586, non-reactivating desiccant cartridge cap 588, and power switch 584. Reusable sensor assembly 571 of FIG. 57 and non-reactivating desiccant cartridge 572 of FIG. 57 are coupled together.

Figure 59:
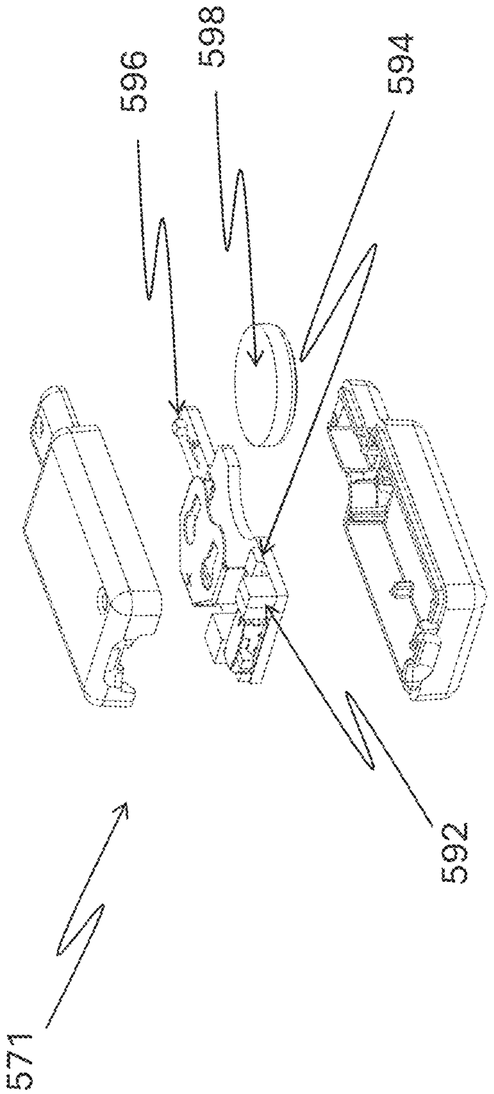
FIG. 59 is an exploded isometric view of the reuseable sensor sub-assembly of FIG. 57.

Referring now to FIG. 59, reusable sensor subassembly 571 of FIG. 57 has printed circuit board 591, LED indicator 592, ambient humidity sensor 594, coin cell 598, and desiccant humidity sensor 596. Coin cell 598 is removeable for replacement purposes while non-reactivating desiccant cartridge 572 of FIG. 57 is disposable for replacement purposes.

Figure 60:
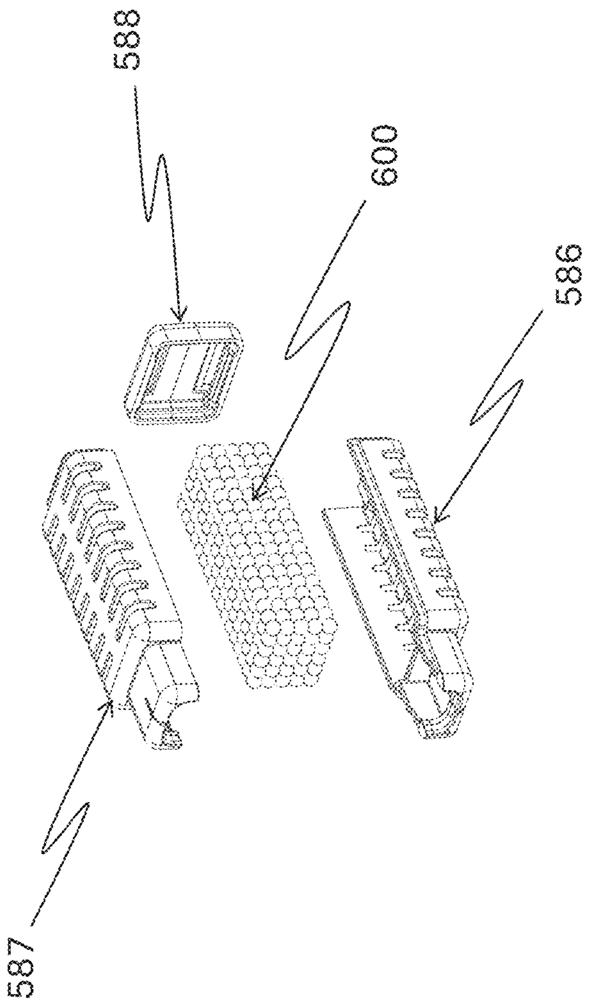
FIG. 60 is an exploded isometric view of the desiccant cartridge of FIG. 57.

Referring to FIG. 60, and exploded isometric view depicts non-reactivating desiccant cartridge upper and lower housing 587 and 586 of FIG. 58, captivating desiccant cap 588, and a plurality of adsorbing desiccant pellets 600. Non-reactivating desiccant cartridge 572 of FIG. 57 contains 4-5 grams of silica dioxide or molecular sieve and can adsorb approximately 800-1000 microliters of water at 10 microliters per minute.

Figure 61:
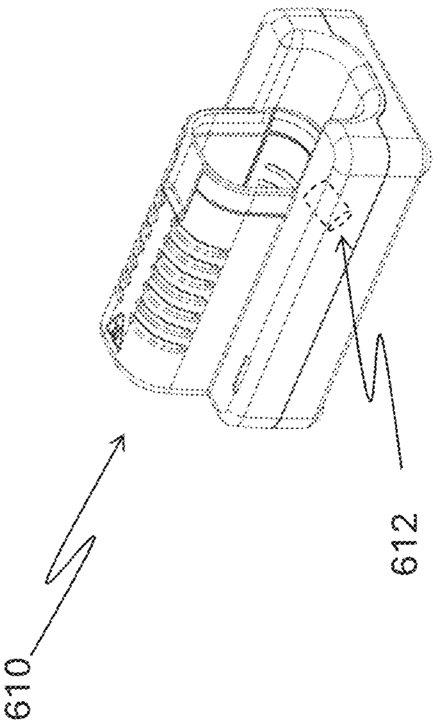
FIG. 61 depicts a reactivating desiccant cartridge cradle.

Referring to FIG. 61, reactivating desiccant cartridge cradle 610 is shown with insertable magnet 612 housed inside reactivating desiccant cartridge cradle 610. Insertable magnet 612 has a magnetic field of between 500 and 2500 uT which is adequate to trigger hall effect magnetic sensor 489 of FIG. 48. Reactivating desiccant cartridge cradle 610 is fabricated from heat resistant polymers such as Ultem, Lexan, or ABS and is used as a heat protecting shield during the reactivation phase of reactivating desiccant cartridge 470.

Figure 62:
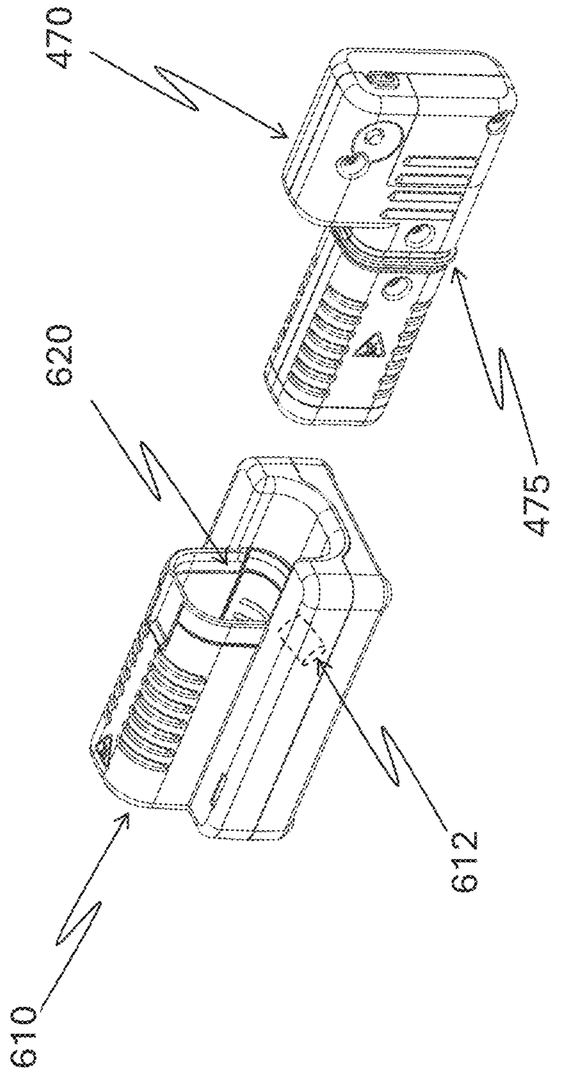
FIG. 62 depicts the reactivating desiccant cartridge cradle of FIG. 61 in relation to the reactivating desiccant cartridge of FIG. 47 prior to insertion.

As best shown in FIG. 62, reactivating desiccant cartridge 470 of FIG. 47 is depicted with reactivating desiccant cartridge cradle 610 just prior to insertion. Inside surface 620 of reactivating desiccant cartridge cradle 610 provides alignment and fit for external airtight seal 475 of FIG. 47. This alignment ensures insertable magnet 612 of FIG. 61 provides orthogonality of magnetic field form insertable magnet 612 and hall effect sensor 489 of FIG. 48.

Figure 63:
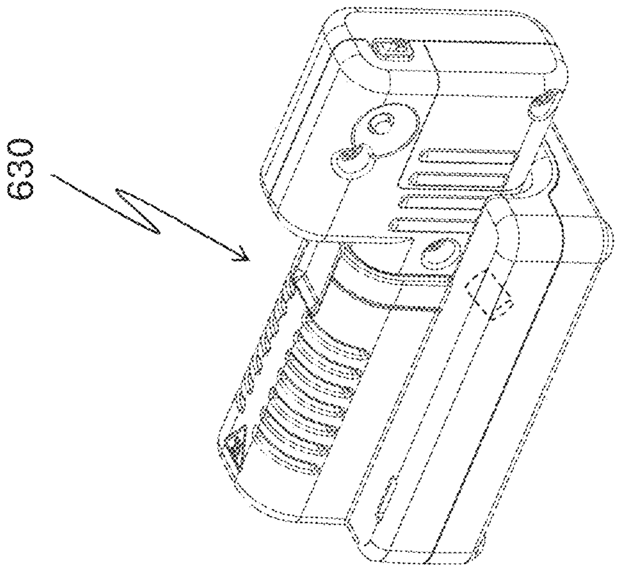
FIG. 63 depicts the reactivating desiccant cartridge cradle of FIG. 61 in relation to the reactivating desiccant cartridge of FIG. 47 being inserted.

Now referring to FIG. 63, reactivating desiccant cartridge 470 is shown fully inserted and mated with reactivating desiccant cartridge cradle 610 to form reactivating assembly 630.

Figure 64:
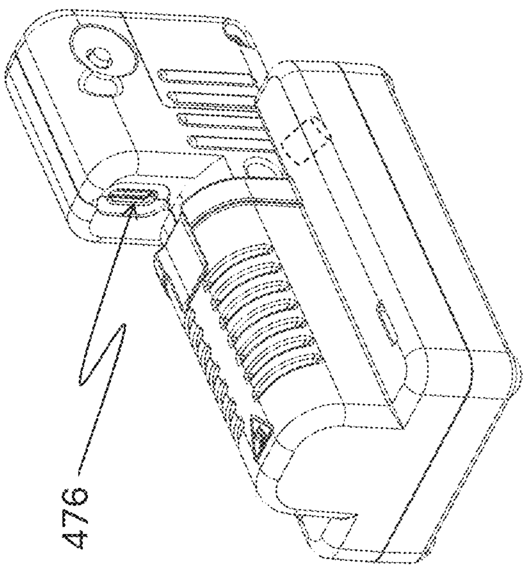
FIG. 64 depicts a perspective view of the reactivating desiccant cartridge cradle of FIG. 61 with a USB port.

Referring now to FIG. 64, USB power port 476 of FIG. 47 can now be accessed using a standard USB power cord. Power derived from USB power port 476 overrides battery power of coin cell battery 482 of FIG. 48. Power from USB power port 476 is electrically isolated to surface mount heating resistors 486 and allows reactivation of desiccant to occur.

Figure 65:
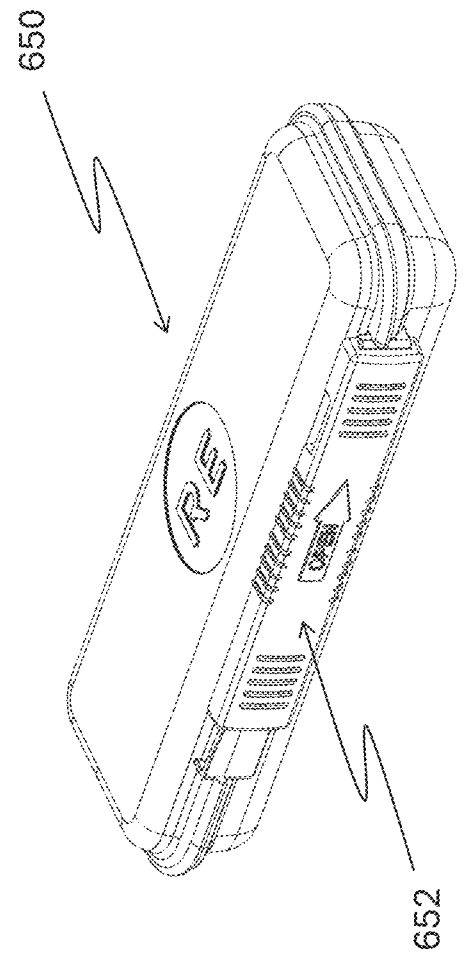
FIG. 65 depicts a perspective view of a very low Moisture Vapor Transmission Rate (MVTR) hearable drying enclosure.

As best shown in FIG. 65, a low Moisture Vapor Transmission Rate (MVTR) storage case 650 is shown with locking slide mechanism 652 in the closed/locked position. Storage case 650 is fabricated from polycarbonate, ABS, polyethylene, or any suitable impact resistant plastic and over-molded with thermoplastic polyimide urethane (TPU) film, molded with plastic additive, or coated with perfluoropolyether to produce a low MVTR of less than 0.1 milligrams/100 $in^2$/day.

Figure 66:
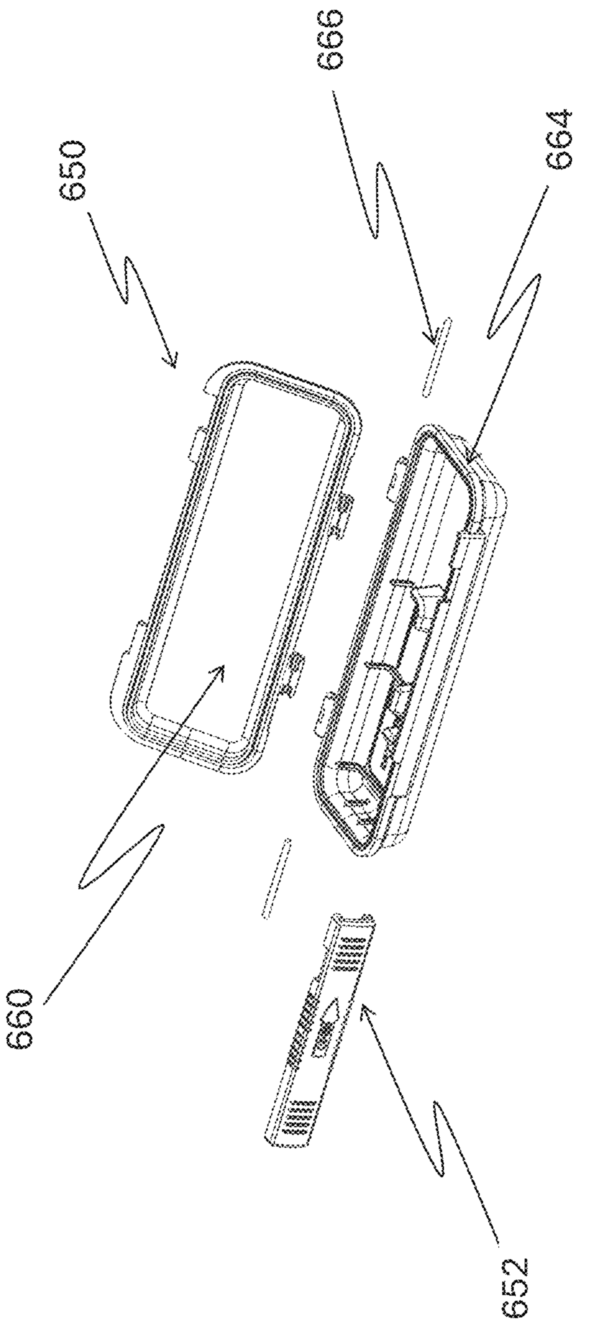
FIG. 66 depicts an exploded perspective view of a very low MVTR hearable drying enclosure.

Referring now to FIG. 66, storage case 650 is shown with locking slide mechanism 652, upper housing 660, lower housing 664, and hinge pin 666. In preferred embodiments, upper housing 660 is fabricated from clear or opaque plastic allowing a user to visually see any items withing storage case 650.

Figure 67:
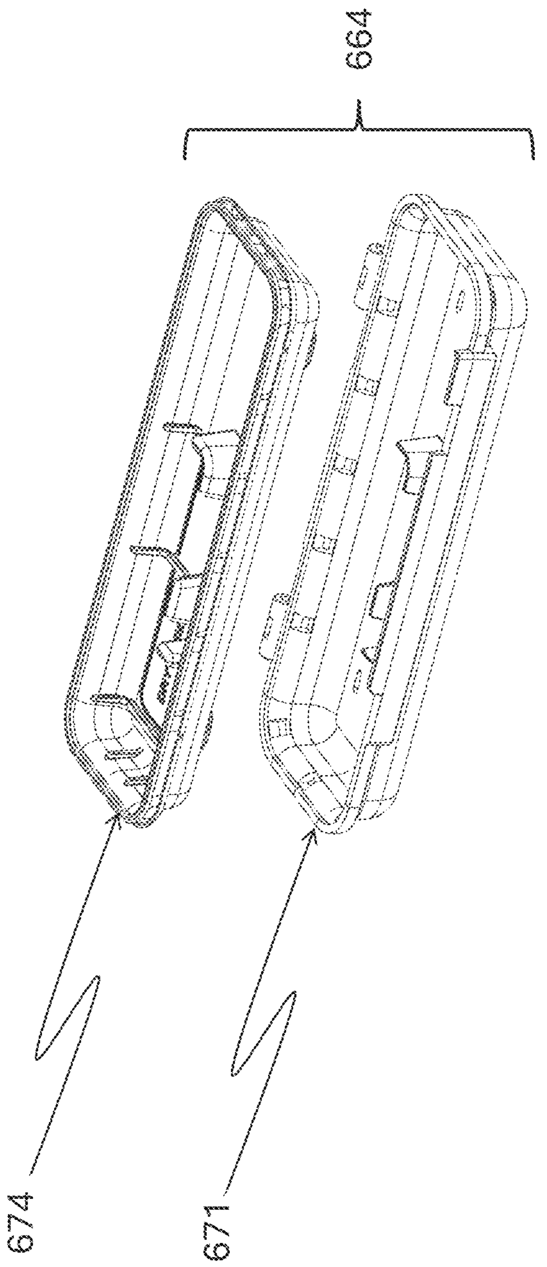
FIG. 67 depicts a perspective view of an over-molded MVTR liner segregated from the lower housing of a MVTR hearable drying enclosure.

As best shown in FIG. 67, lower housing 664 is comprised of plastic molded base 671 and a polyester TPU film 674. Polyester TPU film 674 is over-molded onto plastic molded base 671 to create a low MVTR and provide a soft compliant medium for storage of hearables.

Figure 68:
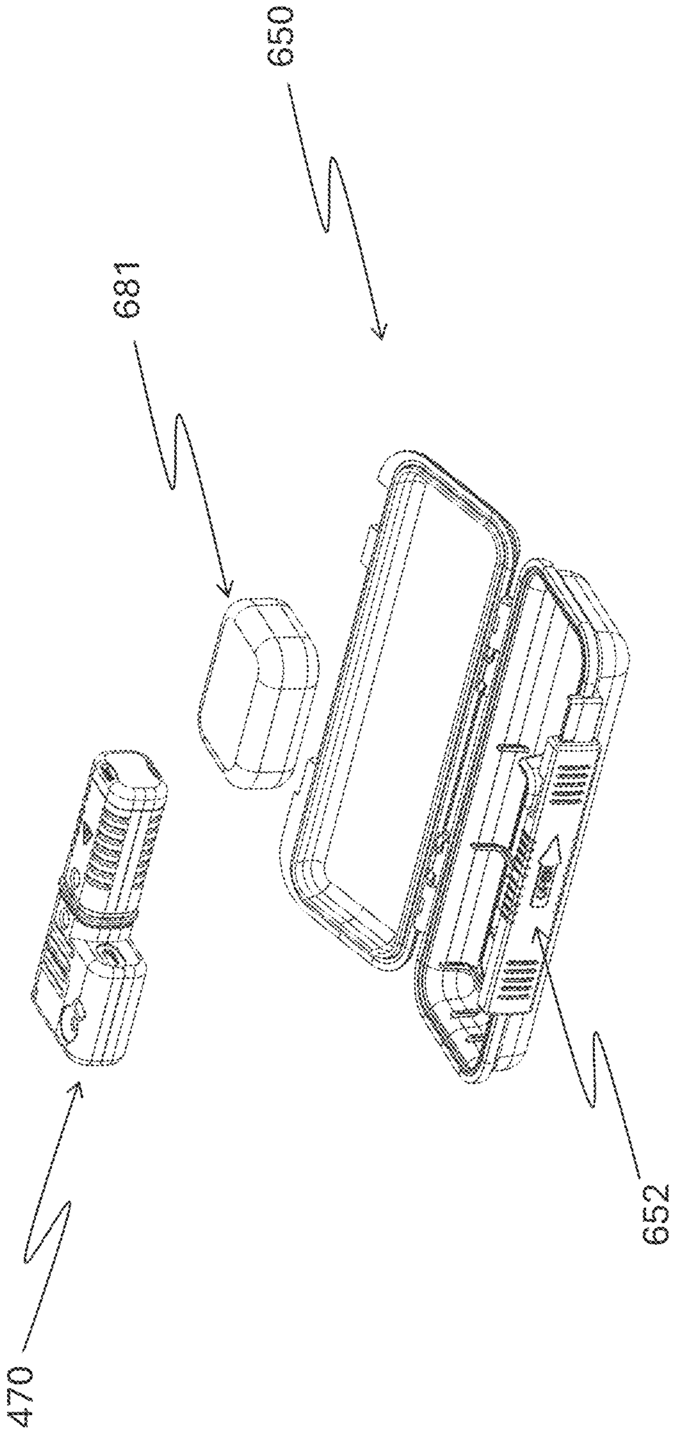
FIG. 68 depicts a very low MVTR hearable drying case together with a reactivatable desiccant cartridge and hearable storage case prior to insertion into very low MVTR hearable drying enclosure.
Figure 69:
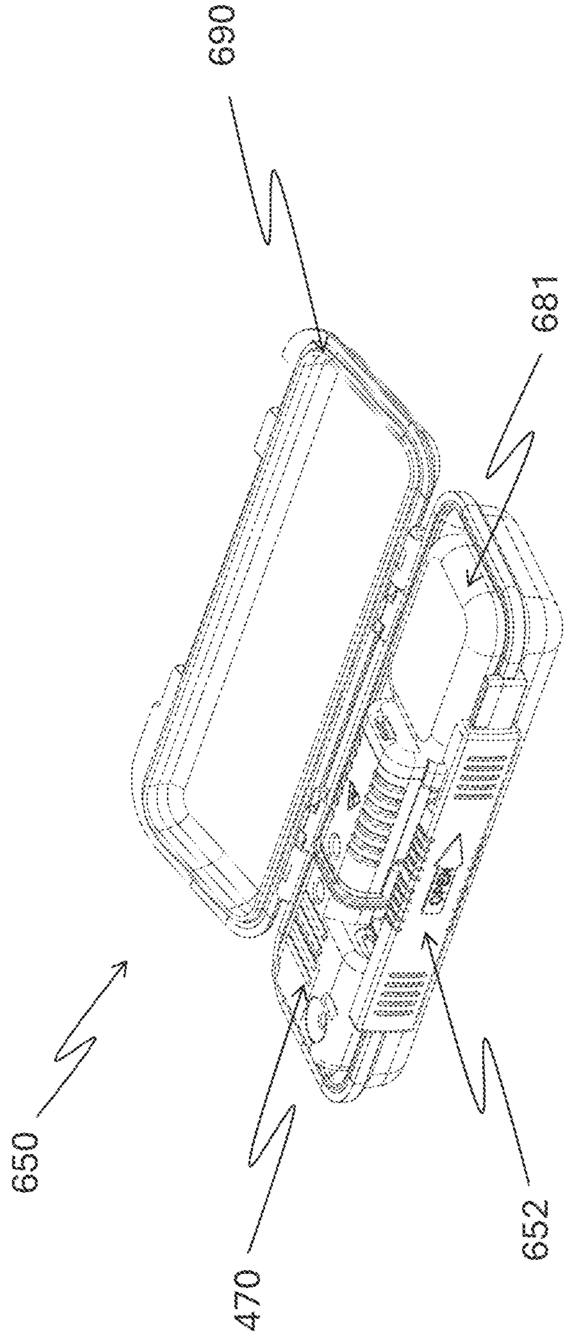
FIG. 69 is a perspective view of a reactivatable desiccant cartridge and hearable storage case inserted into a very low MVTR hearable drying enclosure.

Referring now to FIG. 68, storage case 650 has locking slide mechanism 652 in the open position. Regenerative desiccant cartridge 470 of FIG. 47 and hearing aid/hearable recharging case 681 are shown prior to insertion into storage case 650. As best shown in FIG. 69, regenerative desiccant cartridge 470 and hearing aid/hearable recharging case 681 are depicted resting inside storage case 650. Compliant sealing edge 690 is fabricated from soft polyester TPU film. Once storage case 650 is closed, locking slide mechanism 652 is slid into the closed position and storage case 650 provides a very low humidity drying chamber. Regenerative desiccant cartridge 470 provides visual indicators via LED's that indicate drying, dried to endpoint, and reactivation required phases.

Figure 70:
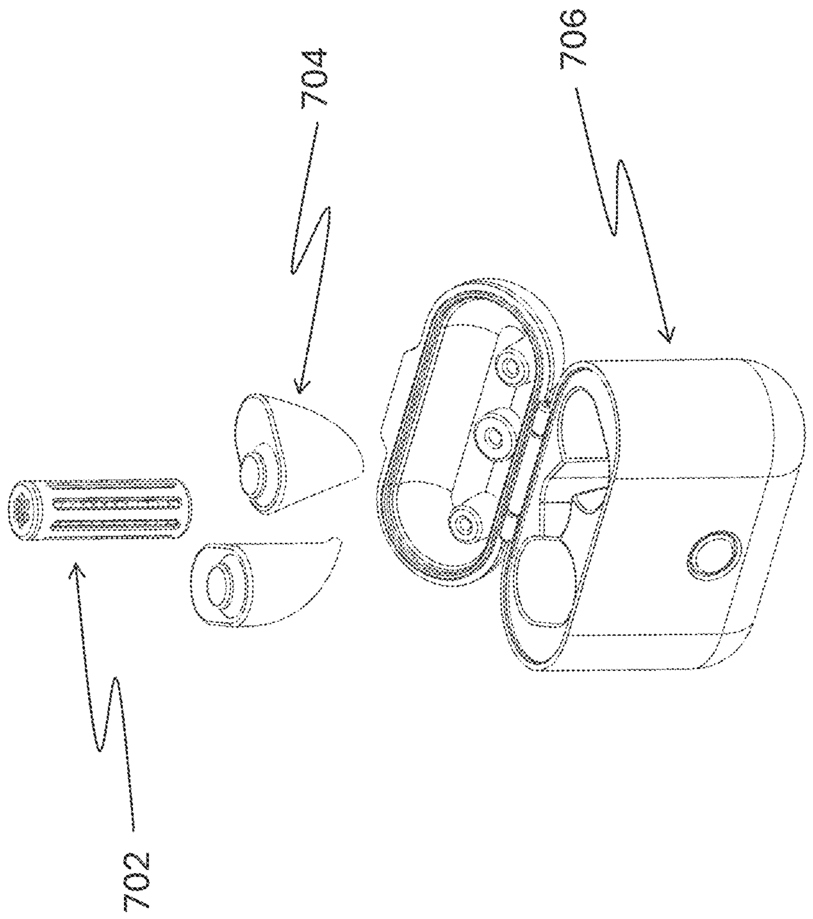
FIG. 70 depicts a hearing aid or hearable charging case over-molded with very low MVTR and a replaceable desiccant cartridge prior to replaceable desiccant cartridge insertion.

Referring now to FIG. 70, hearable case 706 is shown with hearables 704 and replacement desiccant cartridge 702 together with hearable charging case 706. Hearable charging case 706 can be a non-rechargeable or rechargeable type.

Figure 71:
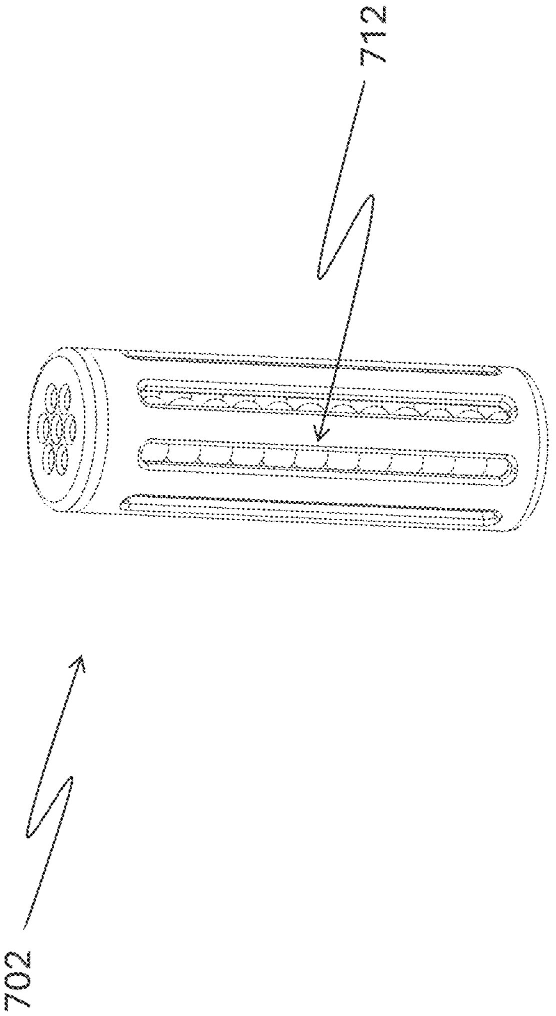
FIG. 71 depicts a replaceable desiccant cartridge inserted into hearing aid or hearable charging/storage case
Figure 72:
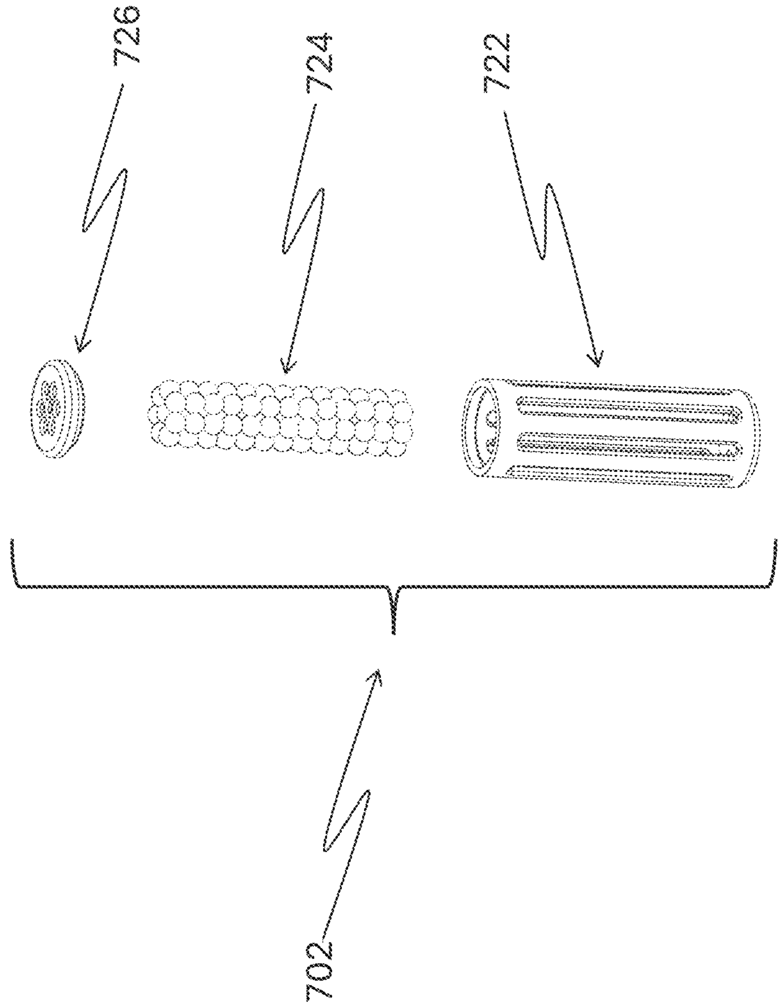
FIG. 72 depicts an exploded perspective view of a replaceable desiccant cartridge for use in a hearing aid/hearable drying or storage case.

As best shown in FIG. 71, replacement desiccant cartridge 702 of FIG. 70 has absorbing vapor slots 712 which allow moisture laden air into replacement desiccant cartridge 702. Referring now to FIG. 72, an exploded view of replacement desiccant cartridge 702 is depicted with cartridge body 722, desiccant 724, and cartridge cap 726. Cartridge cap 726 is itself perforated for airflow as well as the bottom of cartridge body 722. Replacement desiccant cartridge 702 is shown as a cylindrical shape, however, this can be any shape or size to house 0.1 grams-5 grams of desiccant. Replacement desiccant cartridge 702, in some embodiments, is cylindrical in shape with 0.5 grams of desiccant and adsorbing vapor slots 712 molded-in longitudinally.

Figure 73:
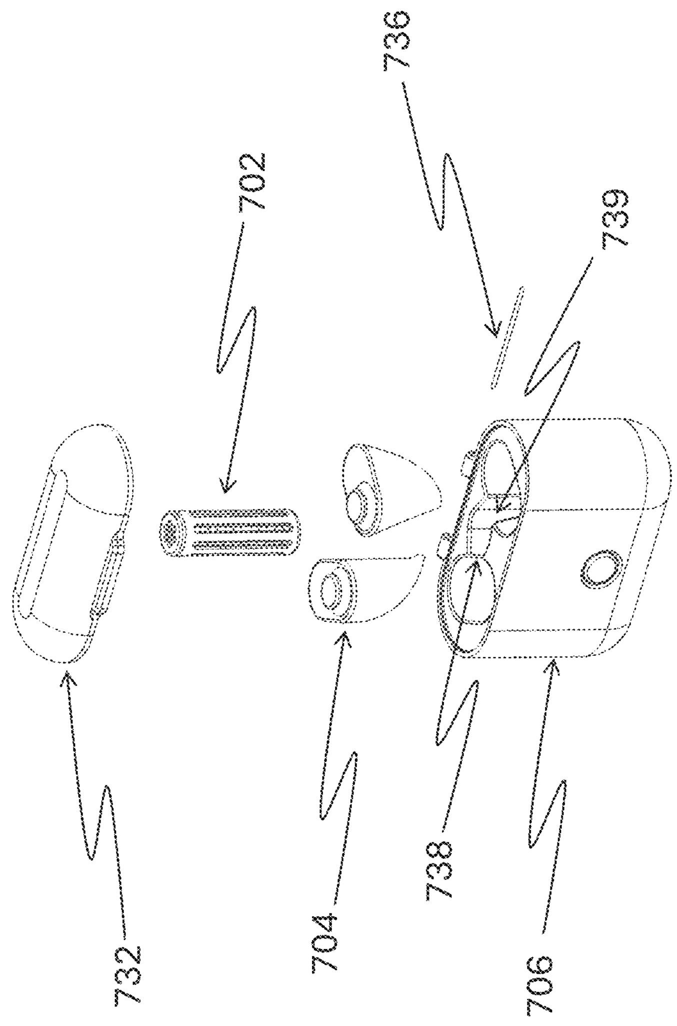
FIG. 73 shows an exploded perspective view of a hearing aid/hearable charging or storage case with a pair of hearables and desiccant cartridge.

As best shown in FIG. 73, an exploded perspective view of hearable charging case 706, hearable charging case cover 732, hinge pin 736, replacement desiccant cartridge 702, and hearables 704. Hearable charging case 706 has airway pockets 738 and 739 molded into case which allows air transfer for drying of hearables 704.

Figure 74:
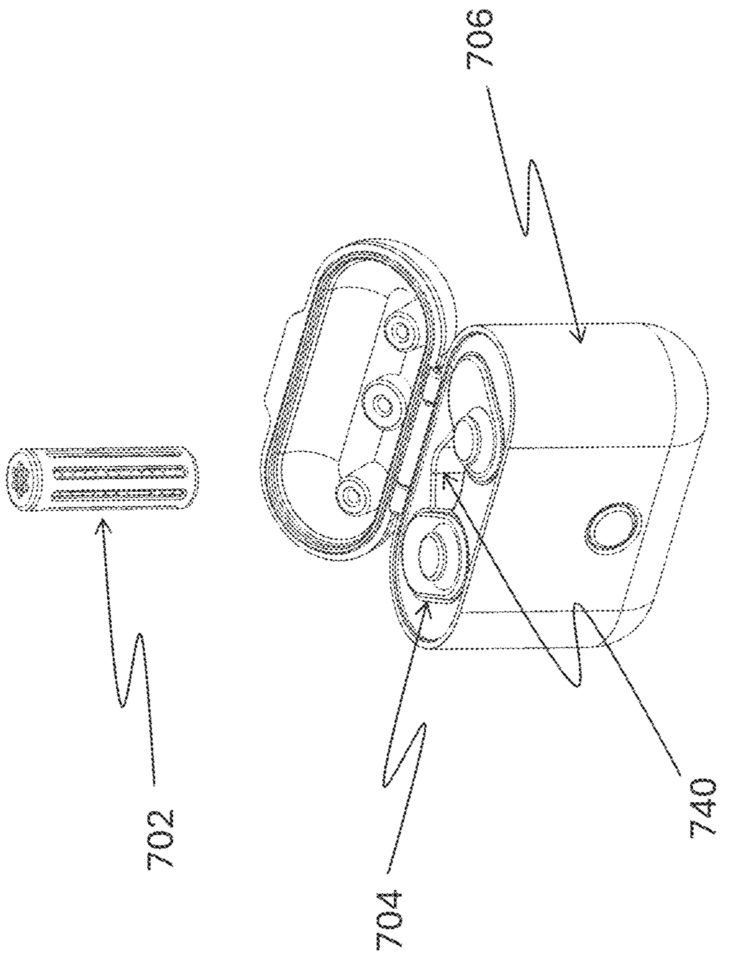
FIG. 74 shows an exploded perspective view of a hearing aid/hearable charging or storage case with a pair of hearables inserted into said case and desiccant cartridge just prior to insertion.
Figure 75:
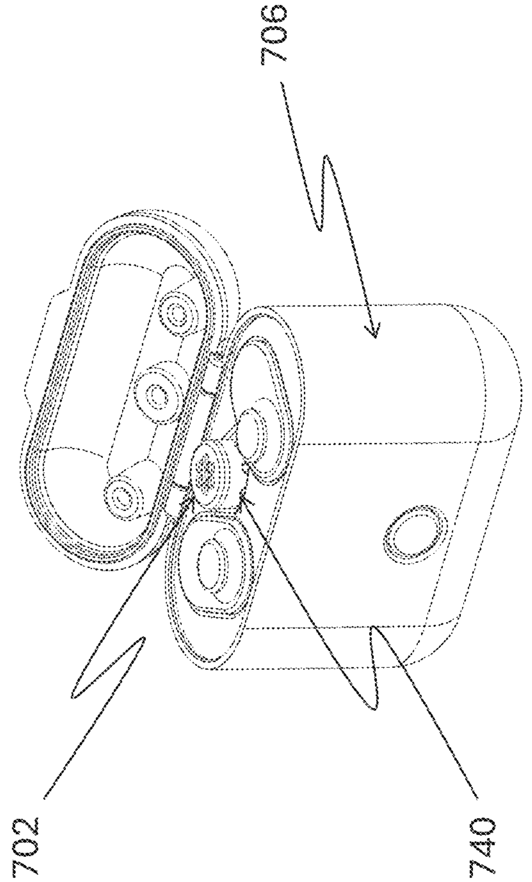
FIG. 75 shows a perspective view of a hearing aid/hearable charging or storage case with a pair of hearables inserted into said case and desiccant cartridge inserted.
Figure 76:
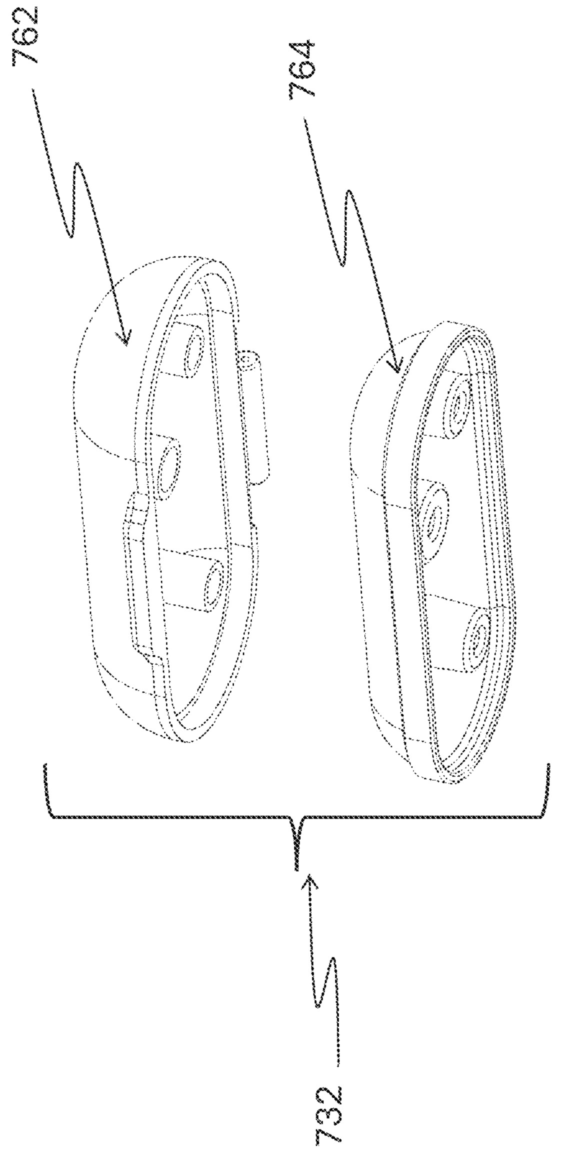
FIG. 76 depicts a perspective view of an over-molded MVTR liner segregated from the hearing aid/hearable case cover as part of a MVTR hearing aid/hearable charging case.
Figure 77:
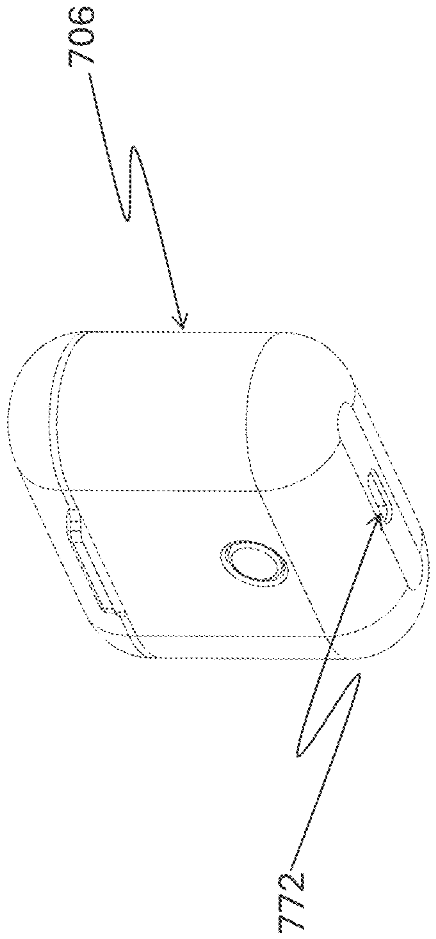
FIG. 77 depicts a perspective view of a low MVTR hearing aid/hearable charging case with an airtight USB charging port.

Referring now to FIG. 74, hearables 704 are depicted nested into hearable charging case 706 with replacement desiccant cartridge 702 about to be inserted into desiccant cartridge pocket 740. As best shown in FIG. 75, replacement desiccant cartridge 702 is now nested in hearable charging case 706. Referring to FIG. 76, hearable charging case cover 732 is shown with injected molded plastic cover 762 and over-molded liner 764. Liner 764 is fabricated from low MVTR silicone material such as Thermoplastic Polyamide Urethane (TPU), Tycoat™, Vaporcoat™, or the like which provides a very high moisture penetration barrier. Referring to FIG. 77, hearable charging case 706 is depicted with charge port 772. Charge port 772 is mounted into hearable charging case 706 in an airtight configuration, using an elastomer seal, epoxy, silicone, etc. which prevents air and moisture intrusion into hearable charging case 706.

The present application incorporates by reference the entirety of U.S. application Ser. No. 19/252,883 (filed on Jun. 27, 2025, and entitled, "METHODS AND APPARATUSES FOR DRYING ELECTRONIC DEVICES"). U.S. application Ser. No. 19/252,883 is a continuation of U.S. application Ser. No. 19/217,397. U.S. application Ser. No. 19/217,397 (filed on May 25, 2025, and entitled, "METHODS AND APPARATUSES FOR DRYING ELECTRONIC DEVICES"). The present application incorporates by reference the entirety of U.S. application Ser. No. 19/217,397 is a continuation-in-part of U.S. application Ser. No. 18/984,716. The present application incorporates by reference the entirety of U.S. application Ser. No. 18/984,716 (filed on Dec. 17, 2024, and entitled, "METHODS AND APPARATUSES FOR DRYING ELECTRONIC DEVICES"). U.S. application Ser. No. 18/984,716 is a continuation of U.S. application Ser. No. 18/923,352. The present application incorporates by reference the entirety of U.S. application Ser. No. 18/923,352 (filed on Oct. 22, 2024, and entitled, "METHODS AND APPARATUSES FOR DRYING ELECTRONIC DEVICES" and issued as U.S. Pat. No. 12,276,454). U.S. application Ser. No. 18/923,352 is a continuation-in-part of U.S. application Ser. No. 18/824,692. The present application incorporates by reference the entirety of U.S. application Ser. No. 18/824,692 (filed on Sep. 4, 2024, and entitled, "METHODS AND APPARATUSES FOR DRYING ELECTRONIC DEVICES" and issued as U.S. Pat. No. 12,281,847). U.S. application Ser. No. 18/824,692 is a continuation-in-part of U.S. application Ser. No. 18/386,918. The present application incorporates by reference the entirety of U.S. application Ser. No. 18/386,918 (filed on Nov. 3, 2023, and entitled, "METHODS AND APPARATUSES FOR DRYING ELECTRONIC DEVICES" and issued as U.S. Pat. No. 12,215,925). U.S. application Ser. No. 18/386,918 is a continuation-in-part of U.S. application Ser. No. 18/228,504. The present application incorporates by reference the entirety of U.S. application Ser. No. 18/228,504 (filed on Jul. 31, 2023, and entitled, "METHODS AND APPARATUSES FOR DRYING ELECTRONIC DEVICES" and issued as U.S. Pat. No. 12,173,962). U.S. application Ser. No. 18/228,504 is a continuation of U.S. application Ser. No. 17/134,492. The present application incorporates by reference the entirety of U.S. application Ser. No. 17/134,492 (filed on Dec. 27, 2020, entitled, "METHODS AND APPARATUSES FOR DRYING ELECTRONIC DEVICES" and issued as U.S. Pat. No. 11,713,924). U.S. application Ser. No. 17/134,492 is a continuation of U.S. application Ser. No. 16/854,862. The present application incorporates by reference the entirety of U.S. application Ser. No. 16/854,862 (filed on Apr. 21, 2020, entitled "METHODS AND APPARATUSES FOR DRYING ELECTRONIC DEVICES" and issued as U.S. Pat. No. 10,876,792). U.S. application Ser. No. 16/854,862 is a continuation-in-part of U.S. application Ser. No. 16/575,306. The present application incorporates by reference the entirety of U.S. application Ser. No. 16/575,306 (filed on Sep. 18, 2019, entitled "METHODS AND APPARATUSES FOR DRYING ELECTRONIC DEVICES" and issued as U.S. Pat. No. 10,690,413). U.S. application Ser. No. 16/575,306 is a continuation-in-part of U.S. application Ser. No. 16/363,742. The present application incorporates by reference the entirety of U.S. application Ser. No. 16/363,742 (filed on Mar. 25, 2019, entitled "METHODS AND APPARATUSES FOR DRYING ELECTRONIC DEVICES" and issued as U.S. Pat. No. 10,928,135). U.S. application Ser. No. 16/363,742 is a continuation of U.S. application Ser. No. 15/979,446. The present application incorporates by reference the entirety of U.S. application Ser. No. 15/979,446 (filed on May 14, 2018, entitled "METHODS AND APPARATUSES FOR DRYING ELECTRONIC DEVICES" and issued as U.S. Pat. No. 10,240,867). U.S. application Ser. No. 15/979,446 is a continuation in-part of U.S. application Ser. No. 15/811,633.

The present application incorporates by reference the entirety of U.S. patent application Ser. No. 15/811,633 (filed on Nov. 13, 2017, and entitled, "METHODS AND APPARATUSES FOR DRYING ELECTRONIC DEVICES"), and issued as U.S. Pat. No. 9,970,708, for all purposes. U.S. application Ser. No. 15/811,633 is a continuation in-part of U.S. application Ser. No. 15/688,551.

The present application incorporates by reference the entirety of U.S. patent application Ser. No. 15/688,551 (filed on Aug. 28, 2017, and entitled, "METHODS AND APPARATUSES FOR DRYING ELECTRONIC DEVICES"), and issued as U.S. Pat. No. 9,816,757, for all purposes. U.S. patent application Ser. No. 15/688,551 is a continuation of U.S. patent application Ser. No. 15/478,992. The present application incorporates by reference the entirety of U.S. patent application Ser. No. 15/478,992 (filed on Apr. 4, 2017, and entitled, "METHODS AND APPARATUSES FOR DRYING ELECTRONIC DEVICES"), and issued as U.S. Pat. No. 9,746,241, for all purposes. U.S. patent application Ser. No. 15/478,992 is a continuation of U.S. patent application Ser. No. 15/369,742, which as indicated below, is also incorporated by reference for all purposes. U.S. patent application Ser. No. 15/478,992 is a continuation of U.S. patent application Ser. No. 15/369,742, filed on Dec. 5, 2016, issued as U.S. Pat. No. 9,644,891, which is a continuation-in-part of U.S. patent application Ser. No. 14/213,142, filed Mar. 14, 2014, issued as U.S. Pat. No. 9,513,053, which claims priority of U.S. Provisional Application No. 61/782,985, filed Mar. 14, 2013, which are all incorporated herein by reference in their entirety, for all purposes. U.S. patent application Ser. No. 15/369,742 is also a continuation-in-part of U.S. patent application Ser. No. 14/665,008, filed Mar. 23, 2015, which is a division of U.S. patent application Ser. No. 13/756,879, filed Feb. 1, 2013, which claims priority to U.S. Provisional Application No. 61/638,599, filed Apr. 26, 2012, and U.S. Provisional Application No. 61/593,617, filed Feb. 1, 2012, all of which are incorporated by reference in their entirety, for all purposes.

U.S. patent application Ser. No. 14/213,142 is a non-provisional application of U.S. Provisional Patent Application No. 61/782,985 (filed Mar. 14, 2013, and entitled, "METHODS AND APPARATUSES FOR DRYING ELECTRONIC DEVICES"), which are all incorporated by reference in their entirety for all purposes.

The present application incorporates by reference the entirety of U.S. patent application Ser. No. 14/213,142 (filed on Mar. 14, 2014, and entitled, "METHODS AND APPARATUSES FOR DRYING ELECTRONIC DEVICES") for all purposes. U.S. patent application Ser. No. 14/213,142 is a non-provisional application of U.S. Provisional Patent Application No. 61/782,985 (filed Mar. 14, 2013, and entitled, "METHODS AND APPARATUSES FOR DRYING ELECTRONIC DEVICES"), which is also incorporated by reference in entirety for all purposes.

The present application incorporates by reference the entirety of U.S. patent application Ser. No. 14/665,008 (filed on Mar. 23, 2015, and entitled, "METHODS AND APPARATUSES FOR DRYING ELECTRONIC DEVICES") for all purposes. U.S. patent application Ser. No. 14/665,008 is a divisional application of U.S. patent application Ser. No. 13/756,879 (filed Feb. 1, 2013, and entitled, "METHODS AND APPARATUSES FOR DRYING ELECTRONIC DEVICES"). The present application incorporates by reference the entirety of U.S. patent application Ser. No. 13/756,879 (filed Feb. 1, 2013, and entitled, "METHODS AND APPARATUSES FOR DRYING ELECTRONIC DEVICES"). The U.S. patent application Ser. No. 13/756,879 is a non-provisional application of U.S. Provisional Patent Application Nos. 61/638,599 (filed Apr. 26, 2012, and entitled, "METHODS AND APPARATUSES FOR DRYING AND DISINFECTING PORTABLE ELECTRONIC DEVICES") and 61/593,617 (filed Feb. 1, 2012, and entitled, "METHODS AND APPARATUSES FOR DRYING PORTABLE ELECTRONIC DEVICES"), which are all also incorporated by reference in entirety for all purposes.

Some embodiments include one or more microprocessors (or one or more processors) which can be a microcontroller, general or specific purpose microprocessor, or generally any type of controller that can perform the requisite control functions. The microprocessor can read its program from a memory, and may be comprised of one or more components configured as a single unit. Alternatively, when of a multi-component form, the microprocessor may have one or more components located remotely relative to the others. One or more components of the microprocessor may be of the electronic variety including digital circuitry, analog circuitry, or both. In one embodiment, the microprocessor is of a conventional, integrated circuit microprocessor arrangement, such as one or more CORE i7 HEXA processors from INTEL Corporation (450 Mission College Boulevard, Santa Clara, Calif. 95052, USA), ATHLON or PHENOM processors from Advanced Micro Devices (One AMD Place, Sunnyvale, Calif. 94088, USA), POWER8 processors from IBM Corporation (1 New Orchard Road, Armonk, N.Y. 10504, USA), or PIC Microcontrollers from Microchip Technologies (2355 West Chandler Boulevard, Chandler, Ariz. 85224, USA). In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, some embodiments include one or more memories or memory systems. A memory may include one or more types such as solid-state electronic memory, magnetic memory, or optical memory, just to name a few. By way of non-limiting example, a memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, a memory may be volatile, nonvolatile, or a hybrid combination of volatile and nonvolatile varieties. A memory in various embodiments is encoded with programming instructions executable by a microprocessor to perform the automated methods disclosed herein.

While illustrated examples, representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the disclosure are desired to be protected.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, data, or information may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, any operation used herein may be interchangeably used with the term "transform" or "transformation."

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the disclosure(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure(s) set out in any claims that may issue from this disclosure. Specifically, a description of a technology in the "Background" is not to be construed as an admission that technology is prior art to any disclosure(s) in this disclosure. Neither is the "Summary" to be considered as a characterization of the disclosure(s) set forth in issued claims. Furthermore, any reference in this disclosure to "disclosure" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of such claims shall be considered on their own merits in light of this disclosure, but should not be constrained by the headings herein.

What is claimed is:

1. A method comprising:

receiving a moisture-reducing apparatus in a drying chamber, wherein the drying chamber is sealable, and wherein the drying chamber is over-molded or coated with a first material;

generating, based on the receiving the moisture-reducing apparatus in the drying chamber, a first air flow through a first air channel connecting the drying chamber and the moisture-reducing apparatus, wherein:

the moisture-reducing apparatus is at least partially comprised in the drying chamber, the drying chamber receives a portable electronic device holding a first moisture, and the moisture-reducing apparatus comprises at least one sensor enabled to determine a first humidity of a first air inside the drying chamber and outside the moisture-reducing apparatus and a second humidity of a second air inside the moisture-reducing apparatus;

routing the first moisture from the portable electronic device to the moisture-reducing apparatus;

determining, using the at least one sensor, the first humidity of the first air;

determining, using the at least one sensor, the second humidity of the second air;

pausing the routing the first moisture from the portable electronic device to the moisture-reducing apparatus;

generating a second air flow, through a second air channel connecting the moisture-reducing apparatus and an exterior of the drying chamber, wherein the at least one sensor is enabled to determine a third humidity of a third air inside the moisture-reducing apparatus;

routing the first moisture from the moisture-reducing apparatus to the exterior of the drying chamber;

determining, using the at least one sensor, the third humidity; and pausing the routing the first moisture from the moisture-reducing apparatus to the exterior of the drying chamber.

2. The method of claim 1, wherein the first material comprises a low Moisture Vapor Transmission Rate (MVTR) material.

3. The method of claim 2, wherein the low MVTR material comprises at least one of:

thermoplastic polyamide urethane (TPU), a fluoropolymer, silicone, or polyethylene coating.

4. The method of claim 1, wherein the drying chamber comprises a substantially airtight drying case.

5. The method of claim 1, wherein the drying chamber further comprises a charger, wherein the charger is functional to charge the portable electronic device.

6. The method of claim 1, further comprising: displaying, based on at least one of the first humidity, the second humidity, or the third humidity, a first indication.

7. The method of claim 1, wherein the moisture-reducing apparatus comprises a desiccant.

8. The method of claim 1, wherein the moisture-reducing apparatus is disposable or replaceable.

9. The method of claim 1, wherein the moisture-reducing apparatus is reactivatable.

10. An apparatus at least partially comprised in a drying chamber for drying an electronic device, the apparatus comprising:

a moisture-reducing device, wherein the moisture-reducing device absorbs moisture from surrounding air, wherein the moisture-reducing device is received by a drying chamber, wherein, based on receiving the moisture-reducing device in the drying chamber, a first air flow is generated through a first air channel connecting the drying chamber and the moisture-reducing device, wherein the drying chamber is sealable, wherein the drying chamber is over-molded or coated with a first material;

a printed circuit board providing a base for a first circuit and a second circuit, wherein:

the first circuit comprises at least one sensor enabled to determine a first humidity of a first air and a second humidity of a second air, wherein the first air is inside the drying chamber and outside the apparatus, wherein the second air is inside the apparatus, and the second circuit comprises a temperature-measuring device;

at least one controller connected to or associated with at least one of: the first circuit and the second circuit;

at least one computing device connected to or associated with the at least one controller to provide at least one instruction, wherein the at least one instruction is executable to:

route a first moisture from an electronic device to the moisture-reducing device, determine, using the at least one sensor, the first humidity of the first air, determine, using the at least one sensor, the second humidity of the second air, and pause the route the first moisture from the electronic device to the moisture-reducing device.

11. The apparatus of claim 10, wherein the second circuit further comprises one or more surface mount resistors enabled to heat or reactivate the moisture-reducing device.

12. The apparatus of claim 10, wherein the pause the route the first moisture from the electronic device to the moisture-reducing device is based on the first humidity and the second humidity.

13. The apparatus of claim 10, wherein the at least one instruction comprises a temperature control instruction or a humidity sensing instruction.

14. The apparatus of claim 10, wherein the at least one instruction is further executable to remove the first moisture from the moisture-reducing device.

15. The apparatus of claim 10, wherein at least one of:

the moisture-reducing device comprises a desiccant, the moisture-reducing device is disposable or replaceable, the moisture-reducing device is reactivatable, or the first material comprises a low Moisture Vapor Transmission Rate (MVTR) material.

16. A method comprising:

receiving a moisture-reducing apparatus in a drying chamber, wherein the drying chamber is coated or over-molded with a first material;

generating, based on the receiving the moisture-reducing apparatus in the drying chamber, a first air flow through a first air channel connecting the drying chamber and the moisture-reducing apparatus, wherein:

the moisture-reducing apparatus is at least partially comprised in the drying chamber, the drying chamber receives a portable electronic device holding a first moisture, and the moisture-reducing apparatus comprises at least one sensor enabled to determine a first humidity of a first air inside the drying chamber and outside the moisture-reducing apparatus and a second humidity of a second air inside the moisture-reducing apparatus;

routing the first moisture from the portable electronic device to the moisture-reducing apparatus;

determining, using the at least one sensor, the first humidity of the first air;

determining, using the at least one sensor, the second humidity of the second air;

pausing the routing the first moisture from the portable electronic device to the moisture-reducing apparatus;

generating a second air flow, through a second air channel connecting the moisture-reducing apparatus and an exterior of the drying chamber, wherein the at least one sensor is enabled to determine a third humidity of a third air inside the moisture-reducing apparatus;

routing the first moisture from the moisture-reducing apparatus to the exterior of the drying chamber;

determining, using the at least one sensor, the third humidity; and pausing the routing the first moisture from the moisture-reducing apparatus to the exterior of the drying chamber.

17. The method of claim 16, wherein at least one of:

the first material comprises a low Moisture Vapor Transmission Rate (MVTR) material, or the low MVTR material comprises at least one of: thermoplastic polyamide urethane (TPU), a fluoropolymer, silicone, or polyethylene coating.

18. The method of claim 16, wherein at least one of:

the moisture-reducing apparatus comprises a desiccant, the moisture-reducing apparatus is disposable or replaceable, or the moisture-reducing apparatus is reactivatable.

19. The method of claim 16, further comprising removing the first moisture from the moisture-reducing apparatus.

20. The method of claim 16, wherein the first humidity comprises a first relative humidity, the second humidity comprises a second relative humidity, and the third humidity comprises a third relative humidity.

* * * * *